United States Patent
Braunstein et al.

(10) Patent No.: US 12,441,353 B2
(45) Date of Patent: Oct. 14, 2025

(54) FREE SPACE MAPPING AND NAVIGATION

(71) Applicant: MOBILEYE VISION TECHNOLOGIES LTD., Jerusalem (IL)

(72) Inventors: Daniel Braunstein, Tzur Hadassah (IL); Ishay Levi, Jerusalem (IL); Kfir Viente, Ramat Gan (IL); David Huberman, Jerusalem (IL); Matan Argaman, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 17/096,053

(22) Filed: Nov. 12, 2020

(65) Prior Publication Data
US 2021/0061304 A1    Mar. 4, 2021

Related U.S. Application Data

(63) Continuation of application No. PCT/US2019/032429, filed on May 15, 2019.
(Continued)

(51) Int. Cl.
*B60W 60/00* (2020.01)
*B60T 7/12* (2006.01)
(Continued)

(52) U.S. Cl.
CPC ............ *B60W 60/001* (2020.02); *B60T 7/12* (2013.01); *B60W 10/18* (2013.01); *B60W 10/20* (2013.01);
(Continued)

(58) Field of Classification Search
CPC ............ B60W 60/001; B60W 2556/40; G01C 21/3815; G01C 21/3885; G01C 21/3807;
(Continued)

(56) References Cited

U.S. PATENT DOCUMENTS 8,730,260 B2 * 5/2014 Funabashi ........ G08G 1/096716
345/619
9,691,287 B1 * 6/2017 Shapiro .................. G06F 3/017
(Continued)

FOREIGN PATENT DOCUMENTS

EP        3130891 B1     2/2017

OTHER PUBLICATIONS

PCT International Search Report and Written Opinion of PCT International Application No. PCT/US2019/032429 date of mailing Jan. 10, 2019 (20 pages).

*Primary Examiner* — Scott A Browne
*Assistant Examiner* — Terry C Buse
(74) *Attorney, Agent, or Firm* — Finnegan, Henderson, Farabow, Garrett & Dunner LLP

(57) ABSTRACT

A system for mapping road segment free spaces for use in autonomous vehicle navigation. The system includes at least one processor programmed to: receive from a first vehicle one or more location identifiers associated with a lateral region of free space adjacent to a road segment; update an autonomous vehicle road navigation model for the road segment to include a mapped representation of the lateral region of free space based on the received one or more location identifiers; and distribute the updated autonomous vehicle road navigation model to a plurality of autonomous vehicles.

39 Claims, 70 Drawing Sheets

Related U.S. Application Data

(60) Provisional application No. 62/805,646, filed on Feb. 14, 2019, provisional application No. 62/800,845, filed on Feb. 4, 2019, provisional application No. 62/797,639, filed on Jan. 28, 2019, provisional application No. 62/771,335, filed on Nov. 26, 2018, provisional application No. 62/671,779, filed on May 15, 2018.

(51) Int. Cl.

| | |
|---|---|
| *B60W 10/18* | (2012.01) |
| *B60W 10/20* | (2006.01) |
| *B60W 30/12* | (2020.01) |
| *B60W 30/18* | (2012.01) |
| *B62D 6/00* | (2006.01) |
| *G01C 21/00* | (2006.01) |
| *G01C 21/30* | (2006.01) |
| *G01C 21/34* | (2006.01) |
| *G01C 21/36* | (2006.01) |
| *G05D 1/00* | (2024.01) |
| *G05D 1/248* | (2024.01) |
| *G05D 1/249* | (2024.01) |
| *G05D 1/617* | (2024.01) |
| *G05D 1/692* | (2024.01) |
| *G05D 1/81* | (2024.01) |
| *G06N 3/08* | (2023.01) |
| *G06V 20/56* | (2022.01) |
| *G06V 20/58* | (2022.01) |
| *G08G 1/00* | (2006.01) |
| *G08G 1/01* | (2006.01) |
| *G08G 1/07* | (2006.01) |
| *G08G 1/14* | (2006.01) |
| *G07C 5/08* | (2006.01) |

(52) U.S. Cl.
CPC ...... *B60W 30/12* (2013.01); *B60W 30/18072* (2013.01); *B60W 30/18109* (2013.01); *B62D 6/001* (2013.01); *G01C 21/30* (2013.01); *G01C 21/3407* (2013.01); *G01C 21/3626* (2013.01); *G01C 21/3691* (2013.01); *G01C 21/3815* (2020.08); *G01C 21/3848* (2020.08); *G01C 21/3885* (2020.08); *G05D 1/0088* (2013.01); *G05D 1/0214* (2013.01); *G05D 1/0221* (2013.01); *G05D 1/0246* (2013.01); *G05D 1/0278* (2013.01); *G05D 1/0287* (2013.01); *G05D 1/248* (2024.01); *G05D 1/249* (2024.01); *G05D 1/617* (2024.01); *G05D 1/692* (2024.01); *G05D 1/81* (2024.01); *G06N 3/08* (2013.01); *G06V 20/56* (2022.01); *G06V 20/584* (2022.01); *G06V 20/588* (2022.01); *G08G 1/0112* (2013.01); *G08G 1/07* (2013.01); *G08G 1/143* (2013.01); *G08G 1/22* (2013.01); *B60W 2300/123* (2013.01); *B60W 2420/403* (2013.01); *B60W 2520/06* (2013.01); *B60W 2520/12* (2013.01); *B60W 2552/05* (2020.02); *B60W 2552/30* (2020.02); *B60W 2552/45* (2020.02); *B60W 2552/53* (2020.02); *B60W 2554/60* (2020.02); *B60W 2555/60* (2020.02); *B60W 2556/40* (2020.02); *B60W 2556/55* (2020.02); *B60W 2556/65* (2020.02); *G01C 21/38* (2020.08); *G01C 21/3807* (2020.08); *G01C 21/3841* (2020.08); *G07C 5/0808* (2013.01)

(58) Field of Classification Search
CPC .............. G01C 21/3841; G01C 21/30; G01C 21/3407; G01C 21/3626; G01C 21/3691; B62D 6/001; G08G 1/096708; G08G 1/096741; G05D 2201/0213
See application file for complete search history.

(56) References Cited

U.S. PATENT DOCUMENTS

| | | | |
|---|---|---|---|
| 10,988,137 B2* | 4/2021 | Dyer | G05D 1/0088 |
| 2003/0128135 A1* | 7/2003 | Poltorak | G08G 1/081 |
| | | | 340/906 |
| 2005/0085995 A1* | 4/2005 | Lee | G01C 21/30 |
| | | | 340/995.1 |
| 2006/0106534 A1* | 5/2006 | Kawamata | G01C 21/3889 |
| | | | 701/532 |
| 2008/0319648 A1* | 12/2008 | Poltorak | G08G 1/0969 |
| | | | 701/423 |
| 2010/0094537 A1* | 4/2010 | Goto | G01C 21/3415 |
| | | | 701/533 |
| 2015/0116135 A1* | 4/2015 | Sobue | G08G 1/0969 |
| | | | 340/995.12 |
| 2016/0229410 A1* | 8/2016 | Clarke | H04N 23/90 |
| 2017/0010618 A1* | 1/2017 | Shashua | G01C 21/3644 |
| 2017/0154531 A1* | 6/2017 | Funabashi | G08G 1/166 |
| 2017/0371337 A1* | 12/2017 | Ramasamy | G08G 1/056 |
| 2018/0024562 A1 | 1/2018 | Bellaiche | |
| 2018/0189578 A1* | 7/2018 | Yang | G01C 21/3635 |
| 2018/0373980 A1* | 12/2018 | Huval | G06F 18/41 |
| 2019/0258269 A1* | 8/2019 | Yanagihara | B60W 60/00274 |
| 2020/0126247 A1* | 4/2020 | Vock | B60W 40/064 |
| 2022/0340177 A1* | 10/2022 | Khayatian | B60W 60/00 |

* cited by examiner

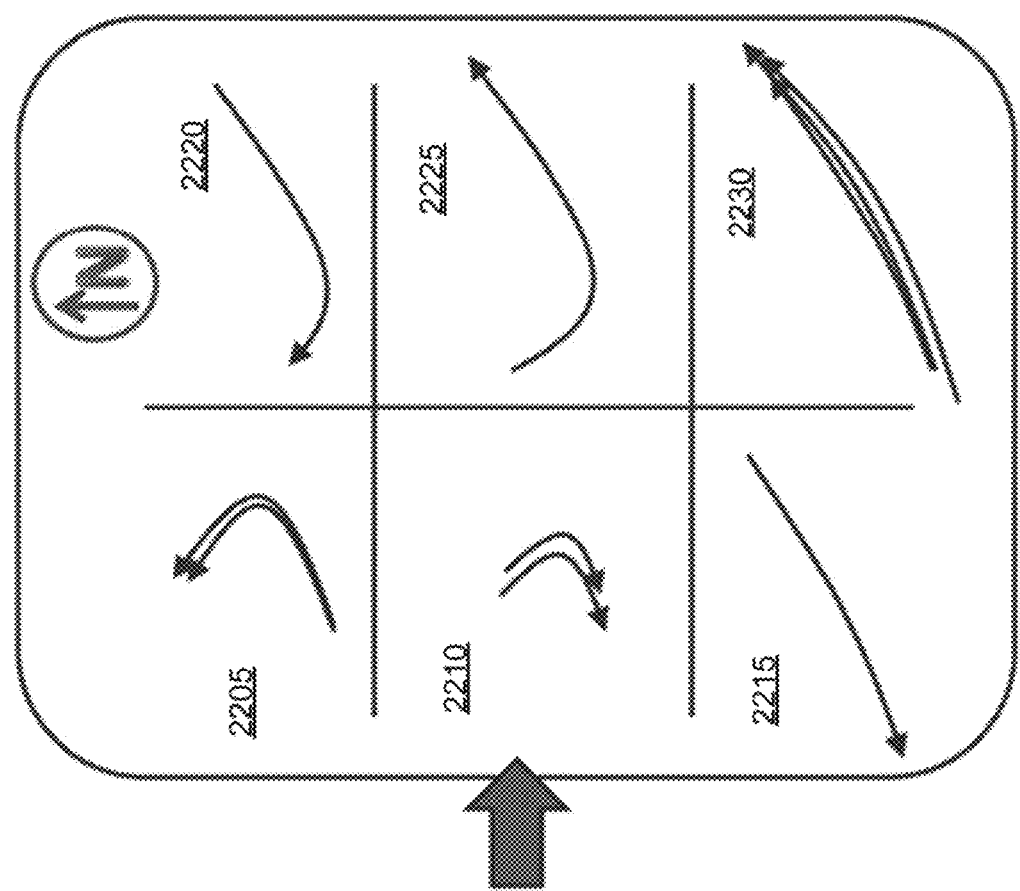
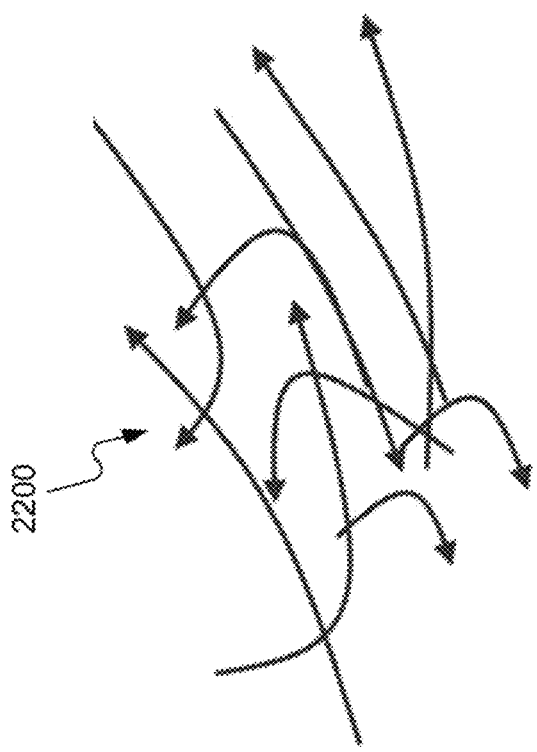
FIG. 22

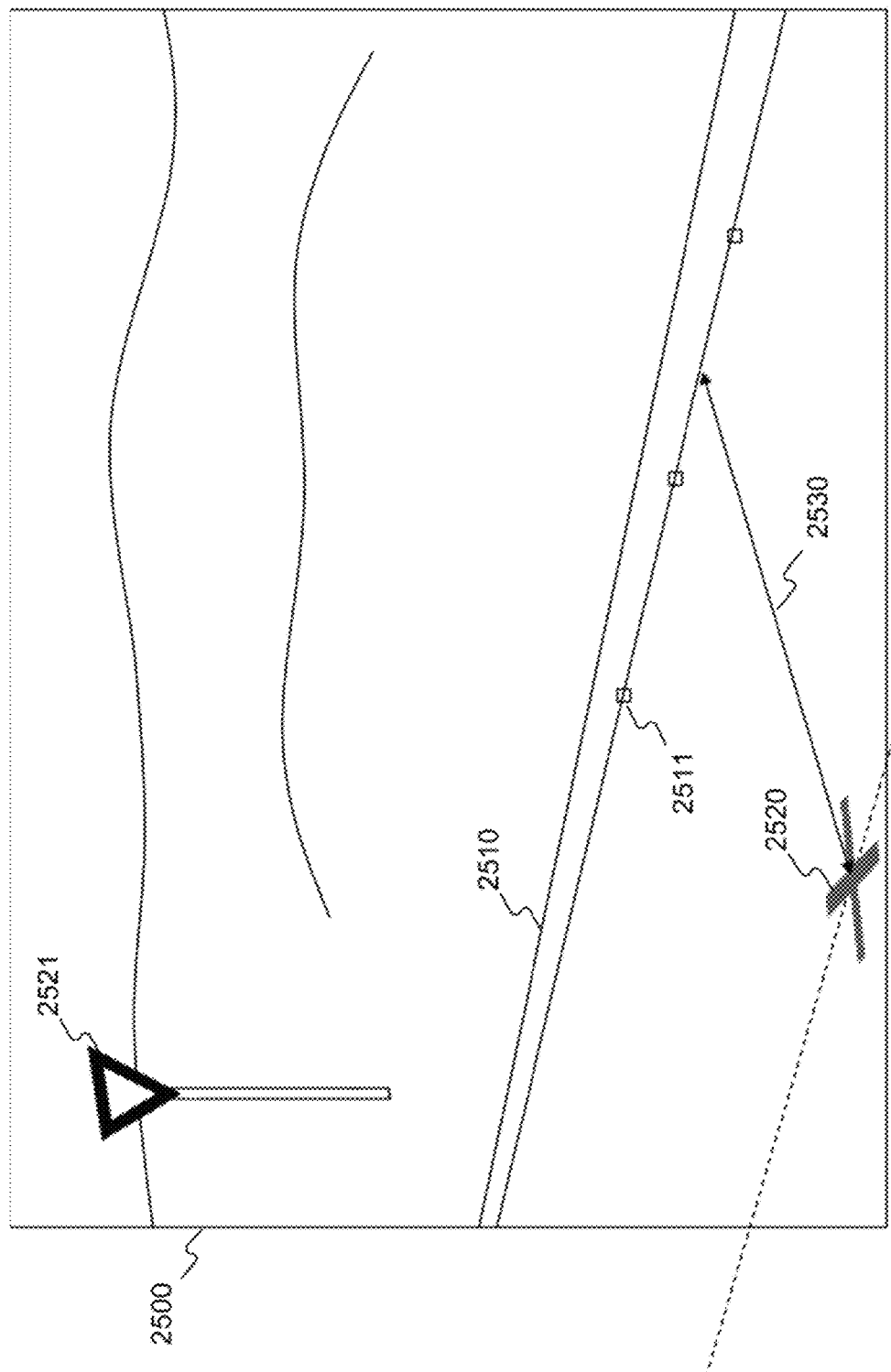

3400

```
┌─────────────────────────────────────────────────────────────┐
│   RECEIVE FROM A FIRST VEHICLE ONE OR MORE LOCATION         │── 3402
│  IDENTIFIERS ASSOCIATED WITH A LATERAL REGION OF FREE SPACE │
│                 ADJACENT TO A ROAD SEGMENT                  │
└─────────────────────────────────────────────────────────────┘
                              │
┌─────────────────────────────────────────────────────────────┐
│  UPDATE AN AUTONOMOUS VEHICLE ROAD NAVIGATION MODEL FOR     │── 3404
│   THE ROAD SEGMENT TO INCLUDE A MAPPED REPRESENTATION OF    │
│ THE LATERAL REGION OF FREE SPACE BASED ON THE RECEIVED ONE  │
│                 OR MORE LOCATION IDENTIFIERS                │
└─────────────────────────────────────────────────────────────┘
                              │
┌─────────────────────────────────────────────────────────────┐
│  DISTRIBUTE THE UPDATED AUTONOMOUS VEHICLE ROAD NAVIGATION  │── 3406
│       MODEL TO A PLURALITY OF AUTONOMOUS VEHICLES           │
└─────────────────────────────────────────────────────────────┘
```

RECEIVE AN AUTONOMOUS VEHICLE ROAD NAVIGATION MODEL ASSOCIATED WITH A ROAD SEGMENT — 3502

RECEIVE FROM AN IMAGE CAPTURE DEVICE AT LEAST ONE IMAGE REPRESENTATIVE OF AN ENVIRONMENT OF A VEHICLE — 3504

DETERMINE AT LEAST ONE NAVIGATIONAL ACTION BASED ON MAPPED REPRESENTATION OF AT LEAST ONE LATERAL REGION OF FREE SPACE ADJACENT TO THE ROAD SEGMENT — 3506

CAUSE ONE OR MORE ACTUATOR SYSTEMS ASSOCIATED WITH THE VEHICLE TO IMPLEMENT THE DETERMINED AT LEAST ONE NAVIGATIONAL ACTION — 3508

FIG. 35

FREE SPACE MAPPING AND NAVIGATION

CROSS REFERENCE TO RELATED APPLICATIONS

This application is a continuation of PCT International Application No. PCT/US2019/032429, filed May 15, 2019, which claims the benefit of priority of U.S. Provisional Application No. 62/671,779, filed on May 15, 2018; U.S. Provisional Application No. 62/771,335, filed on Nov. 26, 2018; U.S. Provisional Application No. 62/797,639, filed on Jan. 28, 2019; U.S. Provisional Application No. 62/800,845, filed on Feb. 4, 2019; and U.S. Provisional Application No. 62/805,646, filed on Feb. 14, 2019. All of the foregoing applications are incorporated herein by reference in their entirety.

BACKGROUND

Technical Field

The present disclosure relates generally to autonomous vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

In an embodiment, a system for mapping a lane mark for use in autonomous vehicle navigation may comprise at least one processor. The processor may be programmed to receive two or more location identifiers associated with a detected lane mark; associate the detected lane mark with a corresponding road segment; update an autonomous vehicle road navigation model relative to the corresponding road segment based on the two or more location identifiers associated with the detected lane mark; and distribute the updated autonomous vehicle road navigation model to a plurality of autonomous vehicles.

In an embodiment, a method for mapping a lane mark for use in autonomous vehicle navigation may comprise receiving two or more location identifiers associated with a detected lane mark; associating the detected lane mark with a corresponding road segment; updating an autonomous vehicle road navigation model relative to the corresponding road segment based on the two or more location identifiers associated with the detected lane mark; and distributing the updated autonomous vehicle road navigation model to a plurality of autonomous vehicles.

In an embodiment, a system for autonomously navigating a host vehicle along a road segment may comprise at least one processor. The processor may be programmed to receive from a server-based system an autonomous vehicle road navigation model, wherein the autonomous vehicle road navigation model includes a target trajectory for the host vehicle along the road segment and two or more location identifiers associated with at least one lane mark associated with the road segment; receive from an image capture device at least one image representative of an environment of the vehicle; determine a longitudinal position of the host vehicle along the target trajectory; determine an expected lateral distance to the at least one lane mark based on the determined longitudinal position of the host vehicle along the target trajectory and based on the two or more location identifiers associated with the at least one lane mark; analyze the at least one image to identify the at least one lane mark; determine an actual lateral distance to the at least one lane mark based on analysis of the at least one image; and determine an autonomous steering action for the host vehicle based on a difference between the expected lateral distance to the at least one lane mark and the determined actual lateral distance to the at least one lane mark.

In an embodiment, a method for autonomously navigating a host vehicle along a road segment may comprise receiving from a server-based system an autonomous vehicle road navigation model, wherein the autonomous vehicle road navigation model includes a target trajectory for the host vehicle along the road segment and two or more location identifiers associated with at least one lane mark associated with the road segment; receiving from an image capture device at least one image representative of an environment of the vehicle; determining a longitudinal position of the host vehicle along the target trajectory; determining an expected lateral distance to the at least one lane mark based on the determined longitudinal position of the host vehicle along the target trajectory and based on the two or more location identifiers associated with the at least one lane mark; analyzing the at least one image to identify the at least one lane mark; determining an actual lateral distance to the at least one lane mark based on analysis of the at least one image; and determining an autonomous steering action for the host vehicle based on a difference between the expected lateral distance to the at least one lane mark and the determined actual lateral distance to the at least one lane mark.

In an embodiment, a system for mapping a directional arrow for use in autonomous vehicle navigation may comprise at least one processor. The processor may be programmed to receive at least one location identifier associated with a directional arrow detected on a surface of a road; receive at least one directional indicator associated with the detected directional arrow; associate the detected directional arrow with a corresponding road segment; update an autonomous vehicle road navigation model relative to the corresponding road segment based on the at least one location identifier and based on the at least one directional indicator associated with the detected direction; and distribute the updated autonomous vehicle road navigation model to a plurality of autonomous vehicles.

In an embodiment, a method for mapping a directional arrow for use in autonomous vehicle navigation may comprise receiving at least one location identifier associated with a directional arrow detected on a surface of a road; receiving at least one directional indicator associated with the detected directional arrow; associating the detected directional arrow with a corresponding road segment; updating an autonomous vehicle road navigation model relative to the corresponding road segment based on the at least one location identifier and based on the at least one directional indicator associated with the detected direction; and distributing the updated autonomous vehicle road navigation model to a plurality of autonomous vehicles.

In an embodiment, a system for autonomously navigating a host vehicle along a road segment may comprise at least one processor. The processor may be programmed to receive from an image capture device at least one image representative of an environment of the host vehicle; detect in the at least one image a representation of an arrow present on a road surface; determine a pointing direction of the detected arrow based on analysis of the at least one image; determine an autonomous navigational action for the host vehicle based on the determined pointing direction of the detected arrow; and cause at least one actuator system of the host vehicle to implement the determined autonomous navigational action.

In an embodiment, a method for autonomously navigating a host vehicle along a road segment may comprise receiving from an image capture device at least one image representative of an environment of the host vehicle; detecting in the at least one image a representation of an arrow present on a road surface; determining a pointing direction of the detected arrow based on analysis of the at least one image; determining an autonomous navigational action for the host vehicle based on the determined pointing direction of the detected arrow; and causing at least one actuator system of the host vehicle to implement the determined autonomous navigational action.

In an embodiment, a system for autonomously navigating a host vehicle along a road segment may comprise at least one processor. The processor may be programmed to receive from a server-based system an autonomous vehicle road navigation model, wherein the autonomous vehicle road navigation model includes a mapped directional arrow associated with the road segment, and wherein the mapped directional arrow includes at least one of an indication of an orientation of the directional arrow or a location of the directional arrow; determine an autonomous navigational action for the host vehicle based on at least one of the orientation of the directional arrow or the location of the directional arrow; and cause at least one actuator system of the host vehicle to implement the determined autonomous navigational action.

In an embodiment, a method for autonomously navigating a host vehicle along a road segment may comprise receiving from a server-based system an autonomous vehicle road navigation model, wherein the autonomous vehicle road navigation model includes a mapped directional arrow associated with the road segment, and wherein the mapped directional arrow includes at least one of an indication of an orientation of the directional arrow or a location of the directional arrow; determining an autonomous navigational action for the host vehicle based on at least one of the orientation of the directional arrow or the location of the directional arrow; and causing at least one actuator system of the host vehicle to implement the determined autonomous navigational action.

In an embodiment, a navigation system for a vehicle may comprise at least one processor programmed to receive from an image capture device one or more images representative of an environment of the vehicle. The at least one processor may also be programmed to analyze the one or more images to determine navigation information related to the vehicle. The at least one processor may further be programmed to determine based on analysis of at least one of: the one or more images, an output of one or more sensors, or the determined navigation information, whether a fault condition exists relative to the determined navigation information. The at least one processor may also be programmed to transmit the navigation information from the vehicle to a server if a fault condition is determined not to exist, and forego transmission of the navigation information from the vehicle to a server if a fault condition is determined to exist.

In an embodiment, a method for transmitting navigation information may comprise receiving from an image capture device one or more images representative of an environment of a vehicle. The method may also comprise analyzing the one or more images to determine navigation information related to the vehicle. The method may further comprise determining based on analysis of at least one of: the one or more images, an output of one or more sensors, or the determined navigation information, whether a fault condition exists relative to the determined navigation information. The method may also comprise transmitting the navigation information from the vehicle to a server if a fault condition is determined not to exist, and foregoing transmission of the navigation information from the vehicle to a server if a fault condition is determined to exist.

In an embodiment, a non-transitory computer-readable medium may store instructions that, when executed by at least one processing device, cause the device to perform a method comprising receiving from an image capture device one or more images representative of an environment of a vehicle. The method may also comprise analyzing the one or more images to determine navigation information related to the vehicle. The method may further comprise determining based on analysis of at least one of: the one or more images, an output of one or more sensors, or the determined navigation information, whether a fault condition exists relative to the determined navigation information. The method may also comprise transmitting the navigation information from the vehicle to a server if a fault condition is determined not to exist, and foregoing transmission of the navigation information from the vehicle to a server if a fault condition is determined to exist.

In an embodiment, a system for mapping road segment free spaces for use in autonomous vehicle navigation may comprise at least one processor programmed to receive from a first vehicle one or more location identifiers associated with a lateral region of free space adjacent to a road segment. The at least one processor may also be programmed to update an autonomous vehicle road navigation model for the road segment to include a mapped representation of the lateral region of free space based on the received one or more location identifiers. The at least one processor may further be programmed to distribute the updated autonomous vehicle road navigation model to a plurality of autonomous vehicles.

In an embodiment, a computer-implemented method for mapping road segment free spaces for use in autonomous vehicle navigation may comprise receiving from a first vehicle one or more location identifiers associated with a lateral region of free space adjacent to a road segment. The method may also comprise updating an autonomous vehicle road navigation model for the road segment to include a mapped representation of the lateral region of free space based on the received one or more location identifiers. The method may further comprise distributing the updated autonomous vehicle road navigation model to a plurality of autonomous vehicles.

In an embodiment, a system for autonomously navigating a host vehicle along a road segment may comprise at least one processor. The processor may be programmed to receive from a server-based system an autonomous vehicle road navigation model associated with the road segment. The autonomous vehicle road navigation model may include a mapped representation of at least one lateral region of free space adjacent to the road segment. The at least one processor may also be programmed to receive from an image capture device at least one image representative of an environment of the host vehicle. The at least one processor may further be programmed to determine at least one navigational action for the host vehicle based on mapped representation of the at least one lateral region of free space adjacent to the road segment even where a representation of the at least one lateral region of free space does not appear in the at least one image representative of the environment of the host vehicle. The at least one processor may also be programmed to cause one or more actuator systems associated with the host vehicle to implement the determined at least one navigational action for the host vehicle.

In an embodiment, a computer-implemented method for autonomously navigating a host vehicle along a road segment may comprise receiving from a server-based system an autonomous vehicle road navigation model associated with the road segment. The autonomous vehicle road navigation model may include a mapped representation of at least one lateral region of free space adjacent to the road segment. The method may also comprise receiving from an image capture device at least one image representative of an environment of the host vehicle. The method may further comprise determining at least one navigational action for the host vehicle based on mapped representation of the at least one lateral region of free space adjacent to the road segment even where a representation of the at least one lateral region of free space does not appear in the at least one image representative of the environment of the host vehicle. The method may also comprise causing one or more actuator systems associated with the host vehicle to implement the determined at least one navigational action for the host vehicle.

In an embodiment, a system for mapping traffic lights and for determining traffic light relevancy for use in autonomous vehicle navigation may comprise at least one processor. The processor may be programmed to receive, from a first vehicle, at least one location identifier associated with a traffic light detected along a road segment; receive, from the first vehicle, a state identifier associated with the traffic light detected along the road segment; receive, from the first vehicle, navigational information indicative of one or more aspects of motion of the first vehicle along the road segment; determine, based on the navigational information associated with the first vehicle, a lane of travel traversed by the first vehicle along the road segment; determine, based on the navigational information and based on the state identifier received from the first vehicle, whether the traffic light is relevant to the lane of travel traversed by the first vehicle; update an autonomous vehicle road navigation model relative to the road segment, wherein the update is based on the at least one location identifier and based on whether the traffic light is relevant to the lane of travel traversed by the first vehicle; and distribute the updated autonomous vehicle road navigation model to a plurality of autonomous vehicles.

In an embodiment, a system for mapping traffic lights and for determining traffic light relevancy for use in autonomous vehicle navigation may comprise at least one processor. The processor may be programmed to receive, from a first vehicle, at least one location identifier associated with a traffic light detected along a road segment; receive, from the first vehicle, a state identifier associated with the traffic light detected along the road segment; receive, from the first vehicle, navigational information indicative of one or more aspects of motion of the first vehicle along the road segment; determine, based on the navigational information associated with the first vehicle, a lane of travel traversed by the first vehicle along the road segment; determine, based on the navigational information and based on the state identifier received from the first vehicle, whether the traffic light is relevant to the lane of travel traversed by the first vehicle; update an autonomous vehicle road navigation model relative to the road segment, wherein the update is based on the at least one location identifier and based on whether the traffic light is relevant to the lane of travel traversed by the first vehicle; and distribute the updated autonomous vehicle road navigation model to a plurality of autonomous vehicles.

In an embodiment, a system for autonomous vehicle navigation may comprise at least one processor. The processor may be programmed to receive from an image capture device one or more images representative of an environment of a host vehicle; identify, based on analysis of the one or more images, a representation of at least one traffic light in the one or more images; determine a state of the at least one traffic light based on analysis of the one or more images; receive from a server-based system an autonomous vehicle road navigation model, wherein the autonomous vehicle road navigation model includes stored information relating to a plurality of mapped traffic lights associated with a road segment, wherein the stored information correlates each of the plurality of mapped traffic lights with one or more relevant lanes of travel along the road segment; determine whether the at least one traffic light is included in the plurality of mapped traffic lights associated with the autonomous vehicle road navigation model; after determining that the at least one traffic light is included in the plurality of mapped traffic lights associated with the autonomous vehicle road navigation model, determine whether the at least one traffic light is relevant to a current lane of travel of the host vehicle; after determining that the at least one traffic light is relevant to the current lane of travel of the host vehicle, determine at least one navigational action for the host vehicle based on the detected state of the at least one traffic light; and cause one or more actuator systems associated with the host vehicle to implement the determined at least one navigational action for the host vehicle.

In an embodiment, a method for autonomous vehicle navigation may comprise receiving from an image capture device one or more images representative of an environment of a host vehicle; identifying, based on analysis of the one or more images, a representation of at least one traffic light in the one or more images; determining a state of the at least one traffic light based on analysis of the one or more images; receiving from a server-based system an autonomous vehicle road navigation model, wherein the autonomous vehicle road navigation model includes stored information relating to a plurality of mapped traffic lights associated with a road segment, wherein the stored information correlates each of the plurality of mapped traffic lights with one or more relevant lanes of travel along the road segment; determining whether the at least one traffic light is included in the plurality of mapped traffic lights associated with the autonomous vehicle road navigation model; after determining that the at least one traffic light is included in the plurality of mapped traffic lights associated with the autonomous vehicle road navigation model, determining whether the at least one traffic light is relevant to a current lane of travel of the host vehicle; after determining that the at least one traffic light is relevant to the current lane of travel of the host vehicle, determining at least one navigational action for the host vehicle based on the detected state of the at least one traffic light; and causing one or more actuator systems associated with the host vehicle to implement the determined at least one navigational action for the host vehicle.

In an embodiment, a system for mapping traffic lights and associated traffic light cycle times for use in autonomous vehicle navigation may comprise at least one processor. The processor may be programmed to receive, from a first vehicle, at least one location identifier associated with a traffic light detected along a road segment; receive, from the first vehicle, at least one indicator of traffic light state timing associated with the detected traffic light; update an autonomous vehicle road navigation model relative to the road segment, wherein the update is based on the at least one location identifier and based on the at least one indicator of traffic light state timing associated with the traffic light detected along the road segment; and distribute the updated autonomous vehicle road navigation model to a plurality of autonomous vehicles.

In an embodiment, a method for mapping traffic lights and associated traffic light may comprise receiving, from a first vehicle, at least one location identifier associated with a traffic light detected along a road segment; receiving, from the first vehicle, at least one indicator of traffic light state timing associated with the detected traffic light; updating an autonomous vehicle road navigation model relative to the road segment, wherein the update is based on the at least one location identifier and based on the at least one indicator of traffic light state timing associated with the traffic light detected along the road segment; and distributing the updated autonomous vehicle road navigation model to a plurality of autonomous vehicles.

In an embodiment, a system for autonomous vehicle navigation may comprise at least one processor. The processor may be programmed to receive from an image capture device one or more images representative of an environment of a host vehicle; identify, based on analysis of the one or more images, a representation of at least one traffic light in the one or more images; determine a state of the at least one traffic light based on analysis of the one or more images; receive from a server-based system an autonomous vehicle road navigation model, wherein the autonomous vehicle road navigation model includes stored information relating to a plurality of mapped traffic lights associated with a road segment, wherein the stored information provides one or more indicators of traffic light state timing for each of the plurality of mapped traffic lights; determine, based on the autonomous vehicle road navigation model, at least one timing aspect associated with the determined state of the at least one traffic light state; determine at least one navigational action for the host vehicle based on the determined at least one timing aspect associated with the determined state of the at least one traffic light state; and cause one or more actuator systems associated with the host vehicle to implement the determined at least one navigational action for the host vehicle.

In an embodiment, a method for autonomous vehicle navigation may comprise receiving from an image capture device one or more images representative of an environment of a host vehicle; identifying, based on analysis of the one or more images, a representation of at least one traffic light in the one or more images; determining a state of the at least one traffic light based on analysis of the one or more images; receiving from a server-based system an autonomous vehicle road navigation model, wherein the autonomous vehicle road navigation model includes stored information relating to a plurality of mapped traffic lights associated with a road segment, wherein the stored information provides one or more indicators of traffic light state timing for each of the plurality of mapped traffic lights; determining, based on the autonomous vehicle road navigation model, at least one timing aspect associated with the determined state of the at least one traffic light state; determining at least one navigational action for the host vehicle based on the determined at least one timing aspect associated with the determined state of the at least one traffic light state; and causing one or more actuator systems associated with the host vehicle to implement the determined at least one navigational action for the host vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 22 illustrates a process of clustering vehicle trajectories associated with vehicles, consistent with the disclosed embodiments.

FIG. 25A shows an exemplary image of a vehicle's surrounding environment for navigation based on the mapped lane marks consistent with the disclosed embodiments.

FIG. 34 is a flowchart showing an exemplary process for mapping road segment free spaces, consistent with the disclosed embodiments.

FIG. 35 is a flowchart showing an exemplary process for autonomously navigating a host vehicle along a road segment, consistent with the disclosed embodiments.

DETAILED DESCRIPTION

Figure 1:
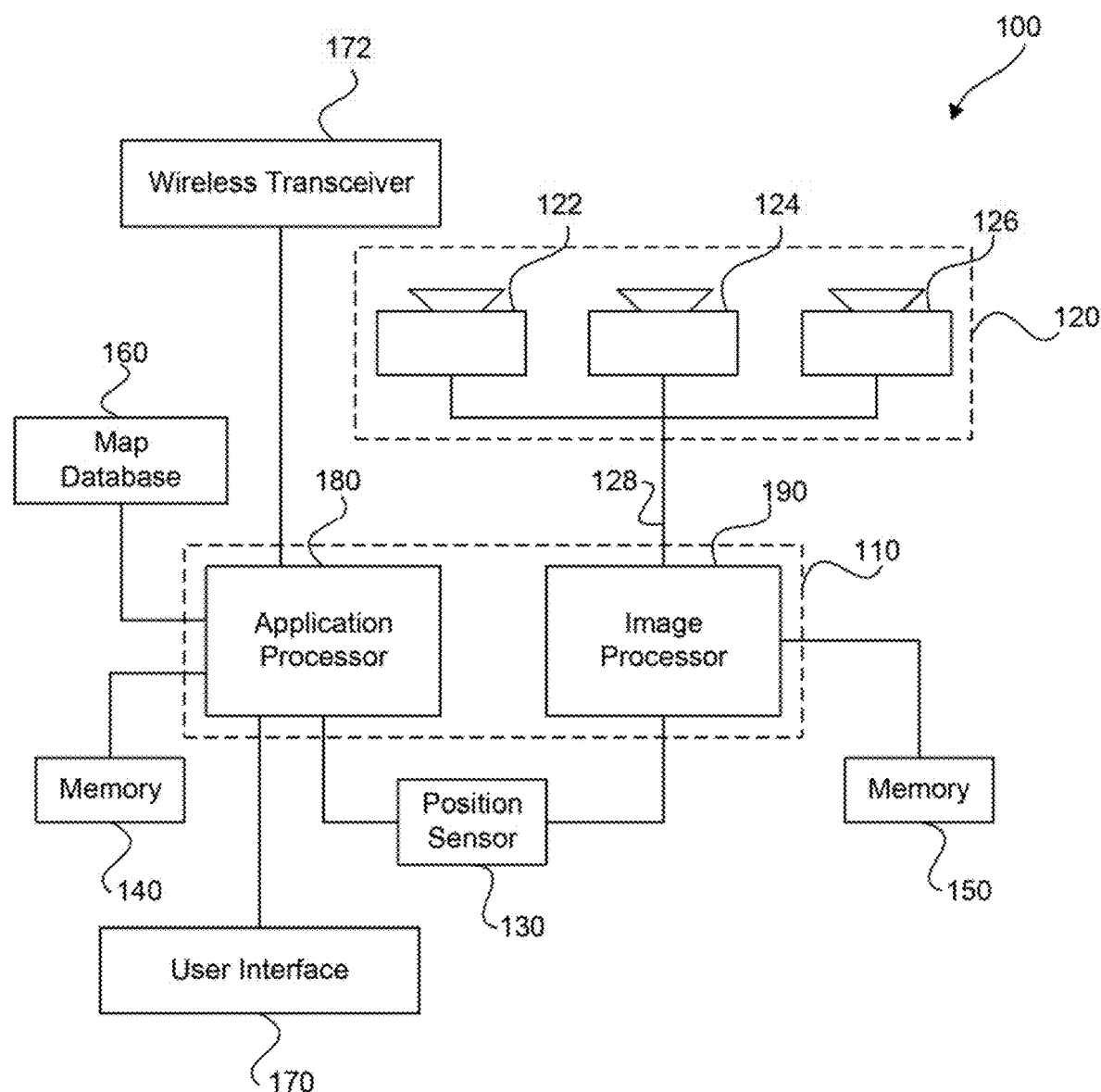
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, followed by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
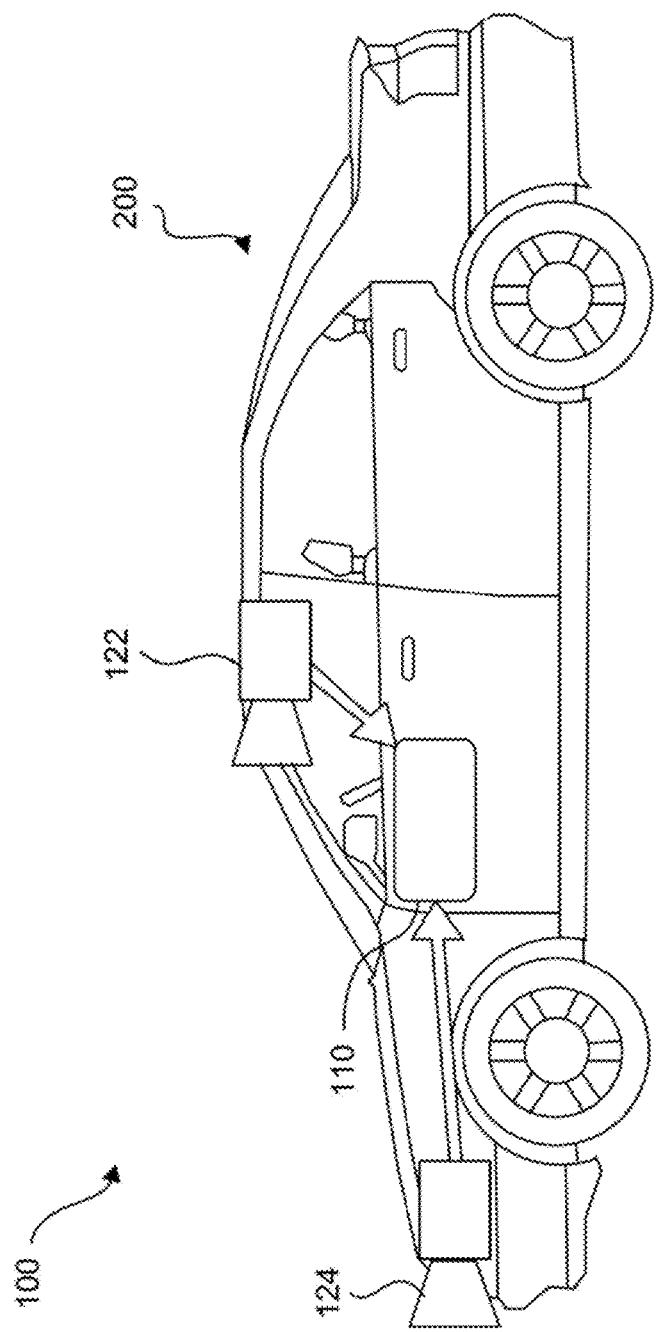
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
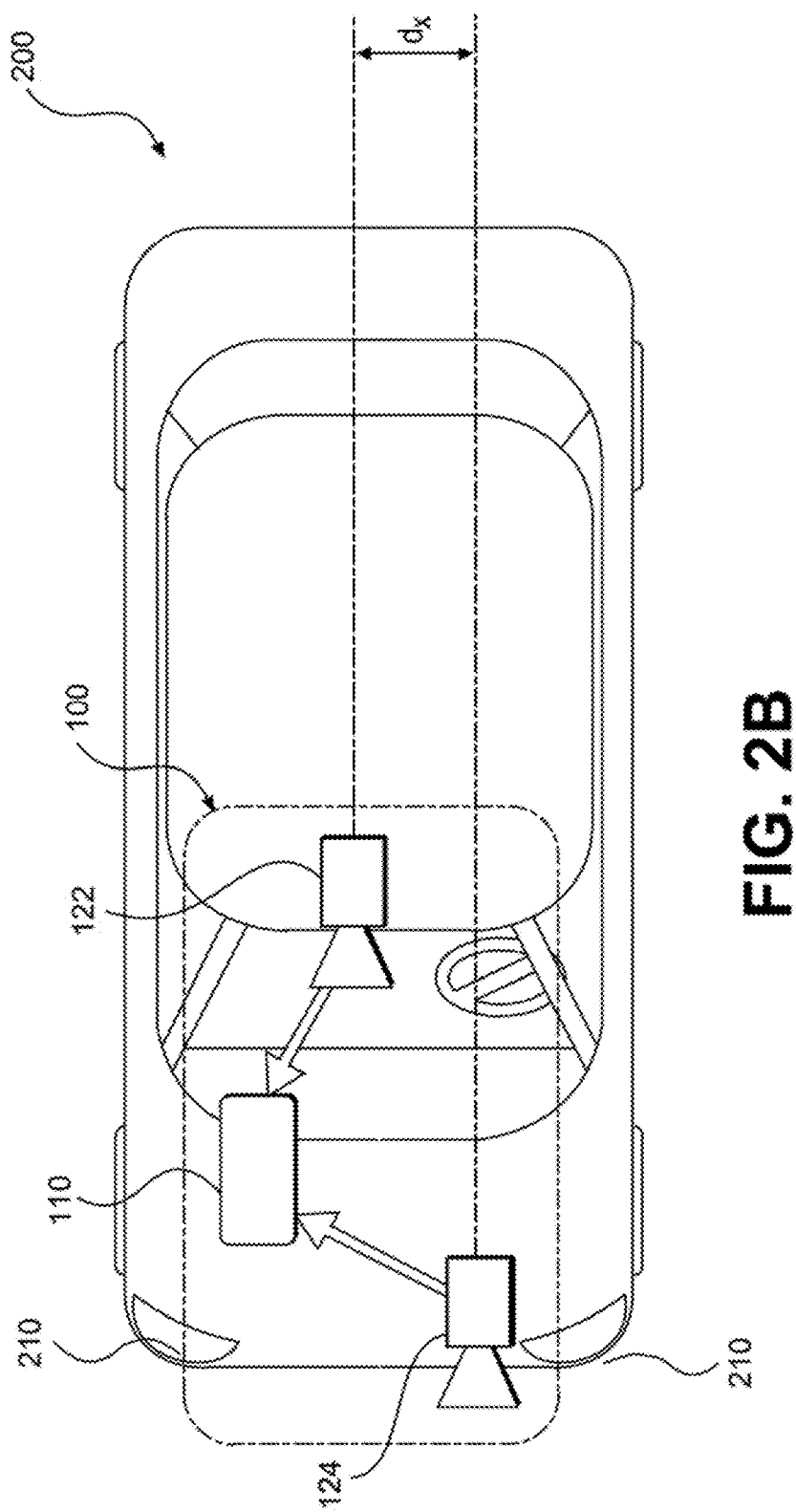
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 10.

Figure 2C:
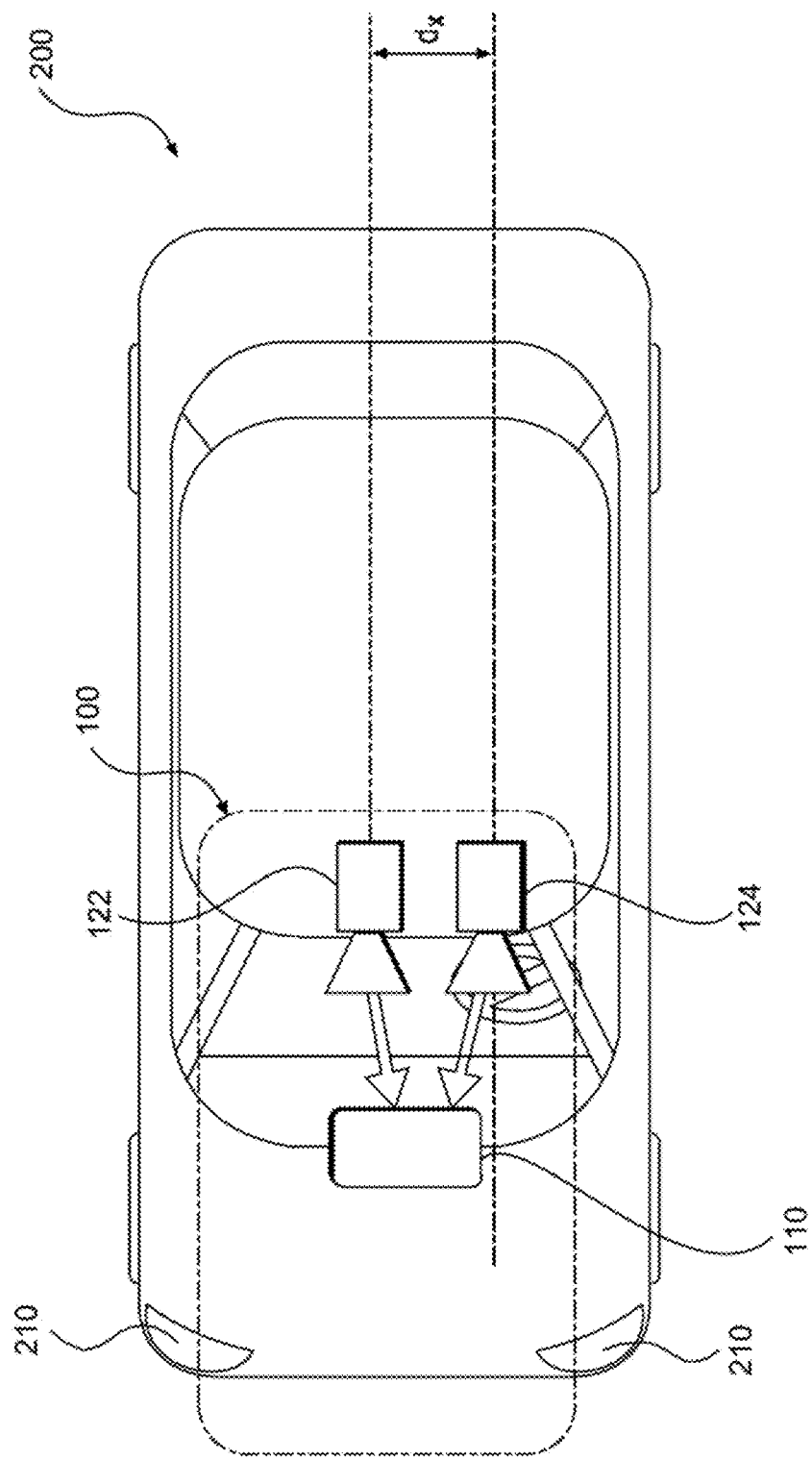
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
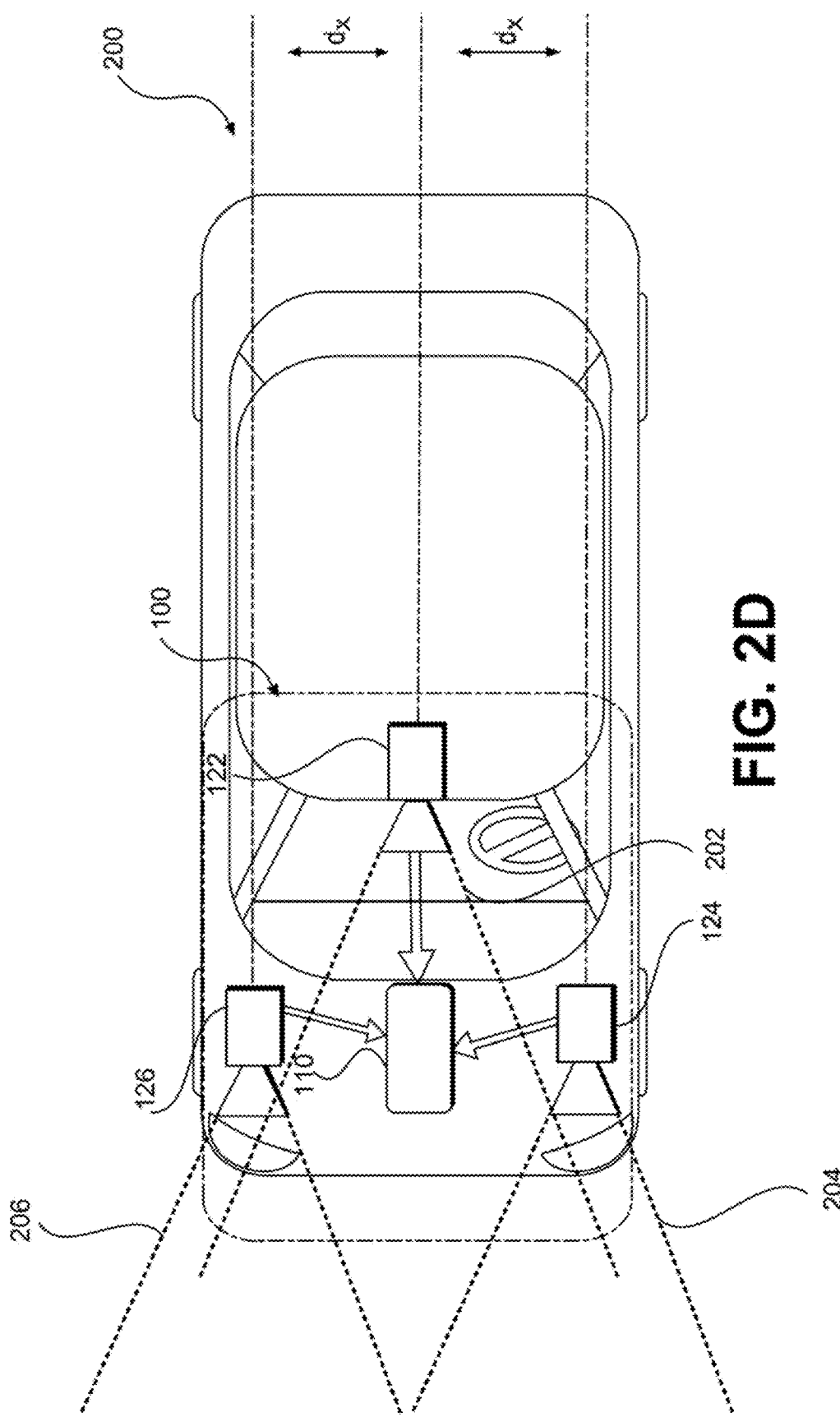
FIG. 2D is a diagrammatic top view representation of yet another embodiment of a vehicle including a system consistent with the disclosed embodiments.
Figure 2E:
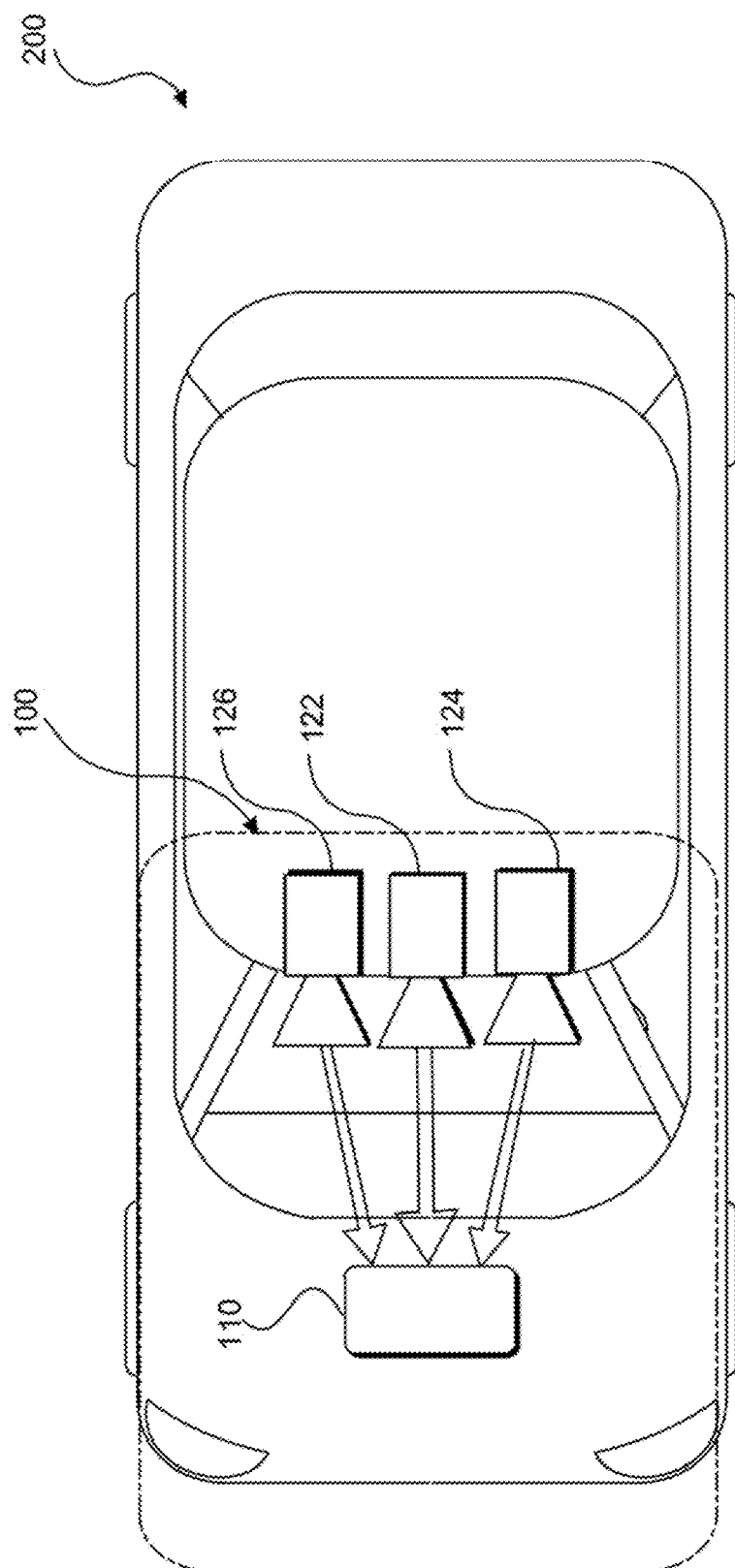
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2 M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5 M pixel, 7 M pixel, 10 M pixel, or greater.

The use of a rolling shutter may result in pixels indifferent rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire POV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

46) Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the tuning of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent POVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
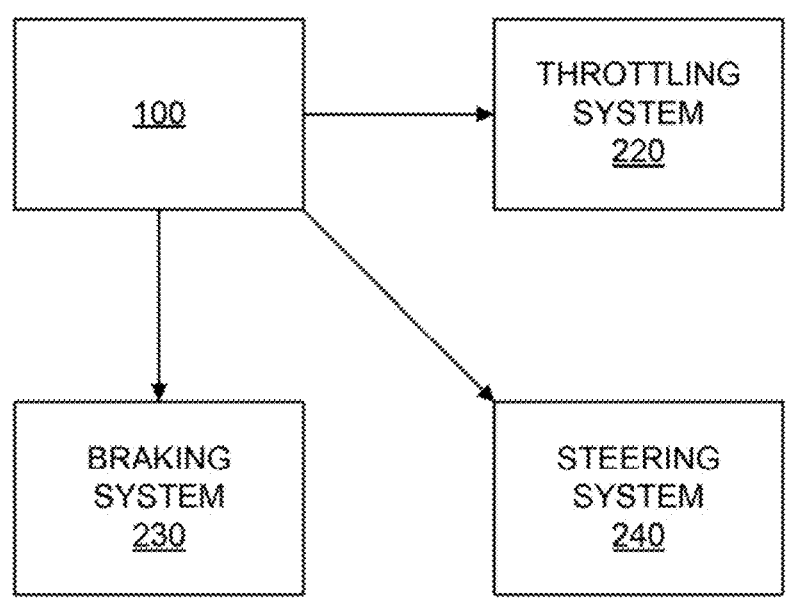
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
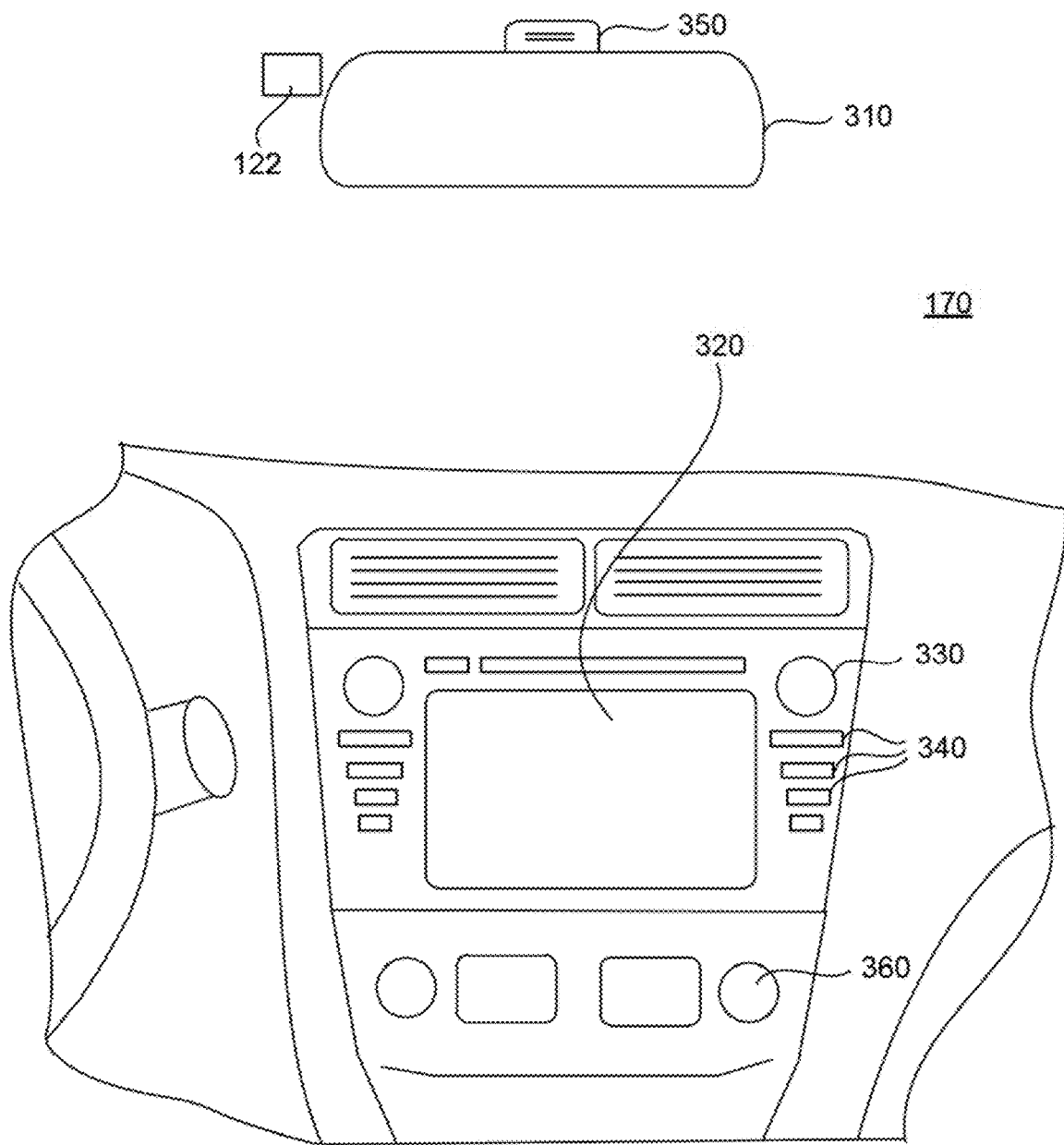
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
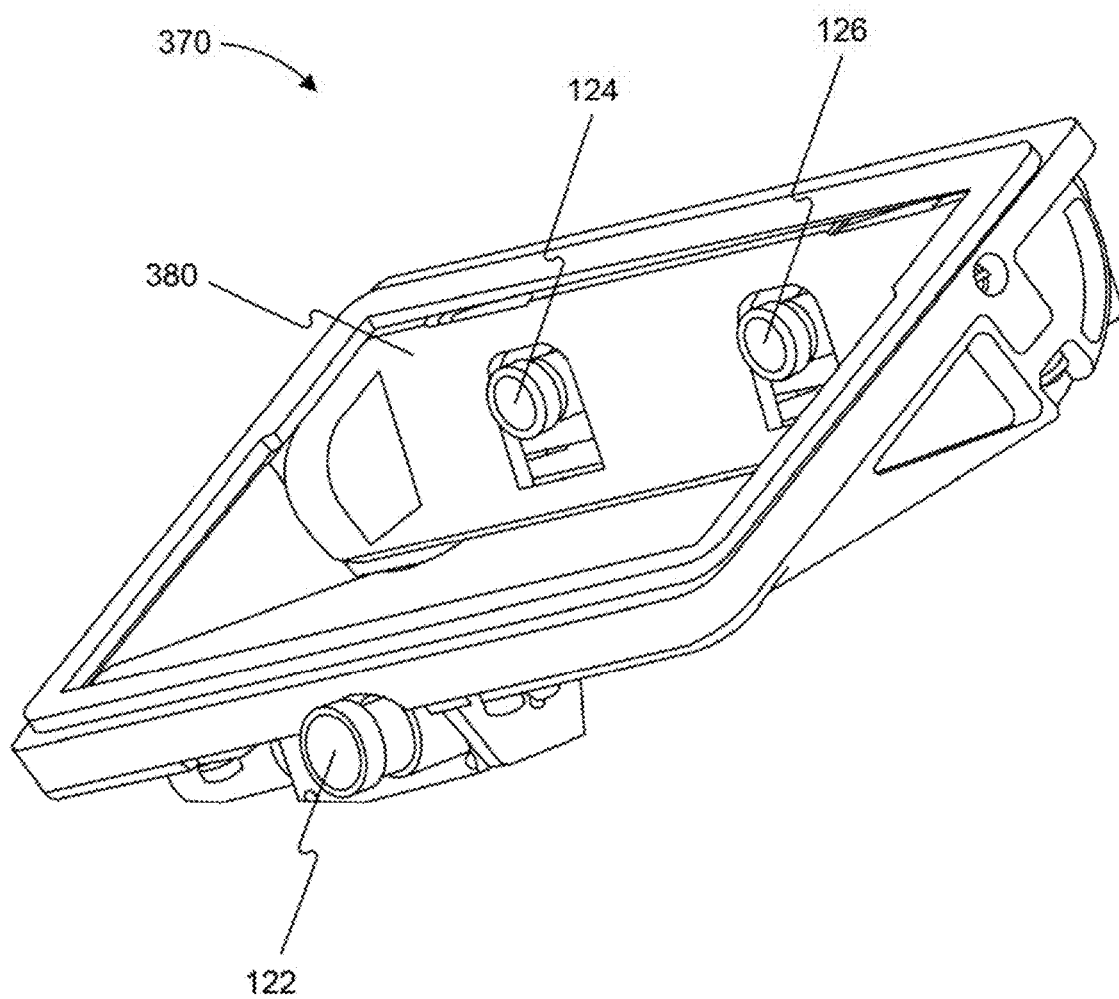
FIG. 3B is an illustration of an example of a camera mount that is configured to be positioned behind a rearview mirror and against a vehicle windshield consistent with the disclosed embodiments.
Figure 3C:
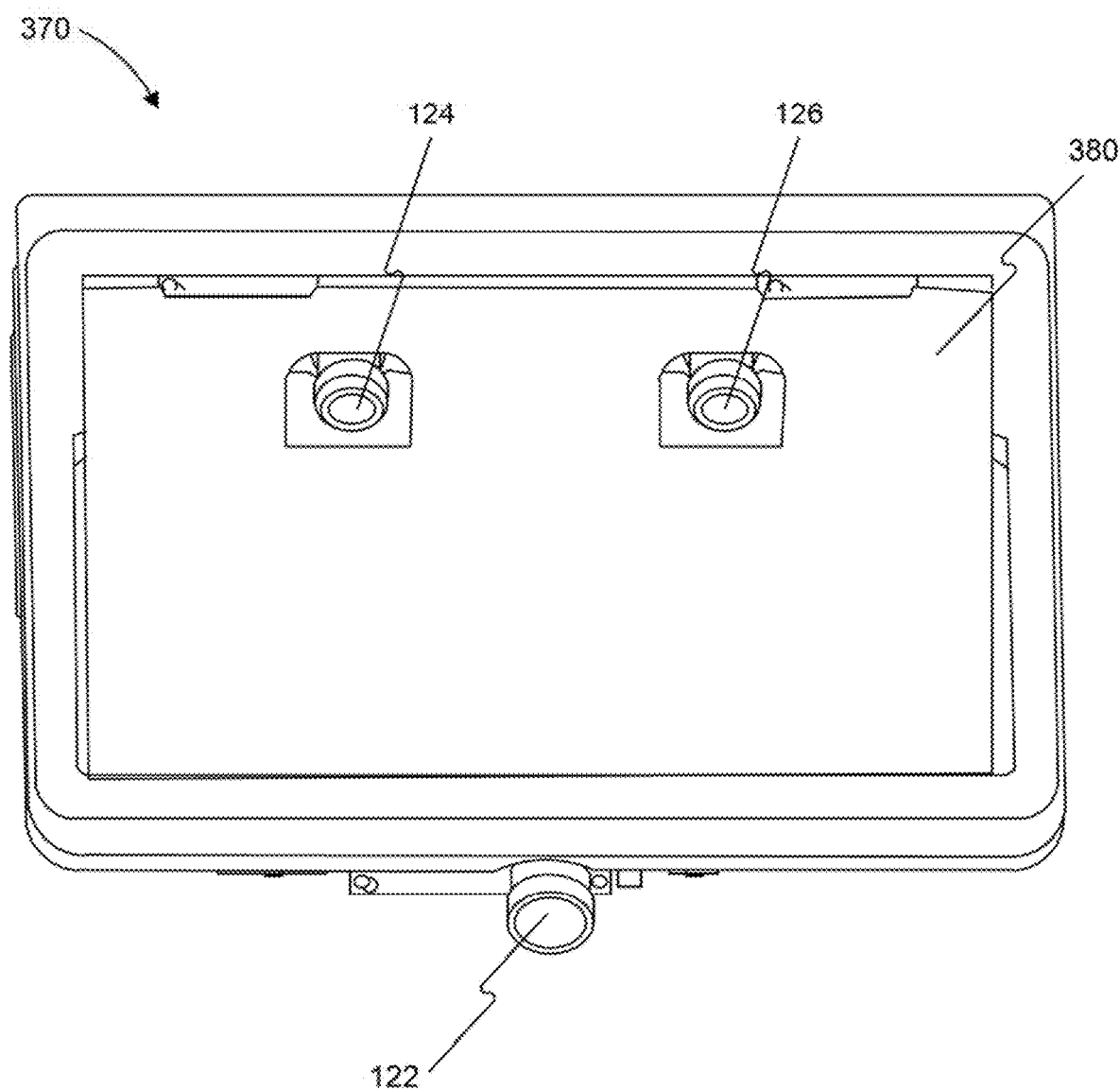
FIG. 3C is an illustration of the camera mount shown in FIG. 3B from a different perspective consistent with the disclosed embodiments.
Figure 3D:
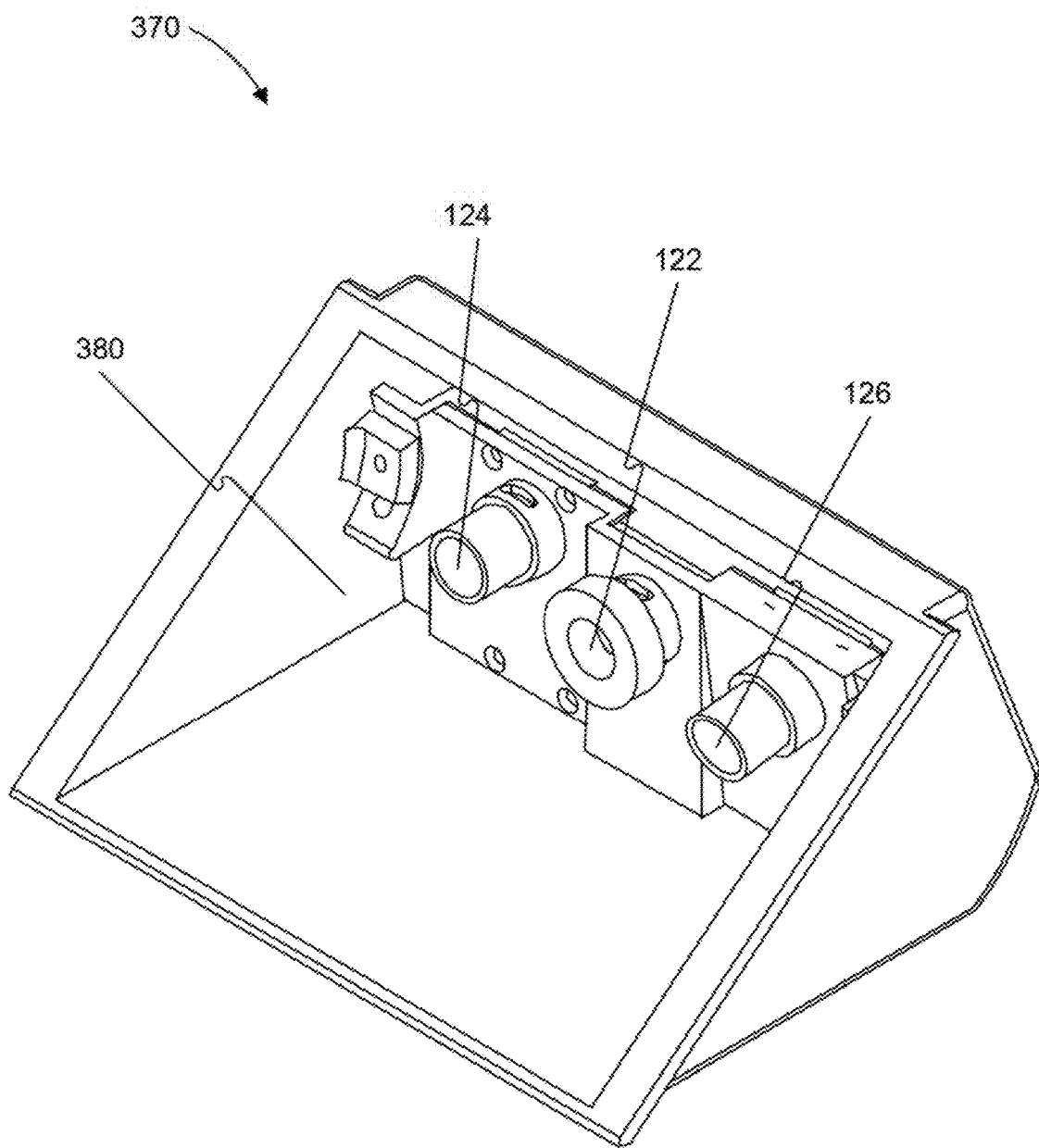
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
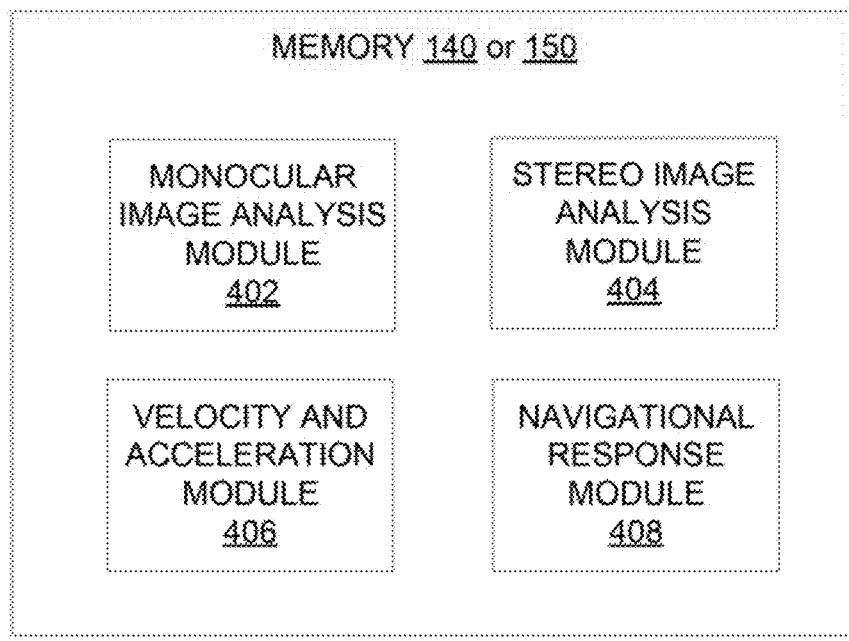
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. SA-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
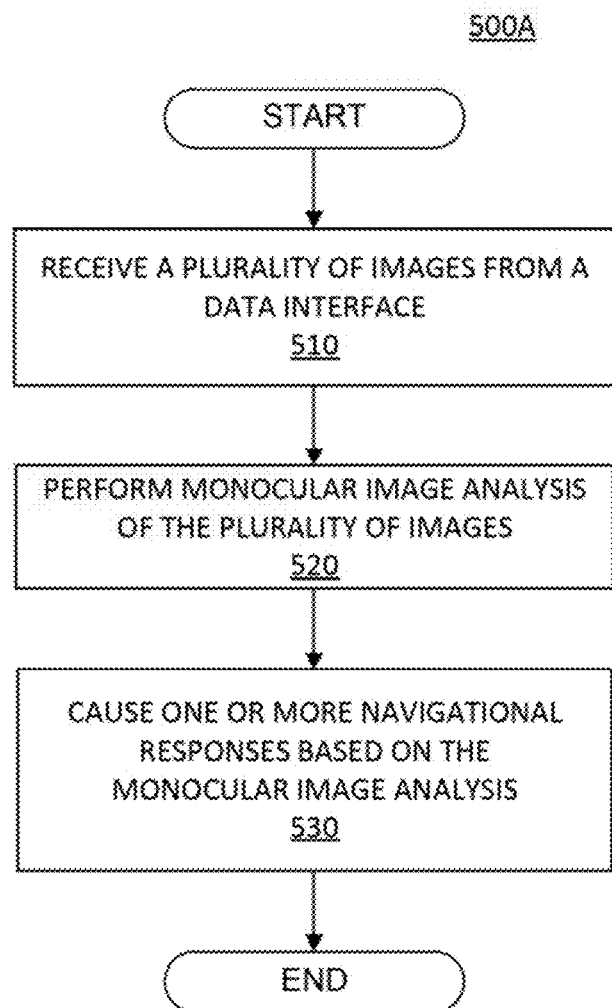
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
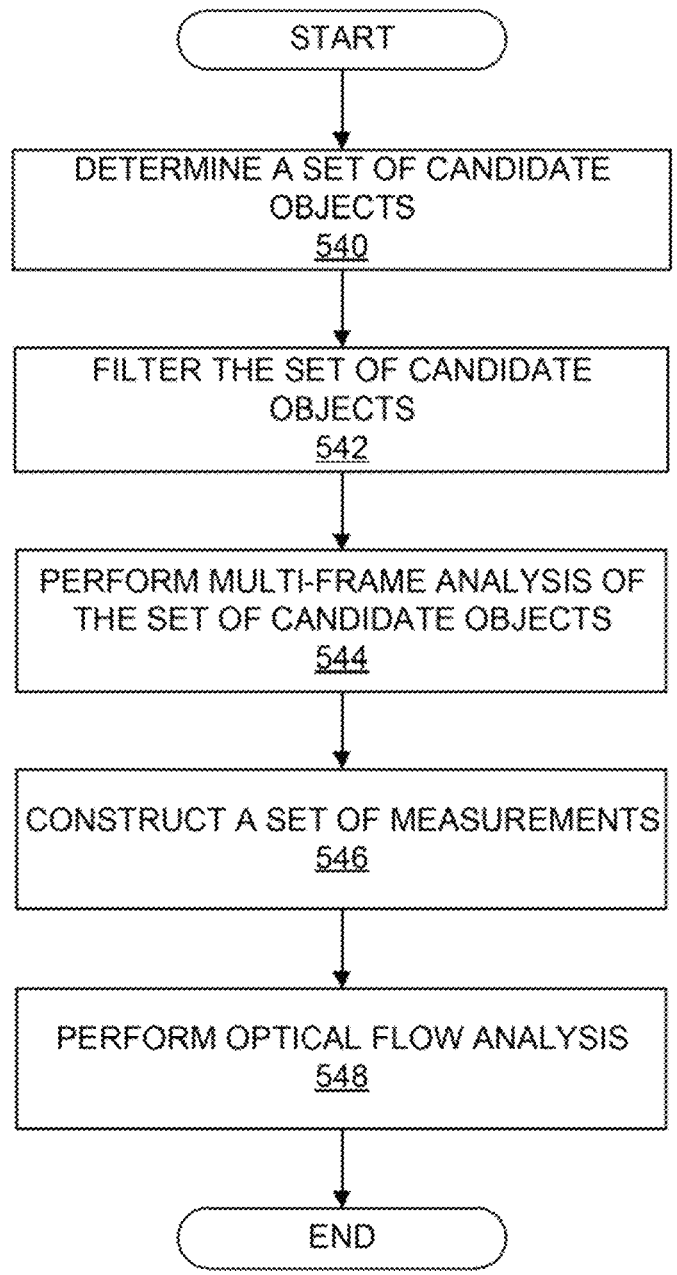
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
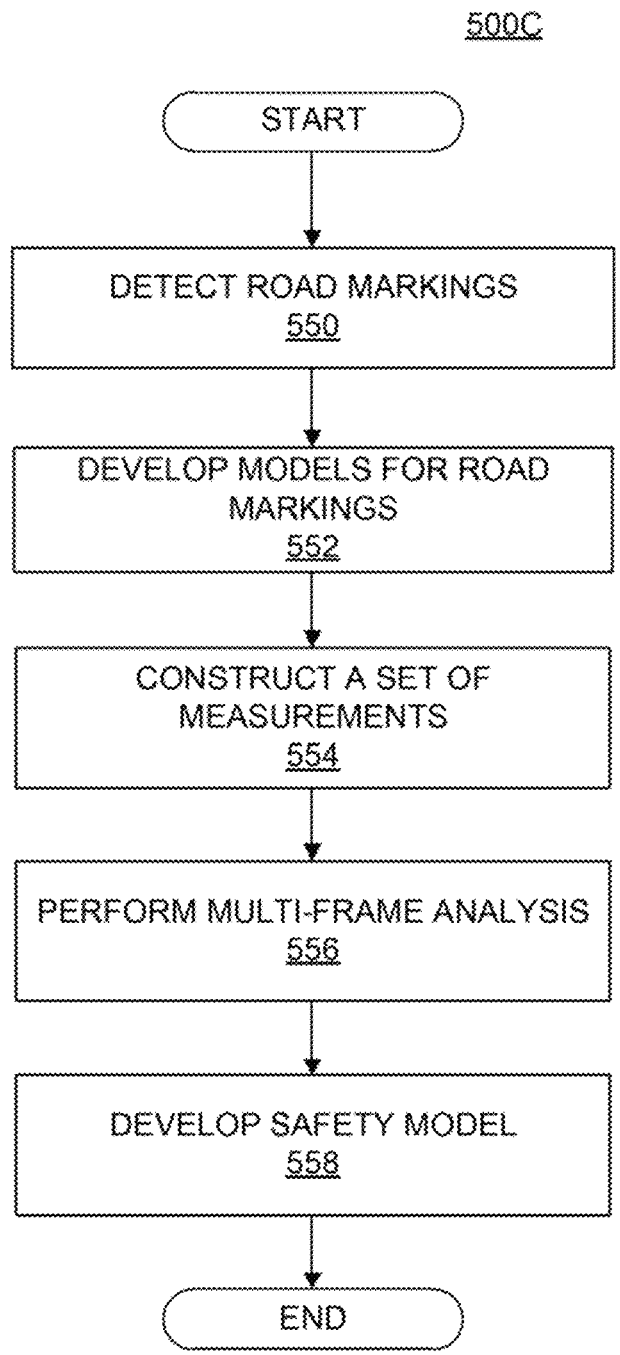
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
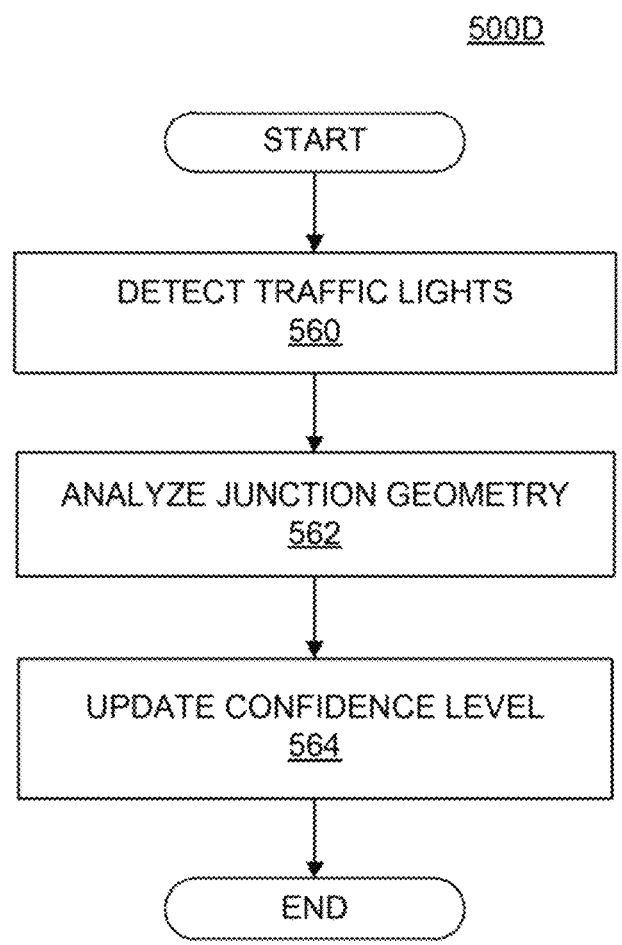
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
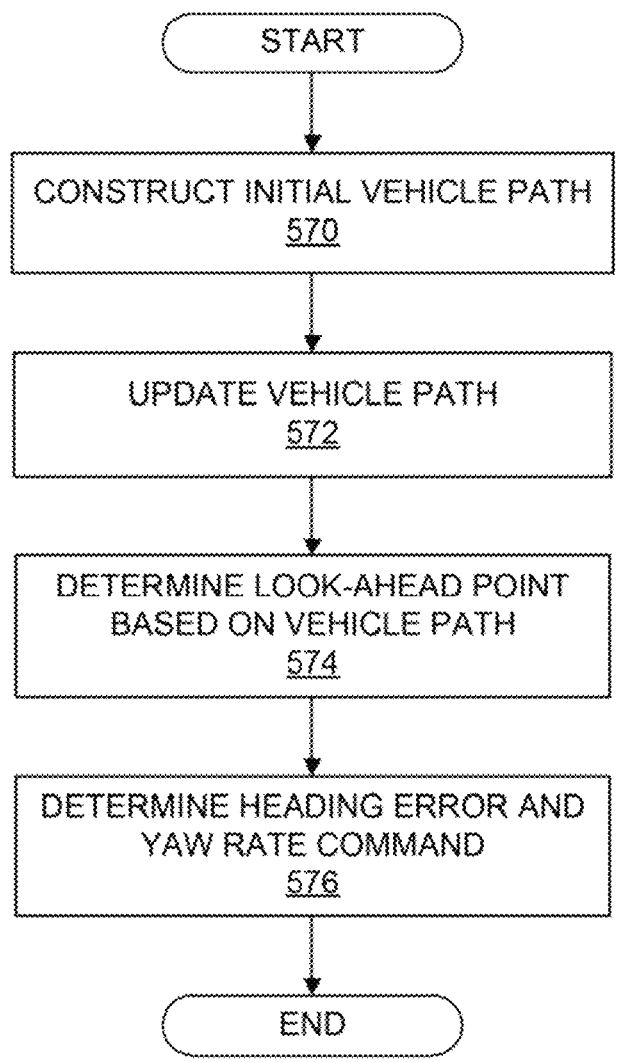
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance d between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
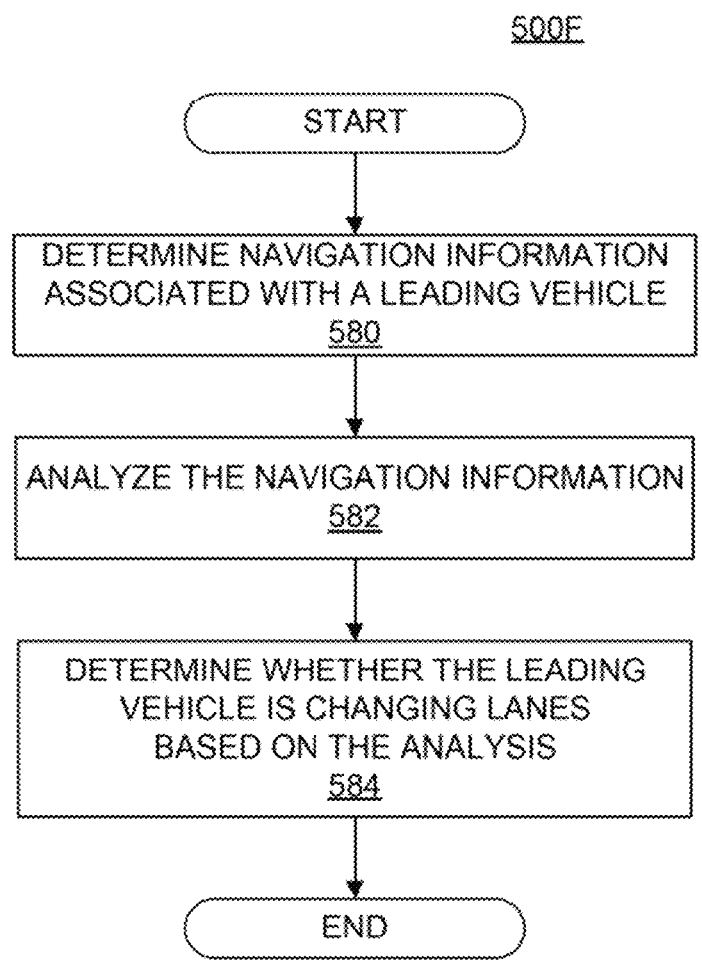
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
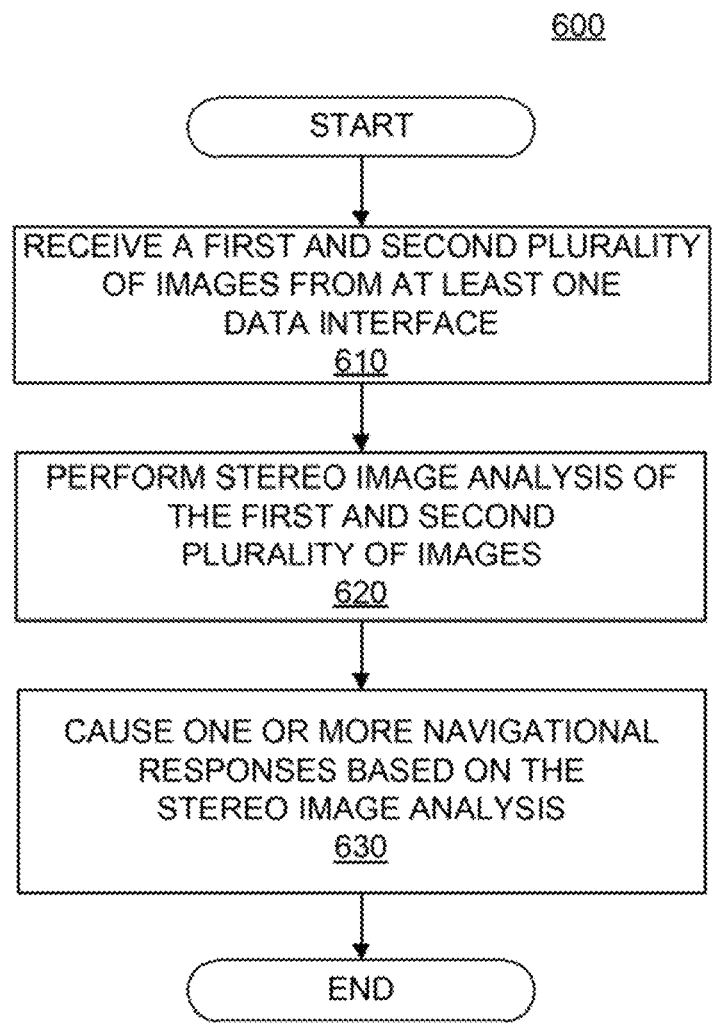
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 10 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
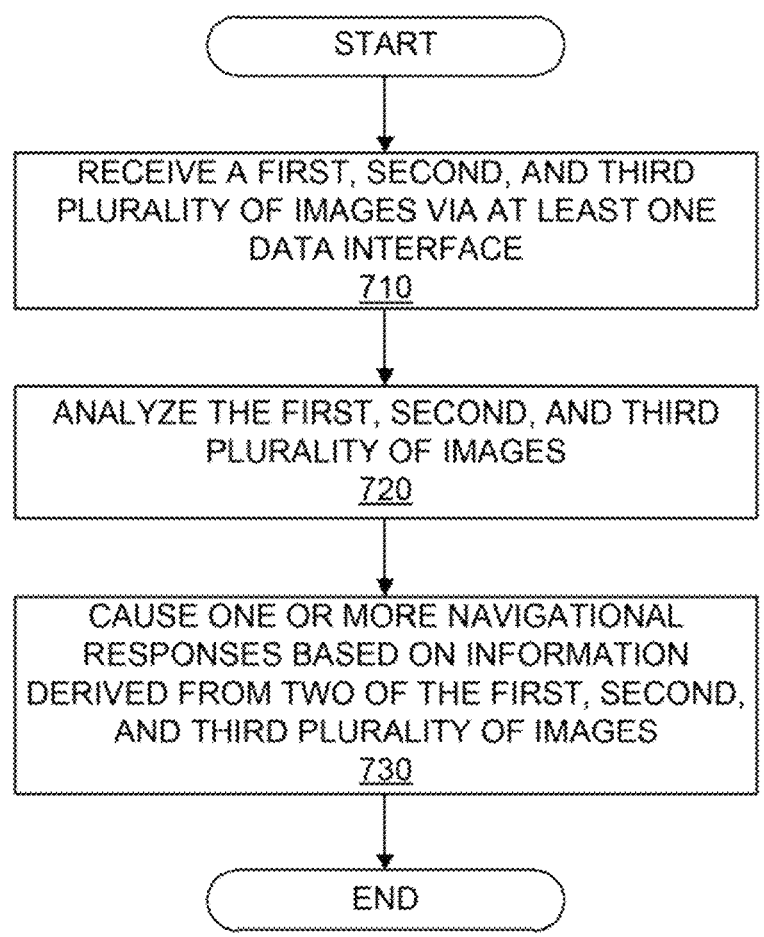
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8:
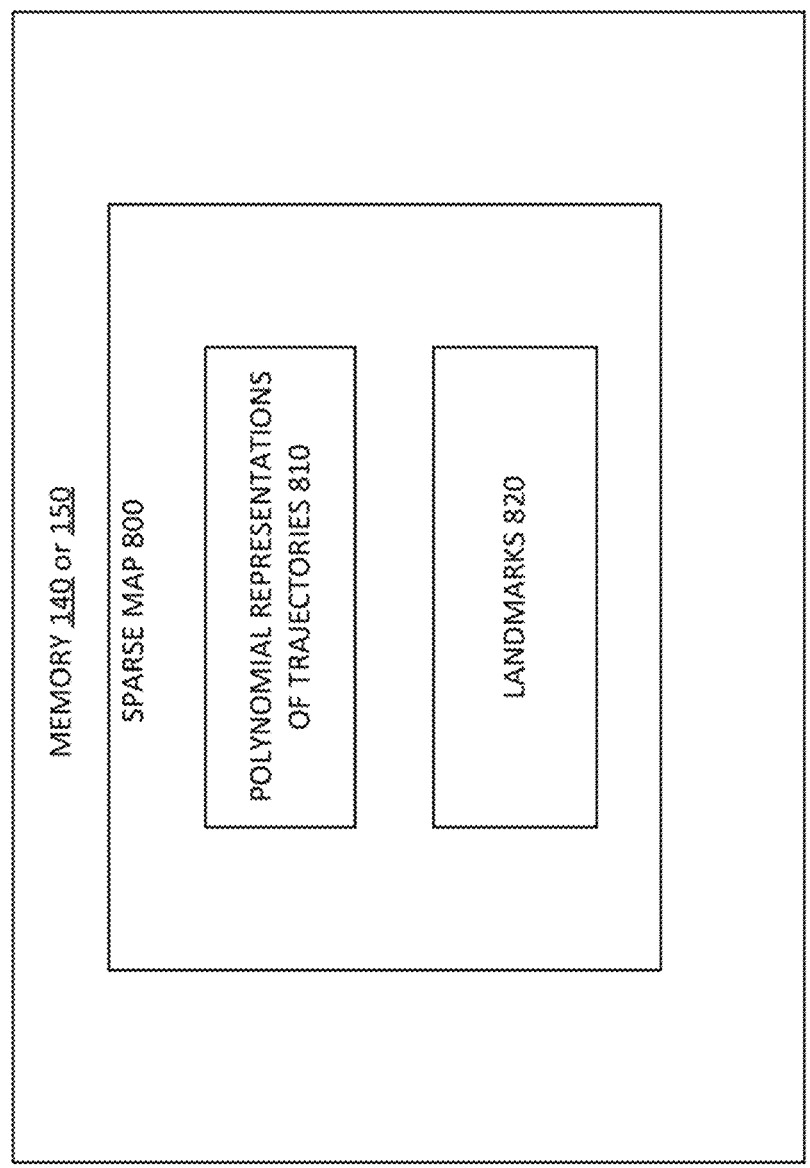
FIG. 8 shows a sparse map for providing autonomous vehicle navigation, consistent with the disclosed embodiments.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remote server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps that may be used in navigating a vehicle. Such sub-maps may be referred to as local maps, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

In general, sparse map 800 may be generated based on data collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of during navigation by dead reckoning may be minimized.

Figure 9A:
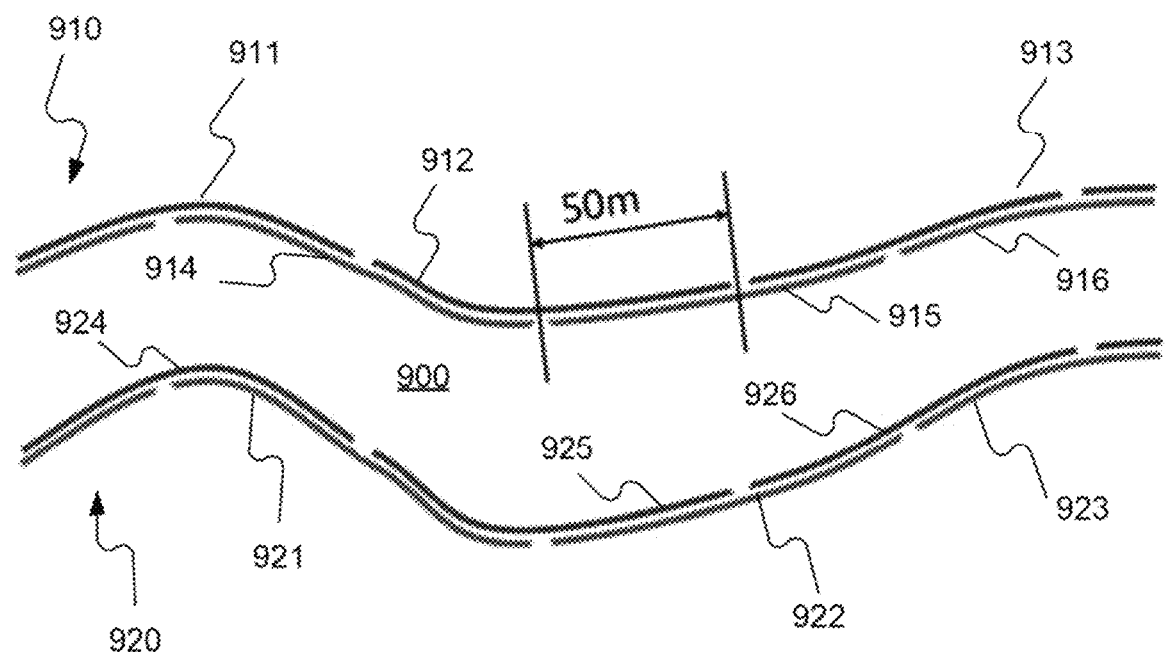
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913. The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
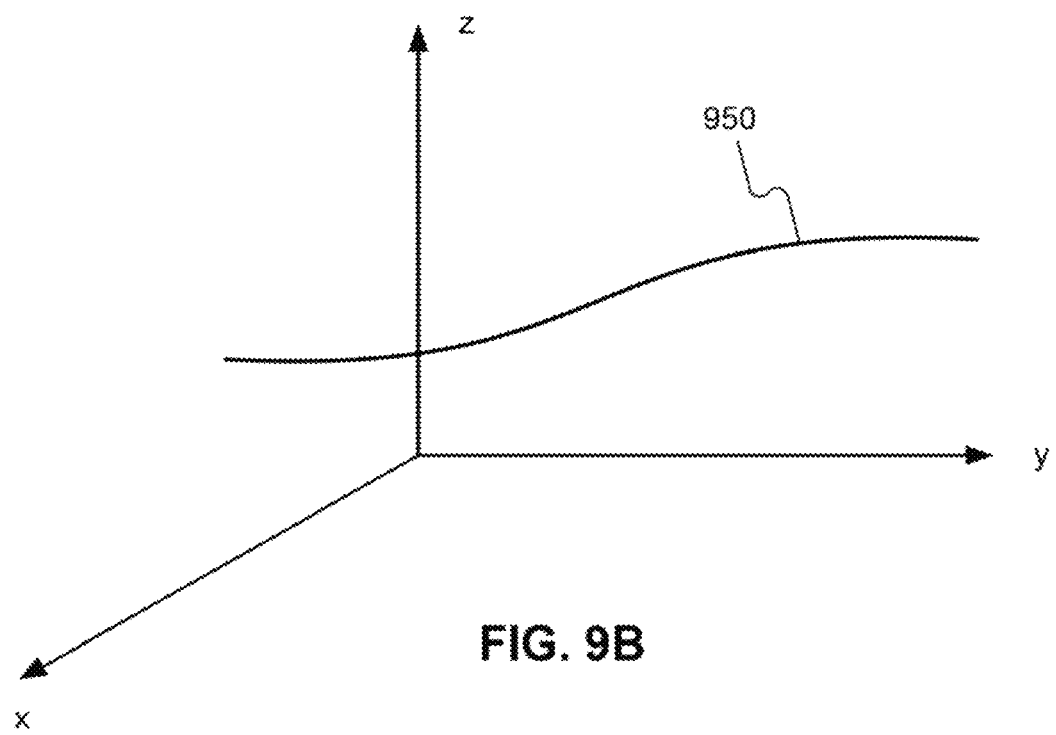
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
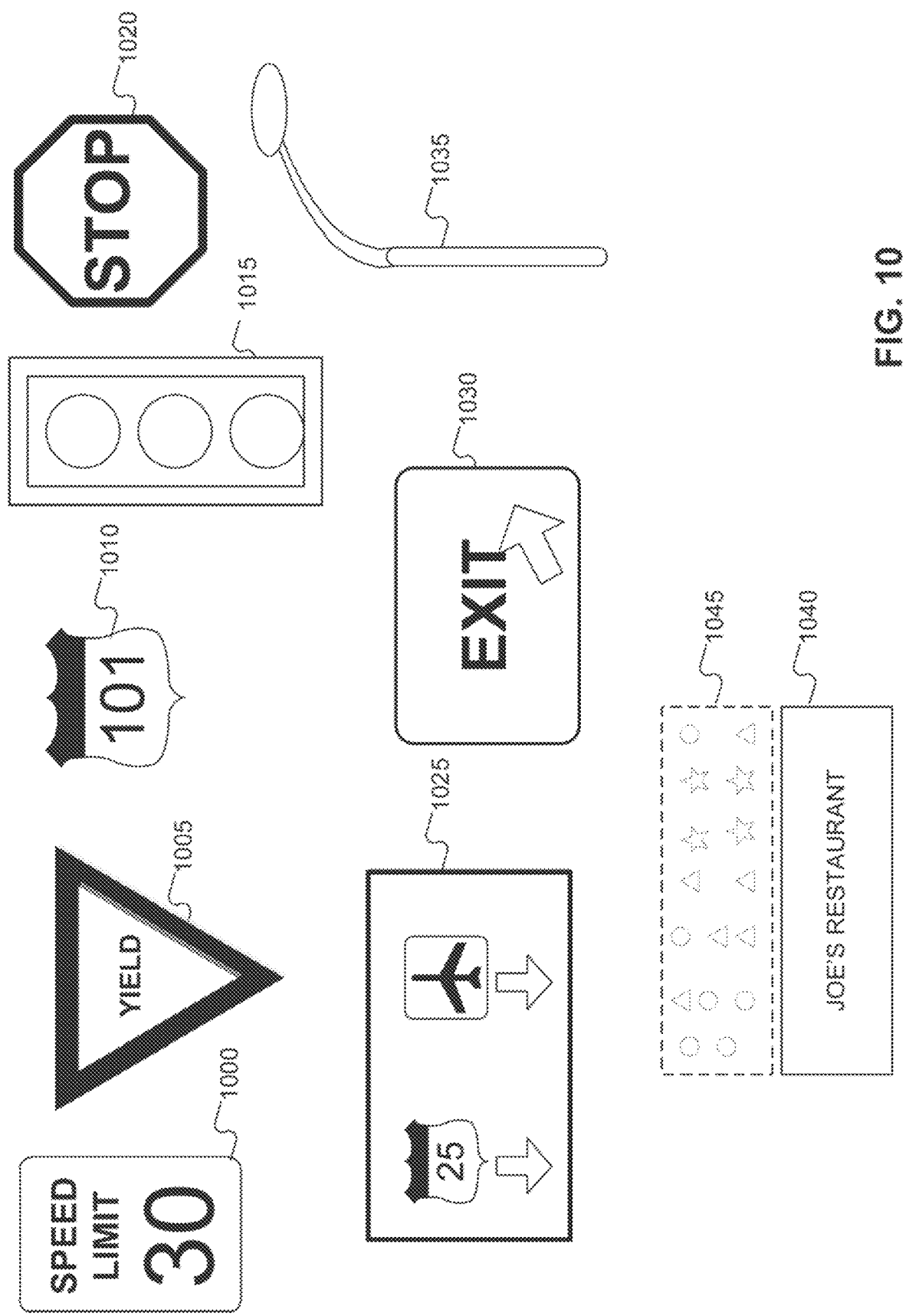
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type-what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used.

Representing landmarks in sparse map 800 in this manner may offer a lean solution for efficiently representing landmarks in the database. In some embodiments, signs may be referred to as semantic signs and non-semantic signs. A semantic sign may include any class of signs for which there's a standardized meaning (e.g., speed limit signs, warning signs, directional signs, etc.). A non-semantic sign may include any sign that is not associated with a standardized meaning (e.g., general advertising signs, signs identifying business establishments, etc.). For example, each semantic sign may be represented with 38 bytes of data (e.g., 8 bytes for size; 12 bytes for distance to previous landmark, lateral offset, and height; 2 bytes for a type code; and 16 bytes for GPS coordinates). Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr.

In some embodiments, a generally rectangular object, such as a rectangular sign, may be represented in sparse map 800 by no more than 100 bytes of data. The representation of the generally rectangular object (e.g., general sign 1040) in sparse map 800 may include a condensed image signature (e.g., condensed image signature 1045) associated with the generally rectangular object. This condensed image signature may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
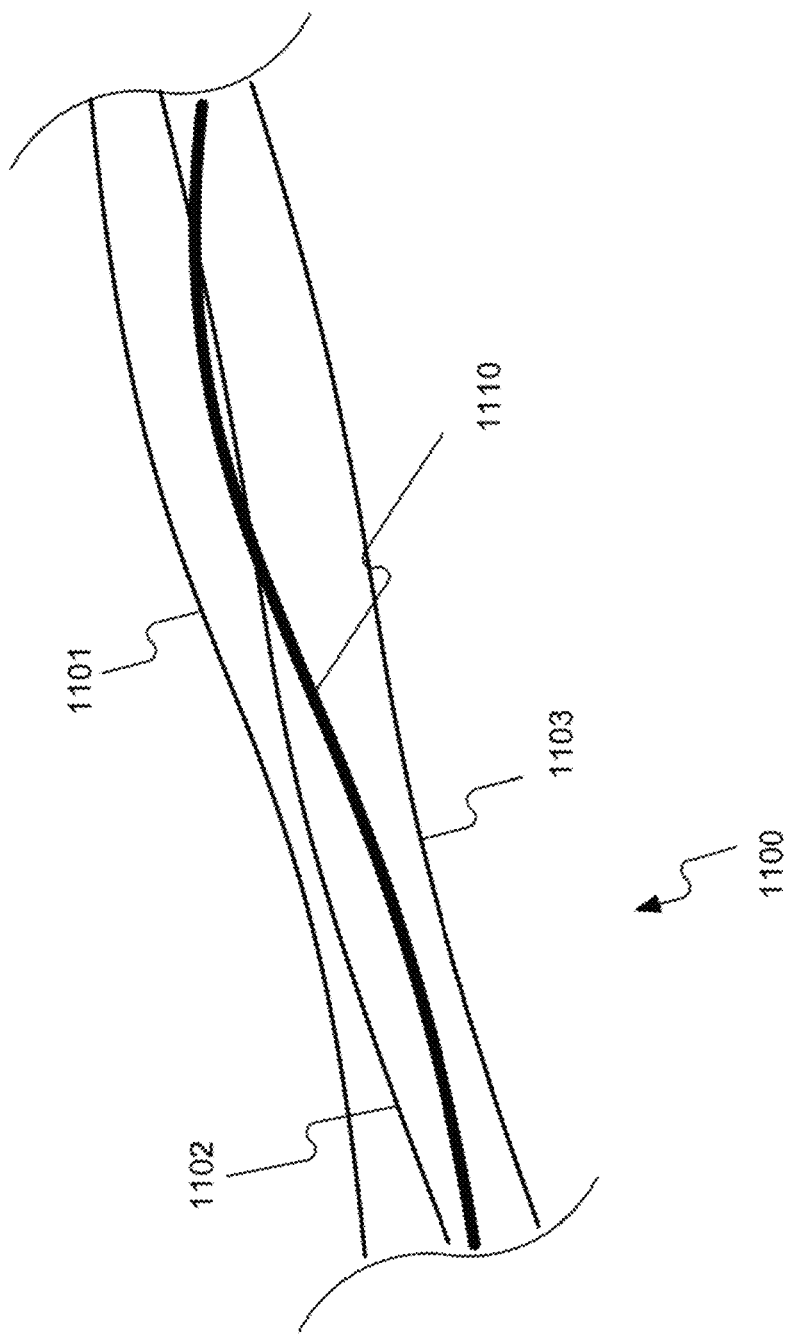
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 1A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

Figure 11B:
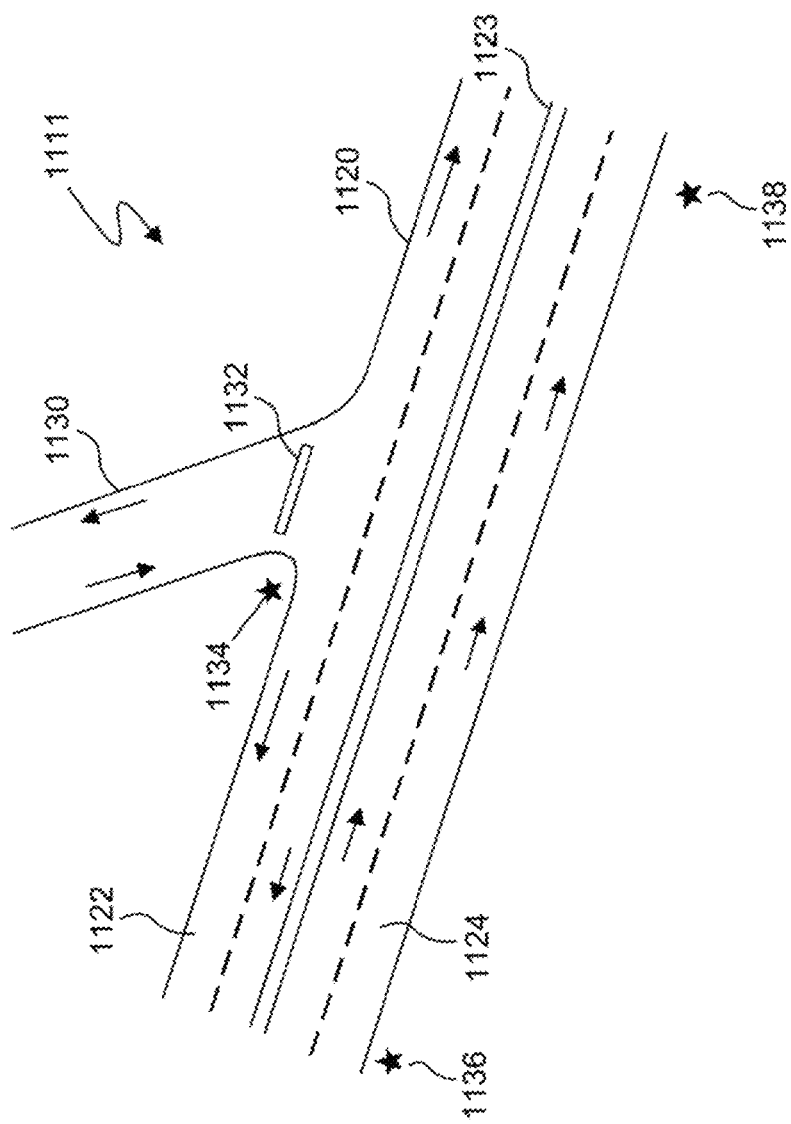
FIGS. 11B and 11C show target trajectories along a multi-lane road consistent with disclosed embodiments.
Figure 11C:
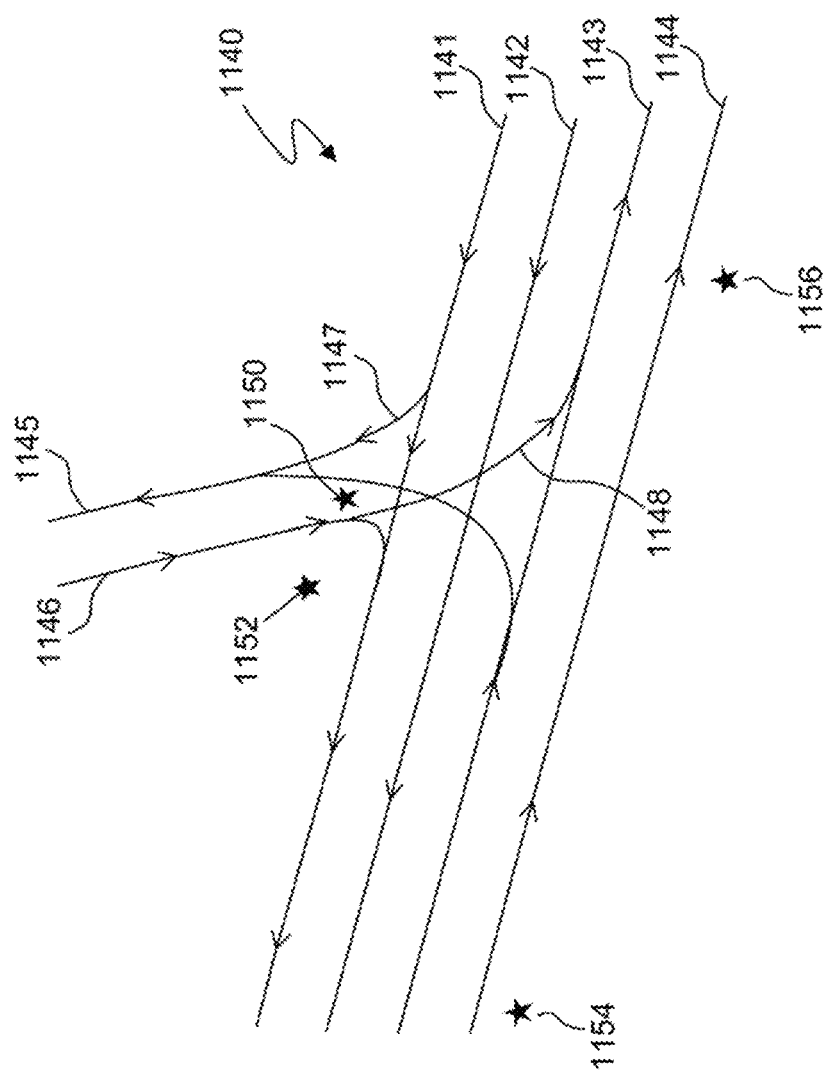

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 1C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
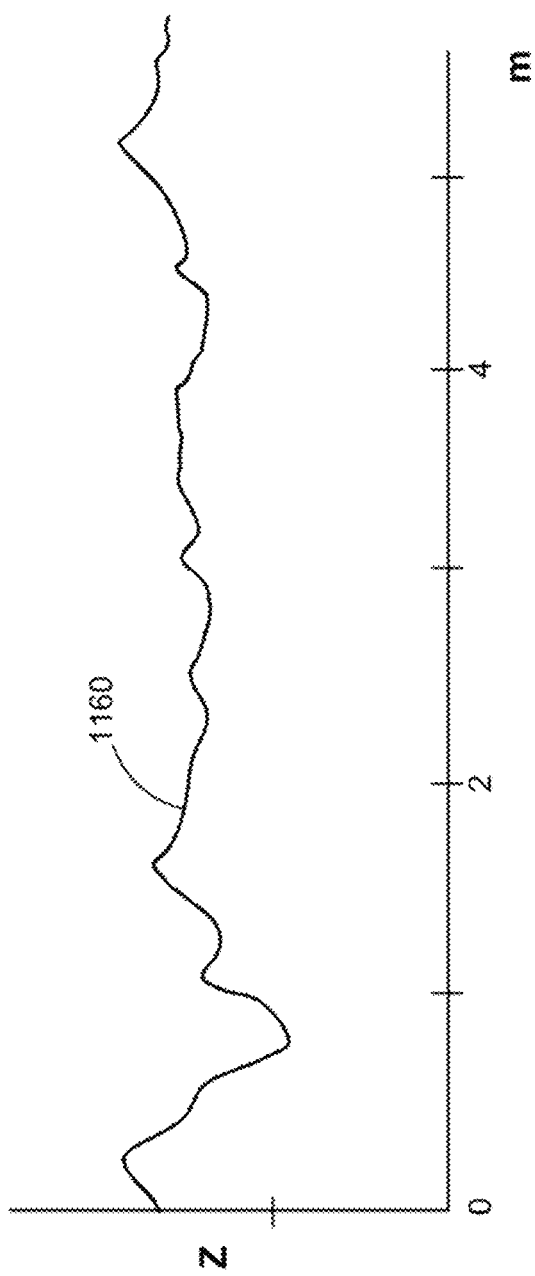
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

In some embodiments, the disclosed systems and methods may generate a sparse map for autonomous vehicle navigation. For example, disclosed systems and methods may use crowdsourced data for generation of a sparse that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model. The model may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark based on the analysis of the one or more images. In some embodiments, the distance may be determined based on analysis of images of the landmark using a suitable image analysis method, such as a scaling method and/or an optical flow method. In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, other vehicles may capture an image of the landmark, process the image (e.g., using a classifier), and compare the result from processing the image to the indication stored in the server with regard to the type of landmark. There may be various types of landmarks, and different types of landmarks may be associated with different types of data to be uploaded to and stored in the server, different processing onboard the vehicle may detects the landmark and communicate information about the landmark to the server, and the system onboard the vehicle may receive the landmark data from the server and use the landmark data for identifying a landmark in autonomous navigation.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
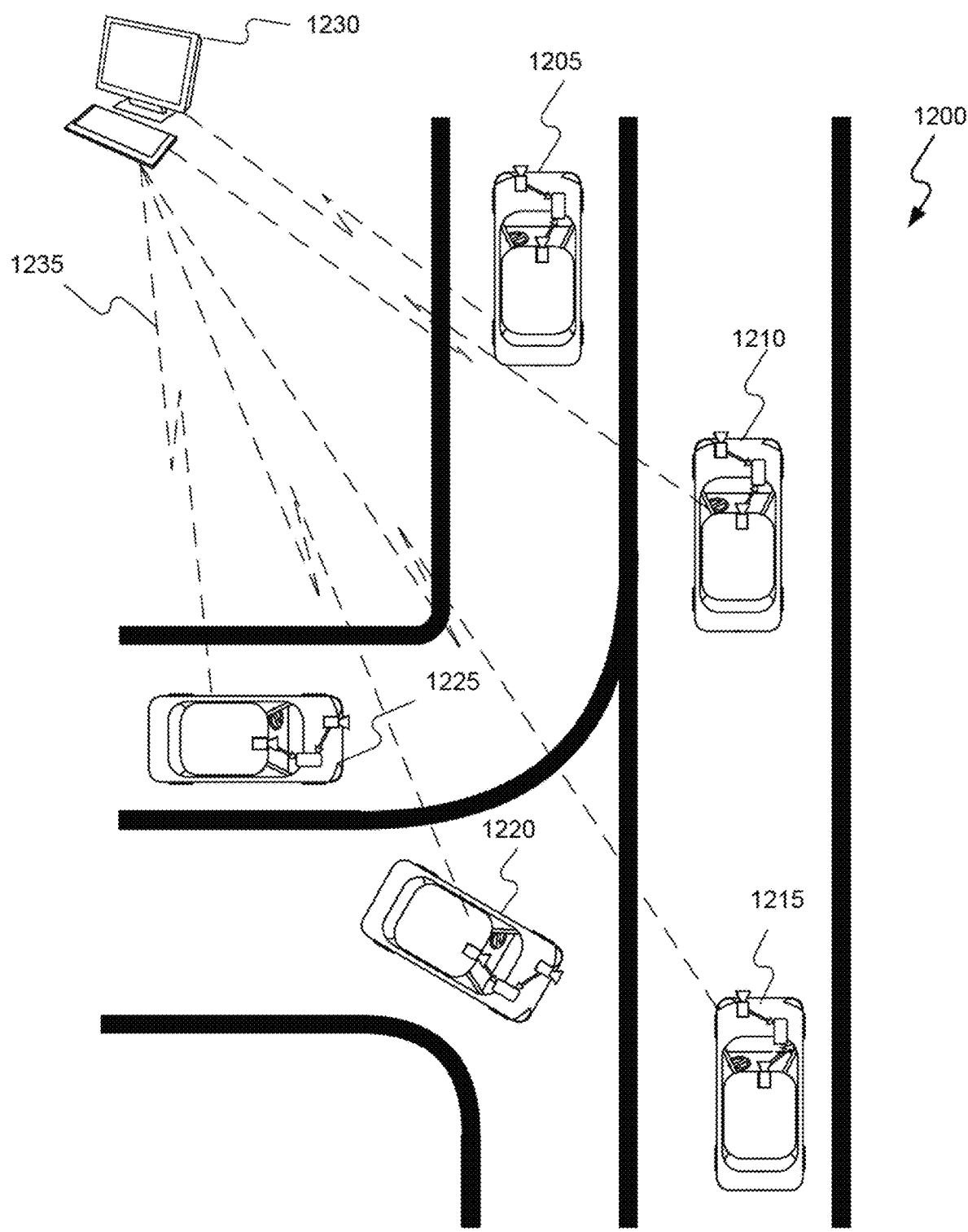
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourcing to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+f*\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta\omega/\omega^2+f*\Delta W/\omega$. However, $\Delta W$ decays to zero by averaging; hence $\Delta Z$ is determined by $\Delta\omega$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
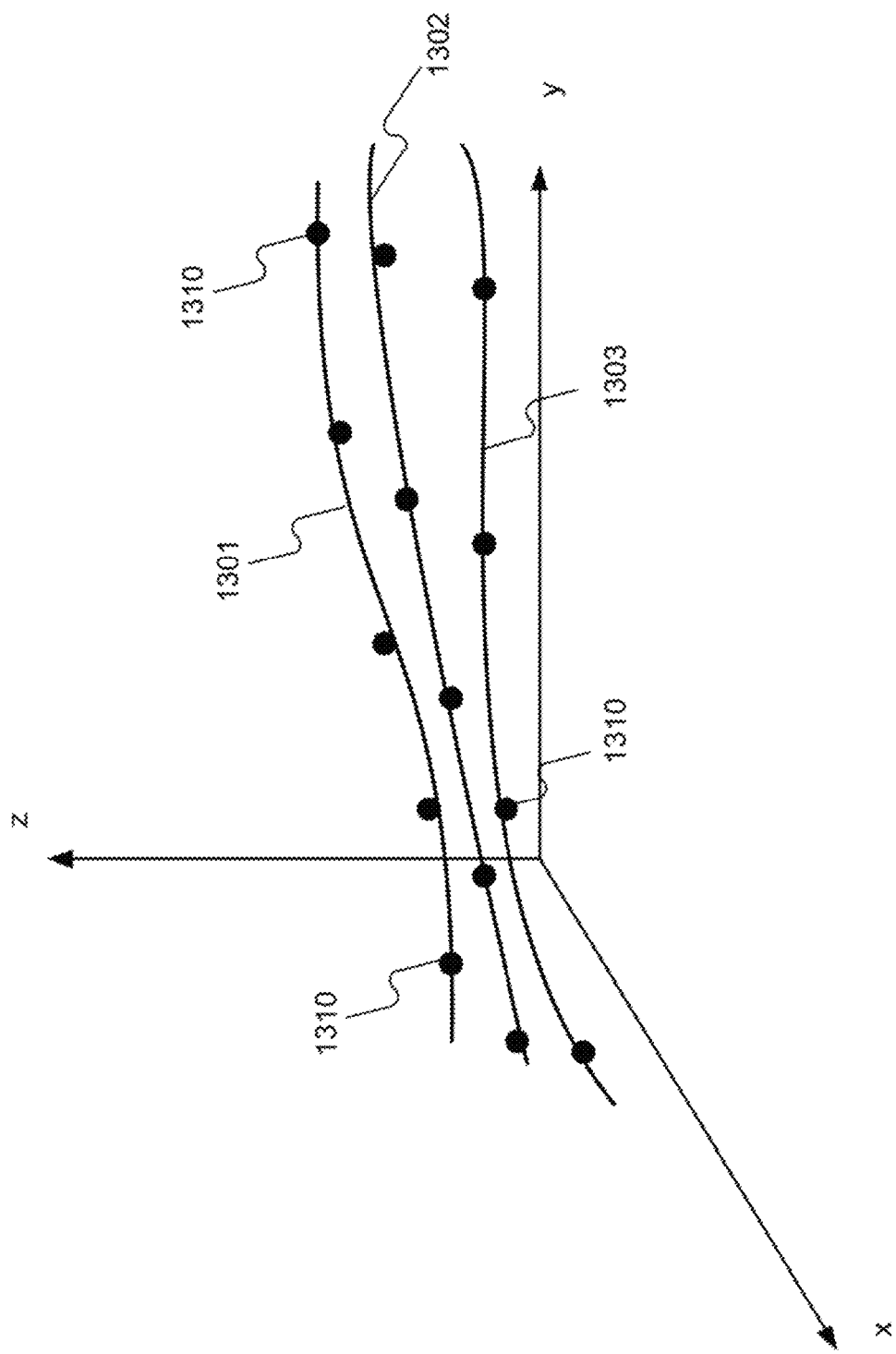
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
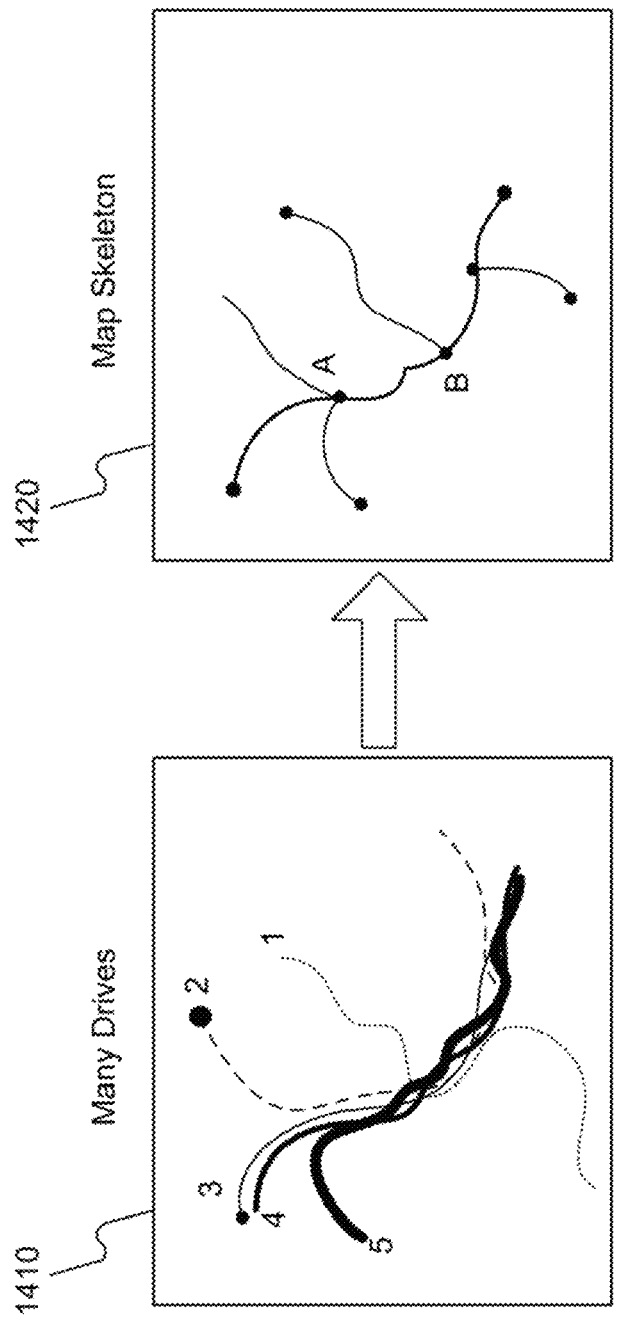
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
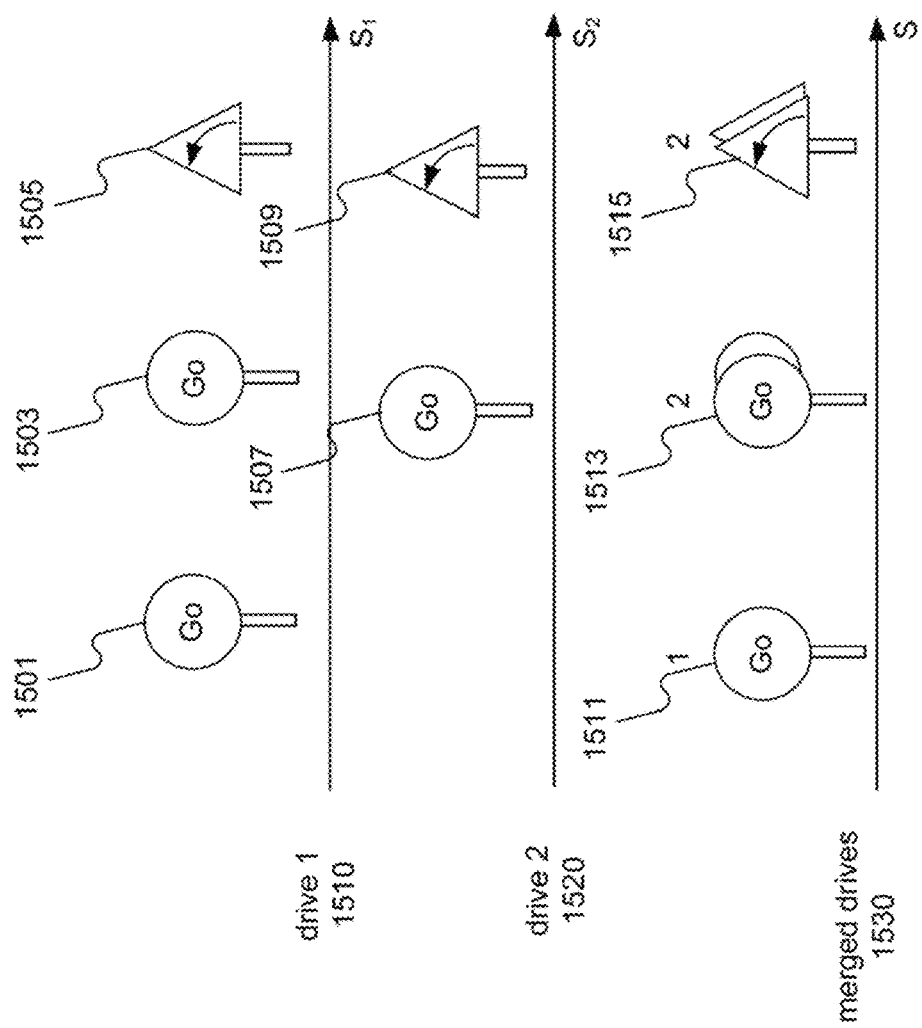
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. Server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
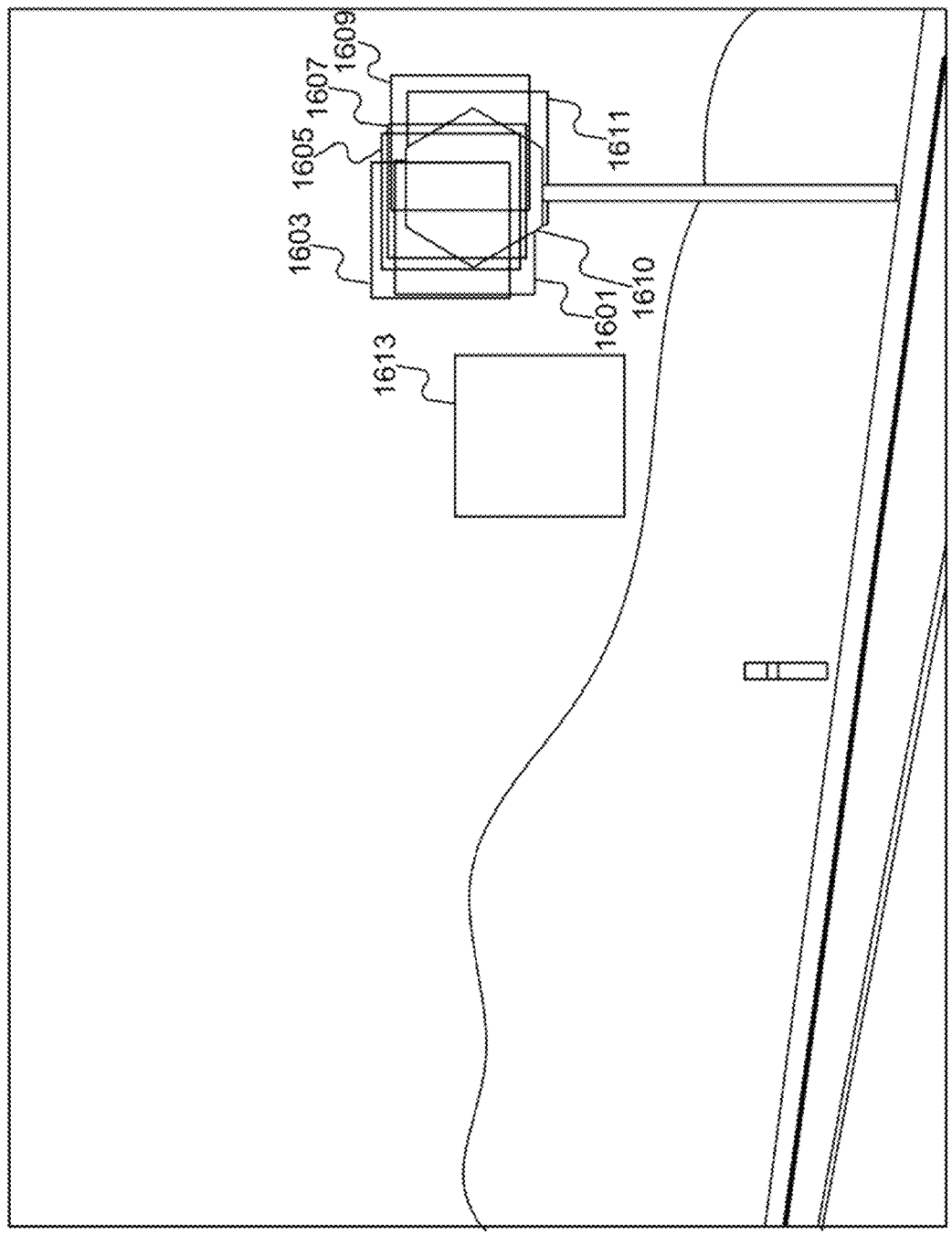
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
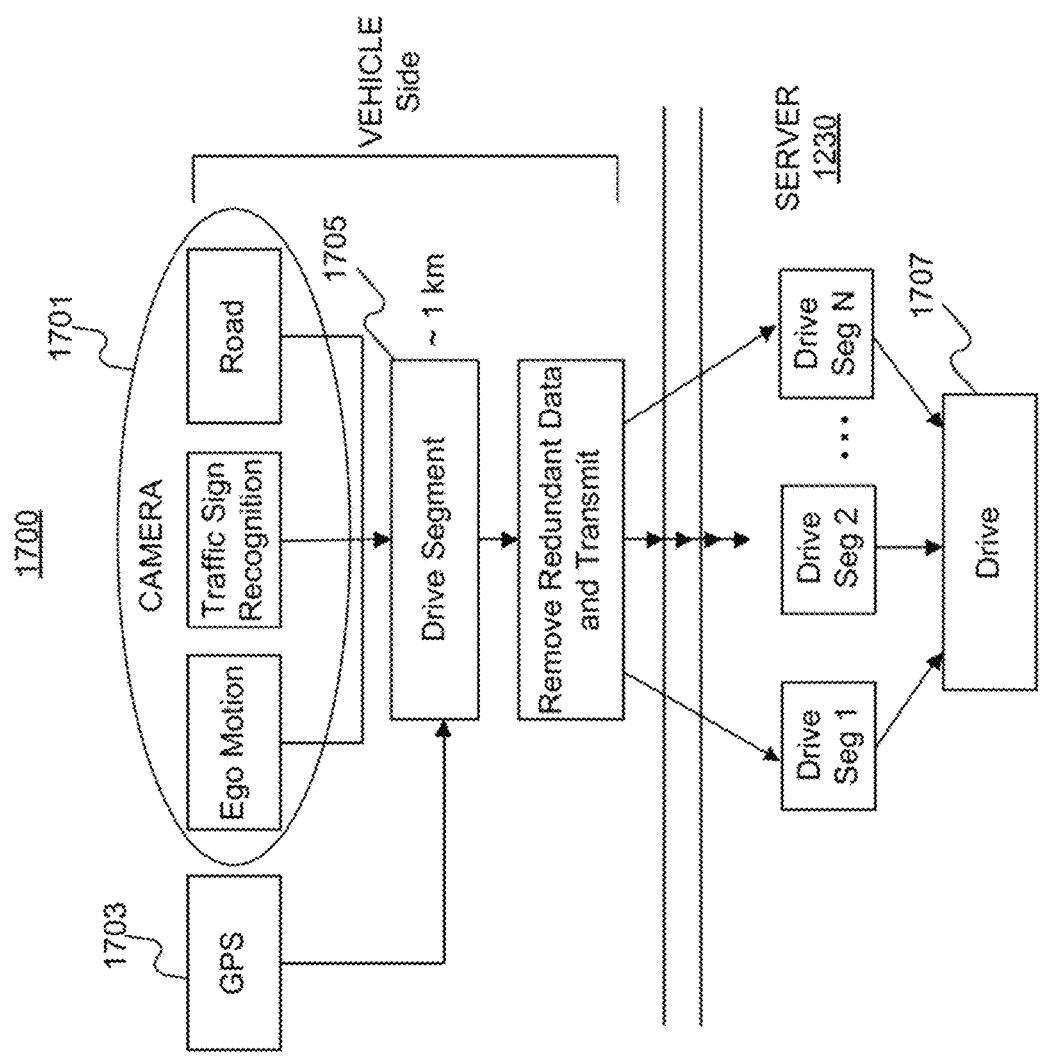
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
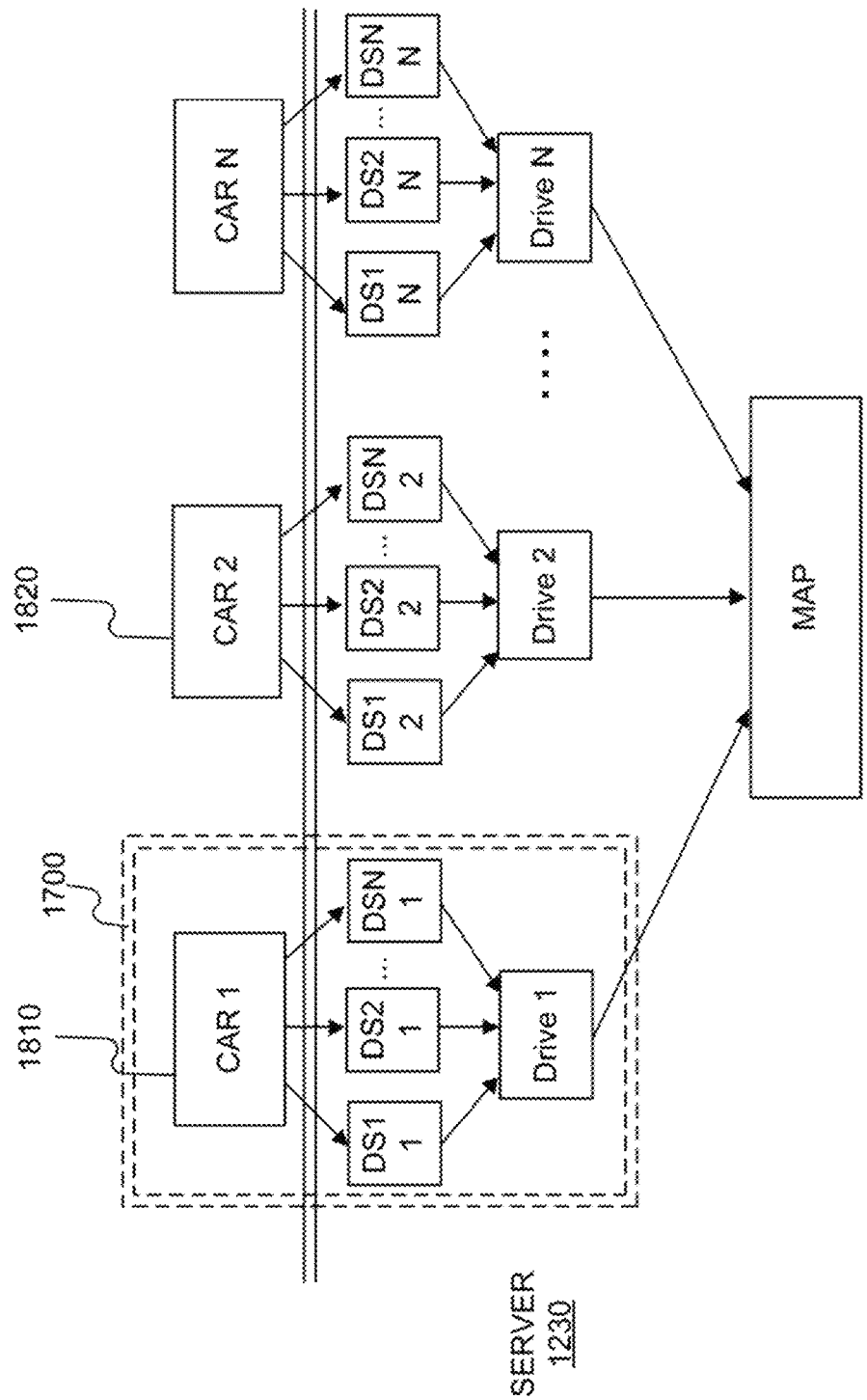
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N," "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
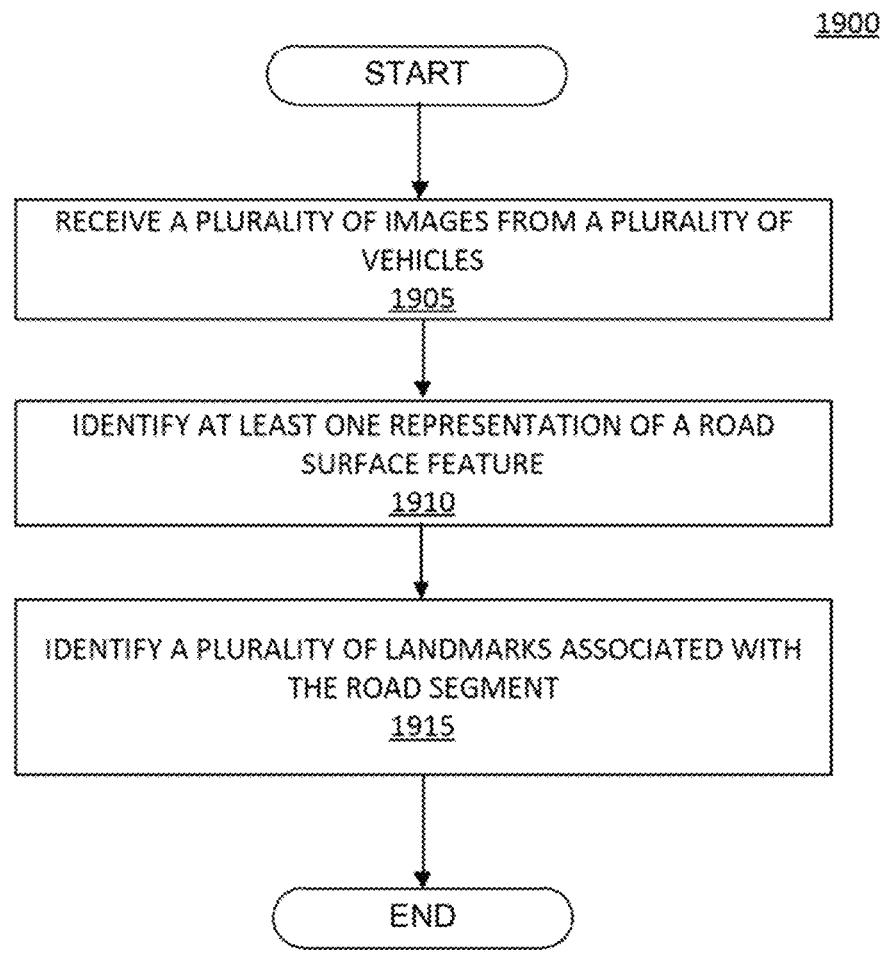
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step 1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowdsourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 1230. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories. By way of further example, process 1900 may include aligning data received in step 1905. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
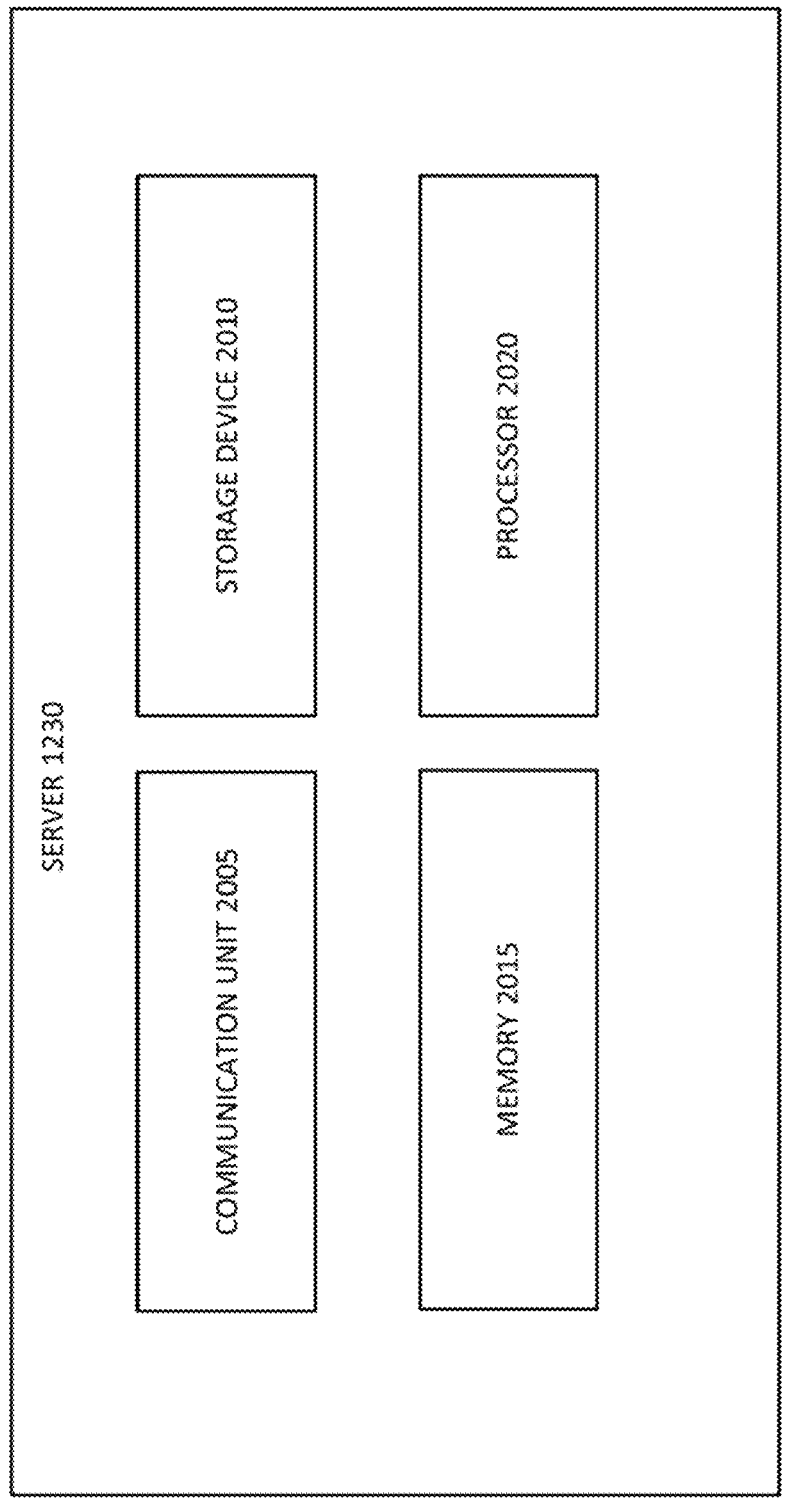
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna), and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
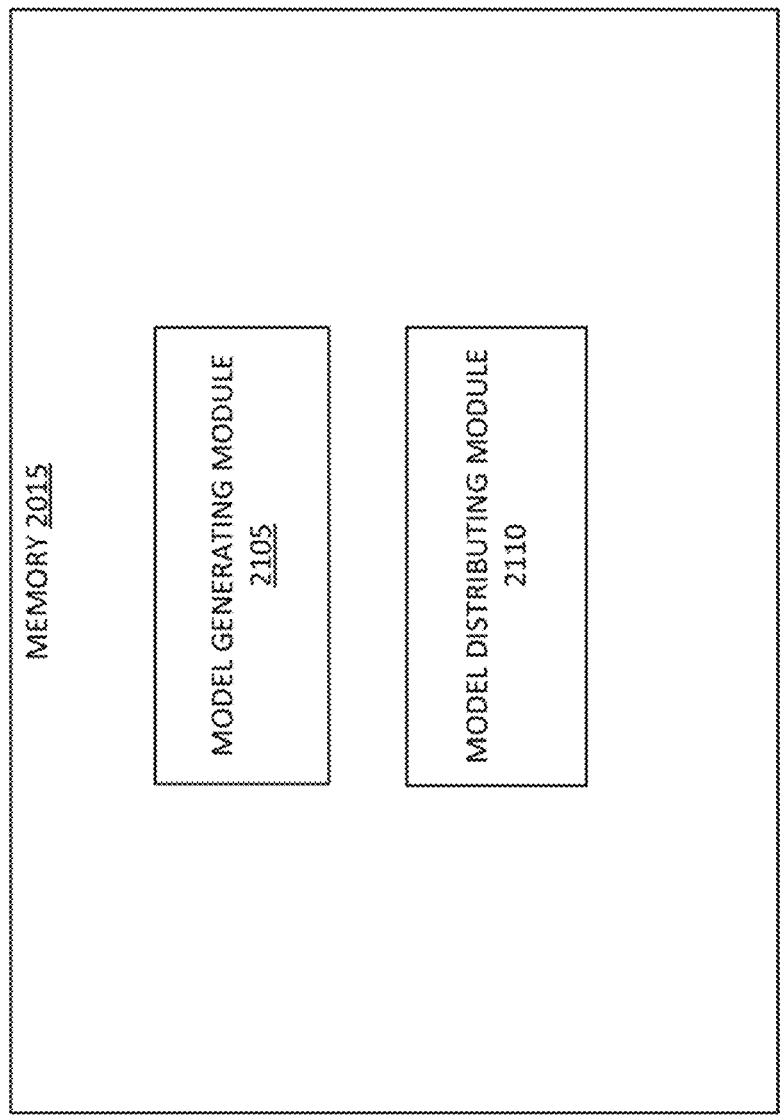
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or avenge trajectory of the clustered vehicle trajectories (e.g., by averaging data representing the clustered vehicle trajectories) in each cluster. In some embodiments, the target trajectory may be associated with a single lane of the common road segment 1200.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning. Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, . . . , Cn), server 1230 may find a rigid transformation that maps Ci to C0, where i=1, 2, . . . , n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
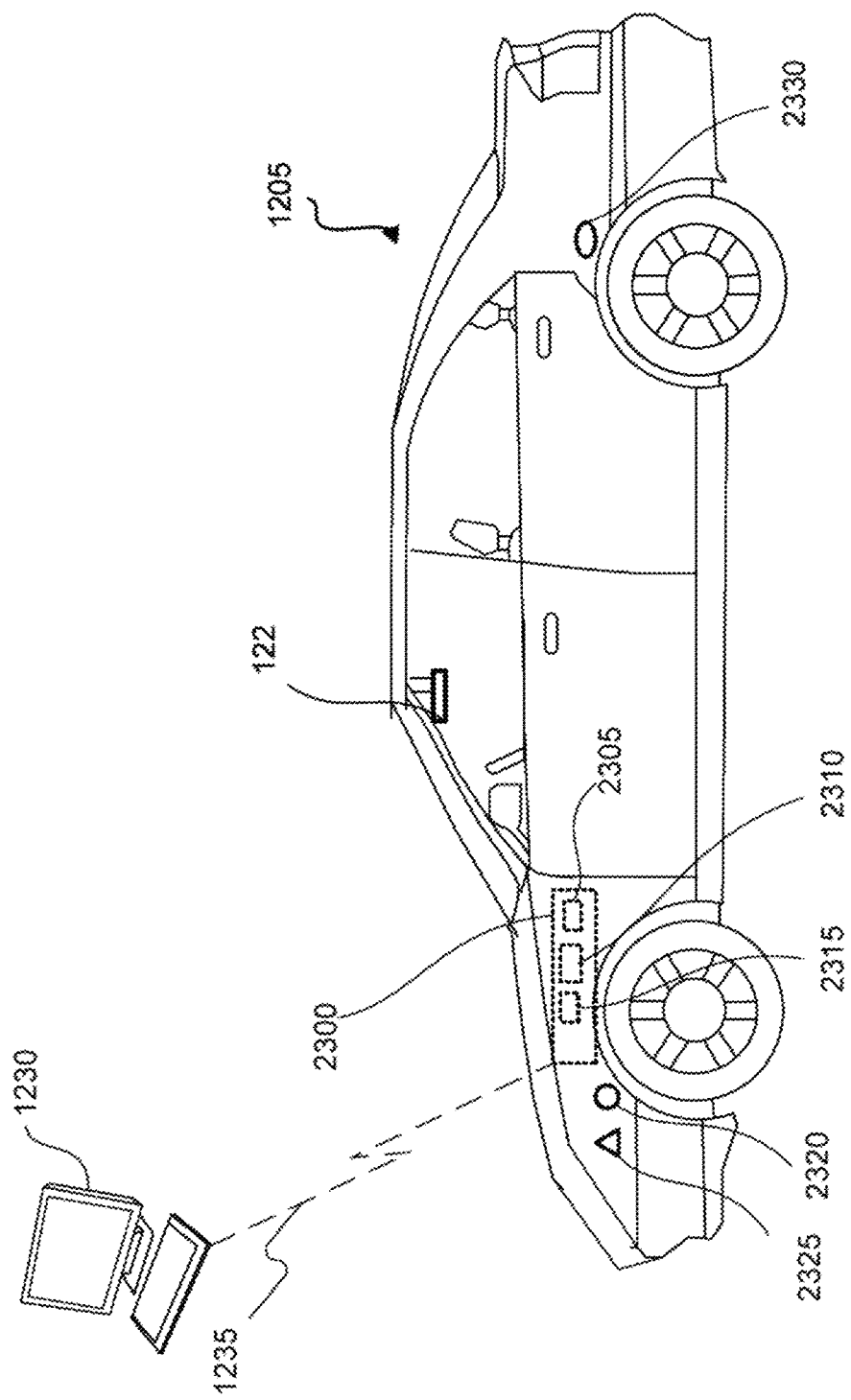
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process GPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Mapping Lane Marks and Navigation Based on Maned Lane Marks

As previously discussed, the autonomous vehicle road navigation model and/or sparse map 800 may include a plurality of mapped lane marks associated with a road segment. As discussed in greater detail below, these mapped lane marks may be used when the autonomous vehicle navigates. For example, in some embodiments, the mapped lane marks may be used to determine a lateral position and/or orientation relative to a planned trajectory. With this position information, the autonomous vehicle may be able to adjust a heading direction to match a direction of a target trajectory at the determined position.

Vehicle 200 may be configured to detect lane marks in a given road segment. The road segment may include any markings on a road for guiding vehicle traffic on a roadway. For example, the lane marks may be continuous or dashed lines demarking the edge of a lane of travel. The lane marks may also include double lines, such as a double continuous lines, double dashed lines or a combination of continuous and dashed lines indicating, for example, whether passing is permitted in an adjacent lane. The lane marks may also include freeway entrance and exit markings indicating, for example, a deceleration lane for an exit ramp or dotted lines indicating that a lane is turn-only or that the lane is ending. The markings may further indicate a work zone, a temporary lane shift, a path of travel through an intersection, a median, a special purpose lane (e.g., a bike lane, HOV lane, etc.), or other miscellaneous markings (e.g., crosswalk, a speed hump, a railway crossing, a stop line, etc.).

Vehicle 200 may use cameras, such as image capture devices 122 and 124 included in image acquisition unit 120, to capture images of the surrounding lane marks. Vehicle 200 may analyze the images to detect point locations associated with the lane marks based on features identified within one or more of the captured images. These point locations may be uploaded to a server to represent the lane marks in sparse map 800. Depending on the position and field of view of the camera, lane marks may be detected for both sides of the vehicle simultaneously from a single image. In other embodiments, different cameras may be used to capture images on multiple sides of the vehicle. Rather than uploading actual images of the lane marks, the marks may be stored in sparse map 800 as a spline or a series of points, thus reducing the size of sparse map 800 and/or the data that must be uploaded remotely by the vehicle.

Figure 24A:
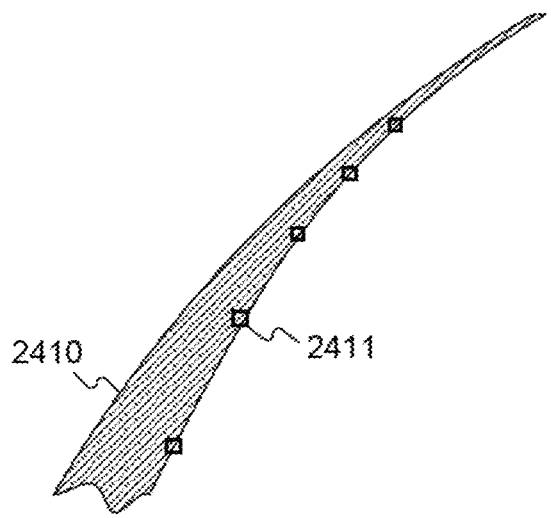
FIGS. 24A-D illustrate exemplary lane marks that may be detected consistent with the disclosed embodiments.

FIGS. 24A-24D illustrate exemplary point locations that may be detected by vehicle 200 to represent particular lane marks. Similar to the landmarks described above, vehicle 200 may use various image recognition algorithms or software to identify point locations within a captured image. For example, vehicle 200 may recognize a series of edge points, corner points or various other point locations associated with a particular lane mark. FIG. 24A shows a continuous lane mark 2410 that may be detected by vehicle 200. Lane mark 2410 may represent the outside edge of a roadway, represented by a continuous white line. As shown in FIG. 24A, vehicle 200 may be configured to detect a plurality of edge location points 2411 along the lane mark. Location points 2411 may be collected to represent the lane mark at any intervals sufficient to create a mapped lane mark in the sparse map. For example, the lane mark may be represented by one point per meter of the detected edge, one point per every five meters of the detected edge, or at other suitable spacings. In some embodiments, the spacing may be determined by other factors, rather than at set intervals such as, for example, based on points where vehicle 200 has a highest confidence ranking of the location of the detected points. Although FIG. 24A shows edge location points on an interior edge of lane mark 2410, points may be collected on the outside edge of the line or along both edges. Further, while a single line is shown in FIG. 24A, similar edge points may be detected for a double continuous line. For example, points 2411 may be detected along an edge of one or both of the continuous lines.

Figure 24B:
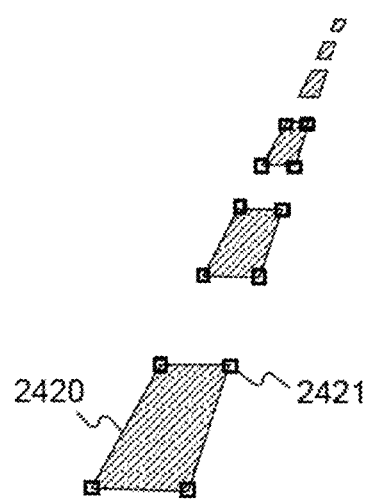

Vehicle 200 may also represent lane marks differently depending on the type or shape of lane mark. FIG. 24B shows an exemplary dashed lane mark 2420 that may be detected by vehicle 200. Rather than identifying edge points, as in FIG. 24A, vehicle may detect a series of corner points 2421 representing corners of the lane dashes to define the full boundary of the dash. While FIG. 248 shows each corner of a given dash marking being located, vehicle 200 may detect or upload a subset of the points shown in the figure. For example, vehicle 200 may detect the leading edge or leading corner of a given dash mark, or may detect the two corner points nearest the interior of the lane. Further, not every dash mark may be captured, for example, vehicle 200 may capture and/or record points representing a sample of dash marks (e.g., every other, every third, every fifth, etc.) or dash marks at a predefined spacing (e.g., every meter, every five meters, every 10 meters, etc.) Corner points may also be detected for similar lane marks, such as markings showing a lane is for an exit ramp, that a particular lane is ending, or other various lane marks that may have detectable corner points. Corner points may also be detected for lane marks consisting of double dashed lines or a combination of continuous and dashed lines.

Figure 24C:
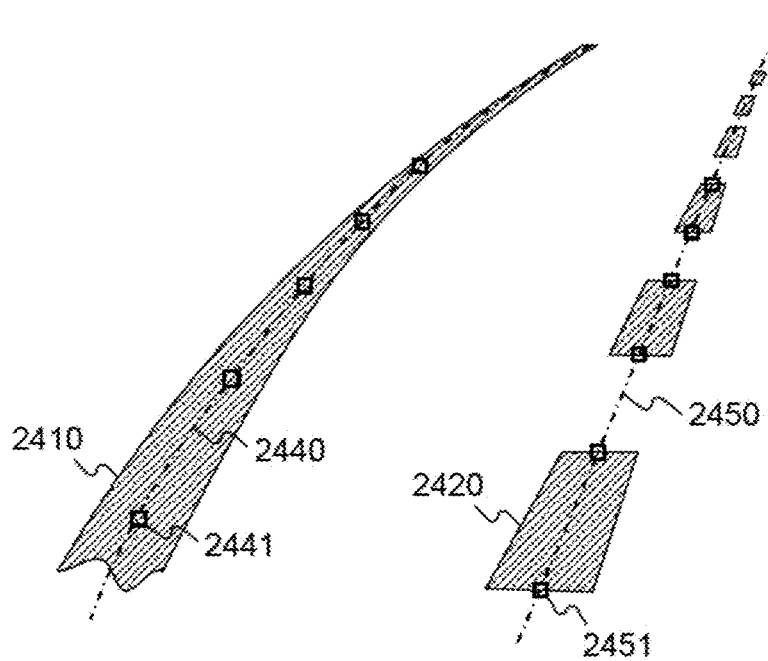

In some embodiments, the points uploaded to the server to generate the mapped lane marks may represent other points besides the detected edge points or corner points. FIG. 24C illustrates a series of points that may represent a centerline of a given lane mark. For example, continuous lane 2410 may be represented by centerline points 2441 along a centerline 2440 of the lane mark. In some embodiments, vehicle 200 may be configured to detect these center points using various image recognition techniques, such as convolutional neural networks (CNN), scale-invariant feature transform (SIFT), histogram of oriented gradients (HOG) features, or other techniques. Alternatively, vehicle 200 may detect other points, such as edge points 2411 shown in FIG. 24A, and may calculate centerline points 2441, for example, by detecting points along each edge and determining a midpoint between the edge points. Similarly, dashed lane mark 2420 may be represented by centerline points 2451 along a centerline 2450 of the lane mark. The centerline points may be located at the edge of a dash, as shown in FIG. 24C, or at various other locations along the centerline. For example, each dash may be represented by a single point in the geometric center of the dash. The points may also be spaced at a predetermined interval along the centerline (e.g., every meter, 5 meters, 10 meters, etc.). The centerline points 2451 may be detected directly by vehicle 200, or may be calculated based on other detected reference points, such as corner points 2421, as shown in FIG. 24B. A centerline may also be used to represent other lane mark types, such as a double line, using similar techniques as above.

Figure 24D:
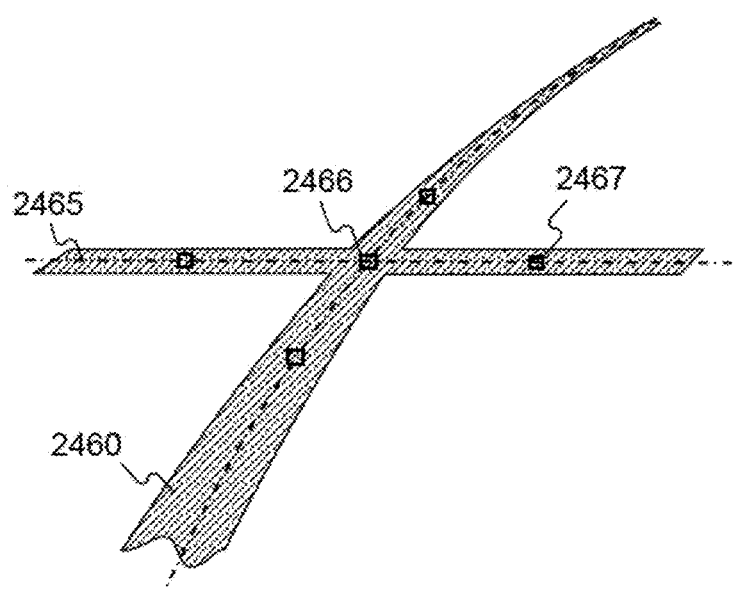

In some embodiments, vehicle 200 may identify points representing other features, such as a vertex between two intersecting lane marks. FIG. 24D shows exemplary points representing an intersection between two lane marks 2460 and 2465. Vehicle 200 may calculate a vertex point 2466 representing an intersection between the two lane marks. For example, one of lane marks 2460 or 2465 may represent a train crossing area or other crossing area in the road segment. While lane marks 2460 and 2465 are shown as crossing each other perpendicularly, various other configurations may be detected. For example, the lane marks 2460 and 2465 may cross at other angles, or one or both of the lane marks may terminate at the vertex point 2466. Similar techniques may also be applied for intersections between dashed or other lane mark types. In addition to vertex point 2466, various other points 2467 may also be detected, providing further information about the orientation of lane marks 2460 and 2465.

Vehicle 200 may associate real-world coordinates with each detected point of the lane mark. For example, location identifiers may be generated, including coordinate for each point, to upload to a server for mapping the lane mark. The location identifiers may further include other identifying information about the points, including whether the point represents a corner point, an edge point, center point, etc. Vehicle 200 may therefore be configured to determine a real-world position of each point based on analysis of the images. For example, vehicle 200 may detect other features in the image, such as the various landmarks described above, to locate the real-world position of the lane marks. This may involve determining the location of the lane marks in the image relative to the detected landmark or determining the position of the vehicle based on the detected landmark and then determining a distance from the vehicle (or target trajectory of the vehicle) to the lane mark. When a landmark is not available, the location of the lane mark points may be determined relative to a position of the vehicle determined based on dead reckoning. The real-world coordinates included in the location identifiers may be represented as absolute coordinates (e.g., latitude/longitude coordinates), or may be relative to other features, such as based on a longitudinal position along a target trajectory and a lateral distance from the target trajectory. The location identifiers may then be uploaded to a server for generation of the mapped lane marks in the navigation model (such as sparse map 800). In some embodiments, the server may construct a spline representing the lane marks of a road segment. Alternatively, vehicle 200 may generate the spline and upload it to the server to be recorded in the navigational model.

Figure 24E:
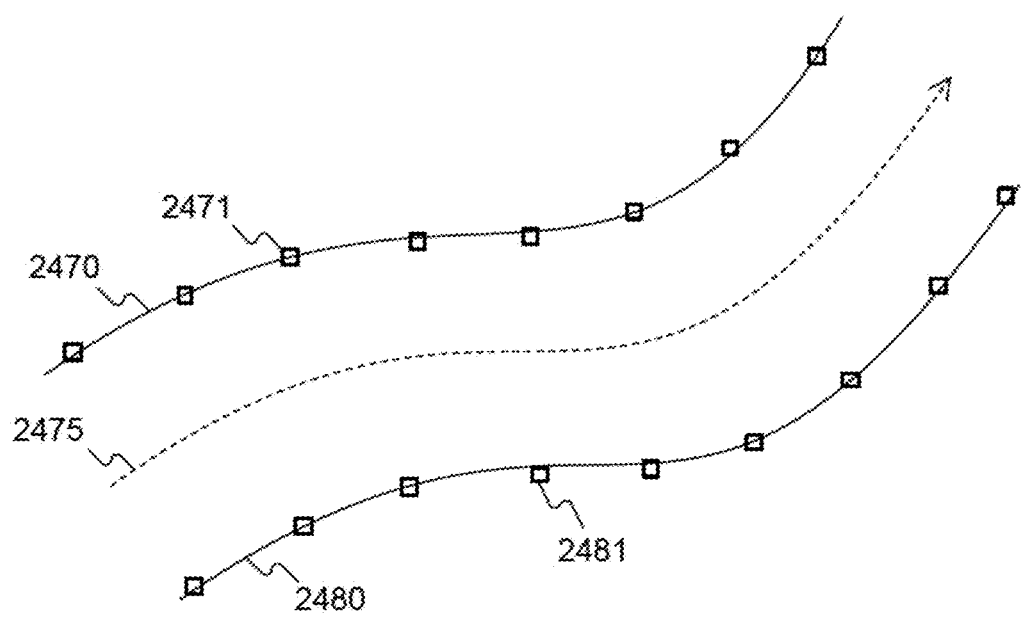
FIG. 24E shows exemplary mapped lane marks consistent with the disclosed embodiments.

FIG. 24E shows an exemplary navigation model or sparse map for a corresponding road segment that includes mapped lane marks. The sparse map may include a target trajectory 2475 for a vehicle to follow along a road segment. As described above, target trajectory 2475 may represent an ideal path for a vehicle to take as it travels the corresponding road segment, or may be located elsewhere on the road (e.g., a centerline of the road, etc.). Target trajectory 2475 may be calculated in the various methods described above, for example, based on an aggregation (e.g., a weighted combination) of two or more reconstructed trajectories of vehicles traversing the same road segment.

In some embodiments, the target trajectory may be generated equally for all vehicle types and for all road, vehicle, and/or environment conditions. In other embodiments, however, various other factors or variables may also be considered in generating the target trajectory. A different target trajectory may be generated for different types of vehicles (e.g., a private car, a light truck, and a full trailer). For example, a target trajectory with relatively tighter turning radii may be generated for a small private car than a larger semi-trailer truck. In some embodiments, road, vehicle and environmental conditions may be considered as well. For example, a different target trajectory may be generated for different road conditions (e.g., wet, snowy, icy, dry, etc.), vehicle conditions (e.g., tire condition or estimated tire condition, brake condition or estimated brake condition, amount of fuel remaining, etc.) or environmental factors (e.g., time of day, visibility, weather, etc.). The target trajectory may also depend on one or more aspects or features of a particular road segment (e.g., speed limit, frequency and size of turns, grade, etc.). In some embodiments, various user settings may also be used to determine the target trajectory, such as a set driving mode (e.g., desired driving aggressiveness, economy mode, etc.).

The sparse map may also include mapped lane marks 2470 and 2480 representing lane marks along the road segment. The mapped lane marks may be represented by a plurality of location identifiers 2471 and 2481. As described above, the location identifiers may include locations in real world coordinates of points associated with a detected lane mark. Similar to the target trajectory in the model, the lane marks may also include elevation data and may be represented as a curve in three-dimensional space. For example, the curve may be a spline connecting three dimensional polynomials of suitable order the curve may be calculated based on the location identifiers. The mapped lane marks may also include other information or metadata about the lane mark, such as an identifier of the type of lane mark (e.g., between two lanes with the same direction of travel, between two lanes of opposite direction of travel, edge of a roadway, etc.) and/or other characteristics of the lane mark (e.g., continuous, dashed, single line, double line, yellow, white, etc.). In some embodiments, the mapped lane marks may be continuously updated within the model, for example, using crowdsourcing techniques. The same vehicle may upload location identifiers during multiple occasions of travelling the same road segment or data may be selected from a plurality of vehicles (such as 1205, 1210, 1215, 1220, and 1225) travelling the road segment at different times. Sparse map 800 may then be updated or refined based on subsequent location identifiers received from the vehicles and stored in the system. As the mapped lane marks are updated and refined, the updated road navigation model and/or sparse map may be distributed to a plurality of autonomous vehicles.

Figure 24F:
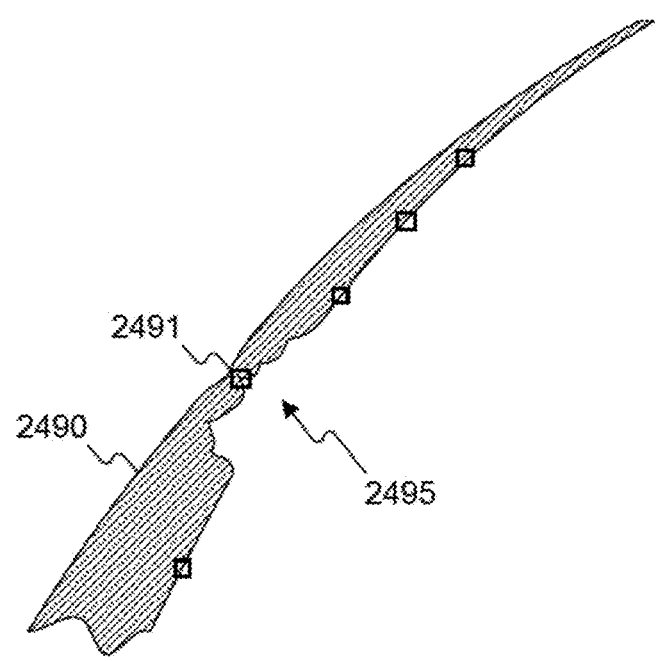
FIG. 24F shows an exemplary anomaly associated with detecting a lane mark consistent with the disclosed embodiments.

Generating the mapped lane marks in the sparse map may also include detecting and/or mitigating errors based on anomalies in the images or in the actual lane marks themselves. FIG. 24F shows an exemplary anomaly 2495 associated with detecting a lane mark 2490. Anomaly 2495 may appear in the image captured by vehicle 200, for example, from an object obstructing the camera's view of the lane mark, debris on the lens, etc. In some instances, the anomaly may be due to the lane mark itself, which may be damaged or worn away, or partially covered, for example, by dirt, debris, water, snow or other materials on the road. Anomaly 2495 may result in an erroneous point 2491 being detected by vehicle 200. Sparse map 800 may provide the correct the mapped lane mark and exclude the error. In some embodiments, vehicle 200 may detect erroneous point 2491 for example, by detecting anomaly 2495 in the image, or by identifying the error based on detected lane mark points before and after the anomaly. Based on detecting the anomaly, the vehicle may omit point 2491 or may adjust it to be in line with other detected points. In other embodiments, the error may be corrected after the point has been uploaded, for example, by determining the point is outside of an expected threshold based on other points uploaded during the same trip, or based on an aggregation of data from previous trips along the same road segment.

The mapped lane marks in the navigation model and/or sparse map may also be used for navigation by an autonomous vehicle traversing the corresponding roadway. For example, a vehicle navigating along a target trajectory may periodically use the mapped lane marks in the sparse map to align itself with the target trajectory. As mentioned above, between landmarks the vehicle may navigate based on dead reckoning in which the vehicle uses sensors to determine its ego motion and estimate its position relative to the target trajectory. Errors may accumulate over time and vehicle's position determinations relative to the target trajectory may become increasingly less accurate. Accordingly, the vehicle may use lane marks occurring in sparse map 800 (and their known locations) to reduce the dead reckoning-induced errors in position determination. In this way, the identified lane marks included in sparse map 800 may serve as navigational anchors from which an accurate position of the vehicle relative to a target trajectory may be determined.

FIG. 25A shows an exemplary image 2500 of a vehicle's surrounding environment that may be used for navigation based on the mapped lane marks. Image 2500 may be captured, for example, by vehicle 200 through image capture devices 122 and 124 included in image acquisition unit 120. Image 2500 may include an image of at least one lane mark 2510, as shown in FIG. 25A. Image 2500 may also include one or more landmarks 2521, such as road sign, used for navigation as described above. Some elements shown in FIG. 25A, such as elements 2511, 2530, and 2520 which do not appear in the captured image 2500 but are detected and/or determined by vehicle 200 are also shown for reference.

Using the various techniques described above with respect to FIGS. 24A-D and 24F, a vehicle may analyze image 2500 to identify lane mark 2510. Various points 2511 may be detected corresponding to features of the lane mark in the image. Points 2511, for example, may correspond to an edge of the lane mark, a corner of the lane mark, a midpoint of the lane mark, a vertex between two intersecting lane marks, or various other features or locations. Points 2511 may be detected to correspond to a location of points stored in a navigation model received from a server. For example, if a sparse map is received containing points that represent a centerline of a mapped lane mark, points 2511 may also be detected based on a centerline of lane mark 2510.

The vehicle may also determine a longitudinal position represented by element 2520 and located along a target trajectory. Longitudinal position 2520 may be determined from image 2500, for example, by detecting landmark 2521 within image 2500 and comparing a measured location to a known landmark location stored in the road model or sparse map 800. The location of the vehicle along a target trajectory may then be determined based on the distance to the landmark and the landmark's known location. The longitudinal position 2520 may also be determined from images other than those used to determine the position of a lane mark. For example, longitudinal position 2520 may be determined by detecting landmarks in images from other cameras within image acquisition unit 120 taken simultaneously or near simultaneously to image 2500. In some instances, the vehicle may not be near any landmarks or other reference points for determining longitudinal position 2520. In such instances, the vehicle may be navigating based on dead reckoning and thus may use sensors to determine its ego motion and estimate a longitudinal position 2520 relative to the target trajectory. The vehicle may also determine a distance 2530 representing the actual distance between the vehicle and lane mark 2510 observed in the captured image(s). The camera angle, the speed of the vehicle, the width of the vehicle, or various other factors may be accounted for in determining distance 2530.

Figure 25B:
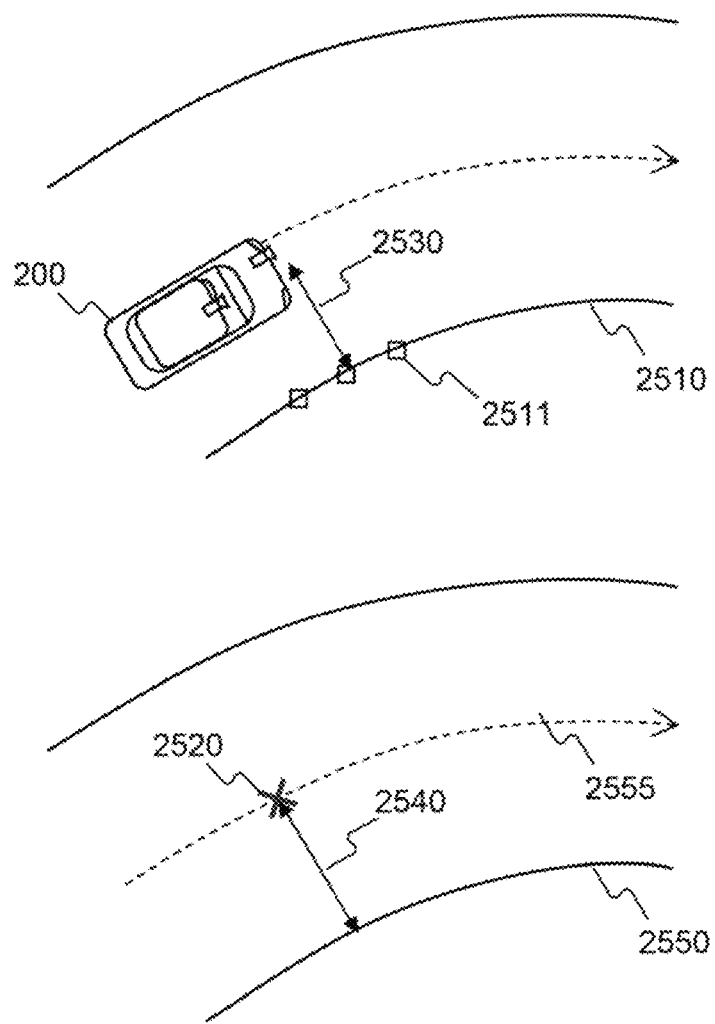
FIG. 25B illustrates a lateral localization correction of a vehicle based on mapped lane marks in a road navigation model consistent with the disclosed embodiments.

FIG. 25B illustrates a lateral localization correction of the vehicle based on the mapped lane marks in a road navigation model. As described above, vehicle 200 may determine a distance 2530 between vehicle 200 and a lane mark 2510 using one or more images captured by vehicle 200. Vehicle 200 may also have access to a road navigation model, such as sparse map 800, which may include a mapped lane mark 2550 and a target trajectory 2555. Mapped lane mark 2550 may be modeled using the techniques described above, for example using crowdsourced location identifiers captured by a plurality of vehicles. Target trajectory 2555 may also be generated using the various techniques described previously. Vehicle 200 may also determine or estimate a longitudinal position 2520 along target trajectory 2555 as described above with respect to FIG. 25A. Vehicle 200 may then determine an expected distance 2540 based on a lateral distance between target trajectory 2555 and mapped lane mark 2550 corresponding to longitudinal position 2520. The lateral localization of vehicle 200 may be corrected or adjusted by comparing the actual distance 2530, measured using the captured image(s), with the expected distance 2540 from the model.

Figure 26A:
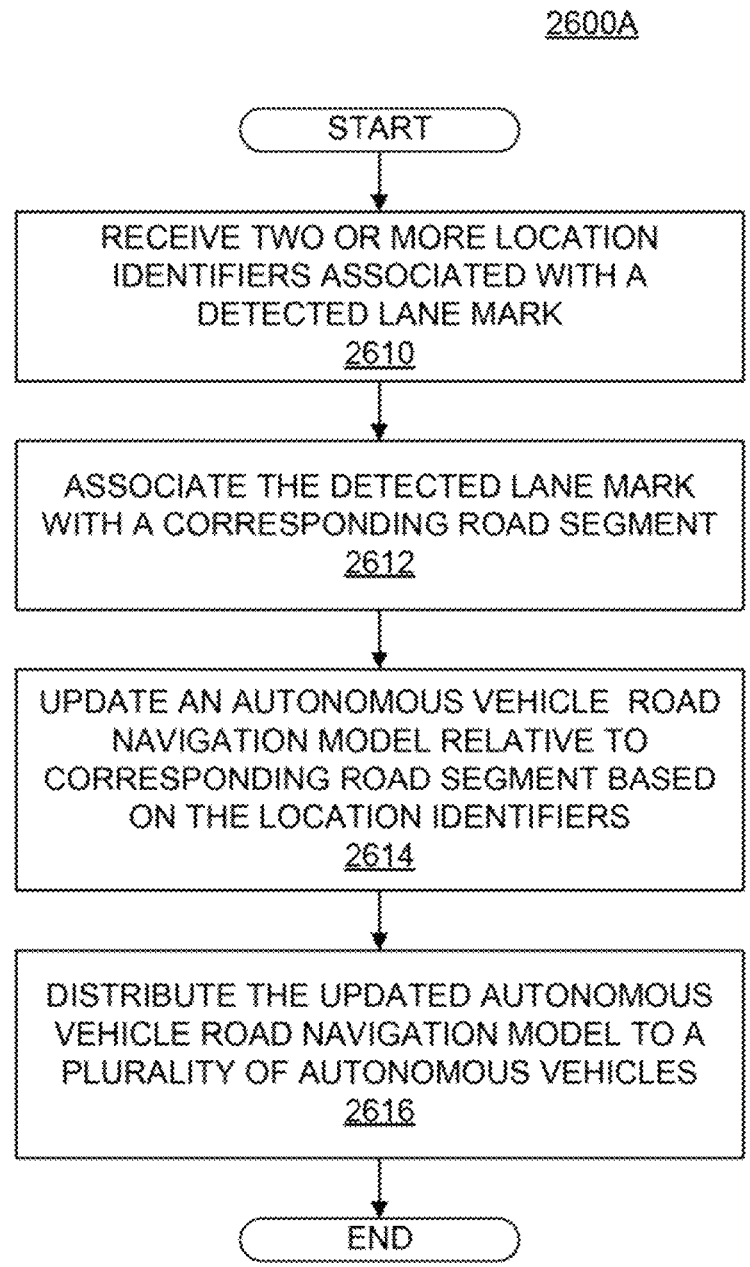
FIG. 26A is a flowchart showing an exemplary process for mapping a lane mark for use in autonomous vehicle navigation consistent with disclosed embodiments.

FIG. 26A is a flowchart showing an exemplary process 2600A for mapping a lane mark for use in autonomous vehicle navigation, consistent with disclosed embodiments. At step 2610, process 2600A may include receiving two or more location identifiers associated with a detected lane mark. For example, step 2610 may be performed by server 1230 or one or more processors associated with the server. The location identifiers may include locations in real-world coordinates of points associated with the detected lane mark, as described above with respect to FIG. 24E. In some embodiments, the location identifiers may also contain other data, such as additional information about the road segment or the lane mark. Additional data may also be received during step 2610, such as accelerometer data, speed data, landmarks data, road geometry or profile data, vehicle positioning data, ego motion data, or various other forms of data described above. The location identifiers may be generated by a vehicle, such as vehicles 1205, 1210, 1215, 1220, and 1225, based on images captured by the vehicle. For example, the identifiers may be determined based on acquisition, from a camera associated with a host vehicle, of at least one image representative of an environment of the host vehicle, analysis of the at least one image to detect the lane mark in the environment of the host vehicle, and analysis of the at least one image to determine a position of the detected lane mark relative to a location associated with the host vehicle. As described above, the lane mark may include a variety of different marking types, and the location identifiers may correspond to a variety of points relative to the lane mark. For example, where the detected lane mark is part of a dashed line marking a lane boundary, the points may correspond to detected corners of the lane mark. Where the detected lane mark is part of a continuous line marking a lane boundary, the points may correspond to a detected edge of the lane mark, with various spacings as described above. In some embodiments, the points may correspond to the centerline of the detected lane mark, as shown in FIG. 24C, or may correspond to a vertex between two intersecting lane marks and at least one two other points associated with the intersecting lane marks, as shown in FIG. 24D.

At step 2612, process 2600A may include associating the detected lane mark with a corresponding road segment. For example, server 1230 may analyze the real-world coordinates, or other information received during step 2610, and compare the coordinates or other information to location information stored in an autonomous vehicle road navigation model. Server 1230 may determine a road segment in the model that corresponds to the real-world road segment where the lane mark was detected.

At step 2614, process 2600A may include updating an autonomous vehicle road navigation model relative to the corresponding road segment based on the two or more location identifiers associated with the detected lane mark. For example, the autonomous road navigation model may be sparse map 800, and server 1230 may update the sparse map to include or adjust a mapped lane mark in the model. Server 1230 may update the model based on the various methods or processes described above with respect to FIG. 24E. In some embodiments, updating the autonomous vehicle road navigation model may include storing one or more indicators of position in real world coordinates of the detected lane mark. The autonomous vehicle road navigation model may also include a at least one target trajectory for a vehicle to follow along the corresponding road segment, as shown in FIG. 24E.

At step 2616, process 2600A may include distributing the updated autonomous vehicle road navigation model to a plurality of autonomous vehicles. For example, server 1230 may distribute the updated autonomous vehicle road navigation model to vehicles 1205, 1210, 1215, 1220, and 1225, which may use the model for navigation. The autonomous vehicle road navigation model may be distributed via one or more networks (e.g., over a cellular network and/or the Internet, etc.), through wireless communication paths 1235, as shown in FIG. 12.

In some embodiments, the lane marks may be mapped using data received from a plurality of vehicles, such as through a crowdsourcing technique, as described above with respect to FIG. 24E. For example, process 2600A may include receiving a first communication from a first host vehicle, including location identifiers associated with a detected lane mark, and receiving a second communication from a second host vehicle, including additional location identifiers associated with the detected lane mark. For example, the second communication may be received from a subsequent vehicle travelling on the same road segment, or from the same vehicle on a subsequent trip along the same road segment. Process 2600A may further include refining a determination of at least one position associated with the detected lane mark based on the location identifiers received in the first communication and based on the additional location identifiers received in the second communication. This may include using an average of the multiple location identifiers and/or filtering out "ghost" identifiers that may not reflect the real-world position of the lane mark.

Figure 26B:
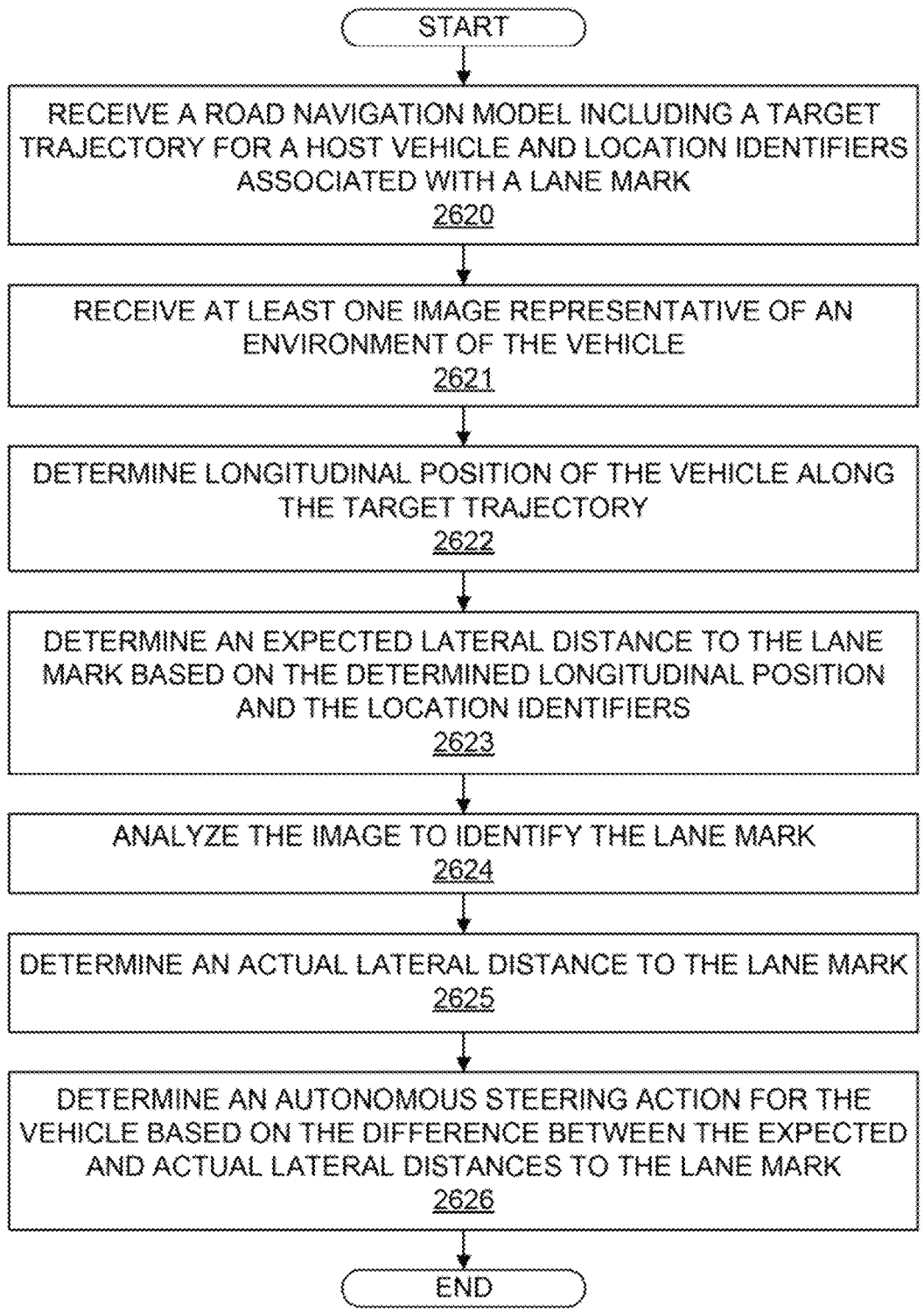
FIG. 26B is a flowchart showing an exemplary process for autonomously navigating a host vehicle along a road segment using mapped lane marks consistent with disclosed embodiments.

FIG. 26B is a flowchart showing an exemplary process 2600B for autonomously navigating a host vehicle along a road segment using mapped lane marks. Process 2600B may be performed, for example, by processing unit 110 of autonomous vehicle 200. At step 2620, process 2600B may include receiving from a server-based system an autonomous vehicle road navigation model. In some embodiments, the autonomous vehicle road navigation model may include a target trajectory for the host vehicle along the road segment and location identifiers associated with one or more lane marks associated with the road segment. For example, vehicle 200 may receive sparse map 800 or another road navigation model developed using process 2600A. In some embodiments, the target trajectory may be represented as a three-dimensional spline, for example, as shown in FIG. 9B. As described above with respect to FIGS. 24A-F, the location identifiers may include locations in real world coordinates of points associated with the lane mark (e.g., corner points of a dashed lane mark, edge points of a continuous lane mark, a vertex between two intersecting lane marks and other points associated with the intersecting lane marks, a centerline associated with the lane mark, etc.).

At step 2621, process 26008 may include receiving at least one image representative of an environment of the vehicle. The image may be received from an image capture device of the vehicle, such as through image capture devices 122 and 124 included in image acquisition unit 120. The image may include an image of one or more lane marks, similar to image 2500 described above.

At step 2622, process 2600B may include determining a longitudinal position of the host vehicle along the target trajectory. As described above with respect to FIG. 25A, this may be based on other information in the captured image (e.g., landmarks, etc.) or by dead reckoning of the vehicle between detected landmarks.

At step 2623, process 2600 may include determining an expected lateral distance to the lane mark based on the determined longitudinal position of the host vehicle along the target trajectory and based on the two or more location identifiers associated with the at least one lane mark. For example, vehicle 200 may use sparse map 800 to determine an expected lateral distance to the lane mark. As shown in FIG. 25B, longitudinal position 2520 along a target trajectory 2555 may be determined in step 2622. Using spare map 800, vehicle 200 may determine an expected distance 2540 to mapped lane mark 2550 corresponding to longitudinal position 2520.

At step 2624, process 2600B may include analyzing the at least one image to identify the at least one lane mark. Vehicle 200, for example, may use various image recognition techniques or algorithms to identify the lane mark within the image, as described above. For example, lane mark 2510 may be detected through image analysis of image 2500, as shown in FIG. 25A.

At step 2625, process 2600B may include determining an actual lateral distance to the at least one lane mark based on analysis of the at least one image. For example, the vehicle may determine a distance 2530, as shown in FIG. 25A, representing the actual distance between the vehicle and lane mark 2510. The camera angle, the speed of the vehicle, the width of the vehicle, the position of the camera relative to the vehicle, or various other factors may be accounted for in determining distance 2530.

At step 2626, process 2600B may include determining an autonomous steering action for the host vehicle based on a difference between the expected lateral distance to the at least one lane mark and the determined actual lateral distance to the at least one lane mark. For example, as described above with respect to FIG. 25B, vehicle 200 may compare actual distance 2530 with an expected distance 2540. The difference between the actual and expected distance may indicate an error (and its magnitude) between the vehicle's actual position and the target trajectory to be followed by the vehicle. Accordingly, the vehicle may determine an autonomous steering action or other autonomous action based on the difference. For example, if actual distance 2530 is less than expected distance 2540, as shown in FIG. 25B, the vehicle may determine an autonomous steering action to direct the vehicle left, away from lane mark 2510. Thus, the vehicle's position relative to the target trajectory may be corrected. Process 2600B may be used, for example, to improve navigation of the vehicle between landmarks.

Navigation and Maiming Based on Detected Arrow Orientation

As discussed above, vehicle 200 (e.g., through processing unit 110) may be configured to analyze geometry of various markings detected in an environment. Vehicle 200 may detect one or more markings, such as directional arrows, that are detected on the roadway. As discussed in detail below, these directional arrows may be used for generating a road navigation model and/or for navigation of the vehicle. For example, the directional arrows may be analyzed to determine an intended direction of travel for a roadway or for a particular lane of a roadway. This data may be included in a road navigational model, such as sparse map 800, to improve navigation of autonomous vehicles.

Vehicle 200 may be configured to detect markings on a roadway. The roadway may include various arrows indicating the direction of travel associated with a lane. For example, vehicle 200 may use cameras, such as image capture devices 122 and 124 included in image acquisition unit 120, to capture images of the directional arrows. Processing unit 110 may be configured to analyze the captured images to identify the directional arrows. In some embodiments, processing unit 110 may also analyze the geometry of the detected directional arrows to ascertain additional information based on the detected directional arrow. For example, processing unit may determine the location of the arrow with respect to the lane or roadway, a direction of the directional arrow, and/or the type of arrow. In some embodiments, processing unit 110 may be configured to identify a traffic pattern or other meaning represented by the arrow, such as an intended lane use for a traffic lane associated with the arrow (e.g., vehicles traveling in the lane turn right or left ahead).

Figure 27A:
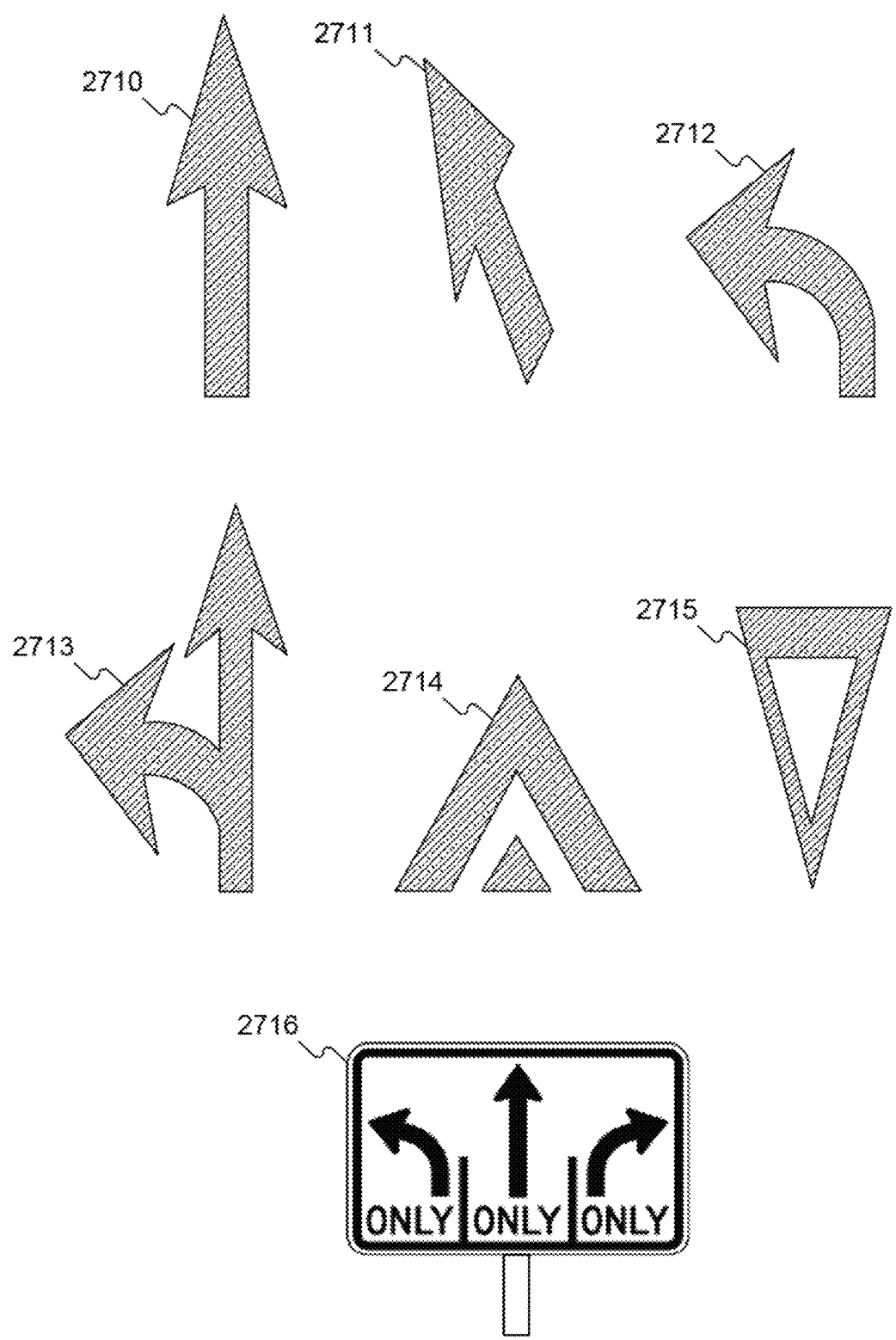
FIG. 27A illustrates exemplary directional arrows that may be detected consistent with the disclosed embodiments.

FIG. 27A illustrates exemplary directional arrows that may be detected consistent with the disclosed embodiments. Vehicle 200, may detect a straight arrow 2710, indicating that the direction of travel for this lane continues ahead. For example, straight arrow 2710 may be detected at an intersection, indicating that the lane associated with straight arrow 2710 is a "straight only" lane and traffic in this lane proceeds through the intersection. Straight arrow 2710 may also be detected in the middle of a roadway and may indicate the direction of travel of the associated lane. Vehicle 200 may also detect angled arrows, such as lane reduction arrow 2711. These arrows may indicate that the number of through lanes for a given roadway is reduced, for example, because the roadway narrows, or a lane is ending. This may indicate to the vehicle that a navigation action, such as steering into an adjacent lane, is required.

Vehicle 200 may further be configured to detect various turn arrows, such as turn arrow 2712. Such arrows may indicate mandatory and/or permissible movements for certain lanes. For example, turn arrow 2712 may be detected at an intersection, indicating that the associated lane is "turn-only." This may trigger a navigation action by the vehicle, such as moving into an adjacent lane if the target trajectory does not correspond to the permissible use of the lane. In some embodiments vehicle 200 may also be configured to detect compound arrow types, such as left-turn/straight arrow 2713. Such arrows may indicate that multiple movements or lane use types are permissible for a given lane. For example, left-turn/straight arrow 2713 may be detected at an intersection, and may indicate that a vehicle is permitted to either turn left or proceed straight through the intersection. Accordingly, vehicle 200 (or processing unit 110) may be configured to detect multiple directions associated with a given directional arrow mark. Other various turn arrows or compound arrows may also be detected. For example, right turn arrows or right-turn/straight arrows may also be detected. In some instances, an arrow may indicate that either left or right turns are permissible. In some instances, more than two directions may be associated with a given arrow, such as an arrow indicating that either left or right turns or straight directions of travel are permissible. In such instances, vehicle 200 may detect more than one direction associated with a given directional arrow mark, or may treat these as separate directional arrows.

In some embodiments, vehicle 200 may also be configured to detect other road marks that may indicate a direction of travel, even if that is not necessarily the intent of the arrow. For example, vehicle 200 may detect speed hump mark 2714. This mark may be intended, for example, to mark a speed control hump in the roadway and warn drivers to reduce their speed. Nevertheless, vehicle 200 may detect and recognize speed hump mark 2714 and ascertain a direction of travel based on the mark. For example, similar to straight arrow 2710, vehicle 200 may use speed hump mark 2714 as an indication of the direction of travel for the associated lane. In some instances, vehicle 200 may also identify this as a speed hump mark and trigger a control action accordingly, such as reducing the speed of the vehicle. Various other marks may similarly indicate a direction of travel for a given lane.

In some embodiments, vehicle 200 may need to distinguish directional arrows from various road marks that are not intended to show a direction. For example, yield mark 2715 may indicate an upcoming road configuration in which the current lane must yield to other lanes of traffic (e.g., at an intersection, or in a merge lane). Vehicle 200 may be configured to distinguish yield mark 2715, or other non-directional-arrow marks, from directional arrows. For example, vehicle 200 may be configured to distinguish yield mark 2715 from a straight arrow indicating the vehicle is travelling the wrong direction in the lane, or from lane reduction arrow 2711. Accordingly, vehicle 200 may be configured to detect additional features of the detected road marks, such as a lack of leading arrow, or the hollow interior of yield mark 2715. In some embodiments, vehicle 200 may recognize this as a yield sign and obtain a direction of travel based on the bottom of the yield sign facing the oncoming traffic.

In some embodiments, vehicle 200 may be configured to detect arrows from other locations in the surrounding environment that may indicate the direction of travel or permissible movements of corresponding lanes. For example, vehicle 200 may be configured to detect arrows on signs, such as traffic sign 2716. Traffic sign 2716, for example, may be located on the side of the roadway or above the vehicle (e.g., on a traffic light post, etc.). While vehicle 200 may detect traffic sign 2716 as a landmark, vehicle 200 may also detect one or more directional arrows on the sign and correlate the directional arrows with the corresponding lanes. Similar to directional arrows identified on the roadway, the directional arrows from signs or other locations in the surrounding environment may be captured and uploaded to a road navigation model and/or used for navigation by the vehicle.

Processing unit 110 may be configured to process the detected directional arrows and upload them to a server to be represented in a road navigational model, such as sparse map 800. Accordingly, processing unit 110 may be configured to further recognize specific points or features of the detected directional arrow and process these points or features to extract further information from the directional arrow.

Figure 27B:
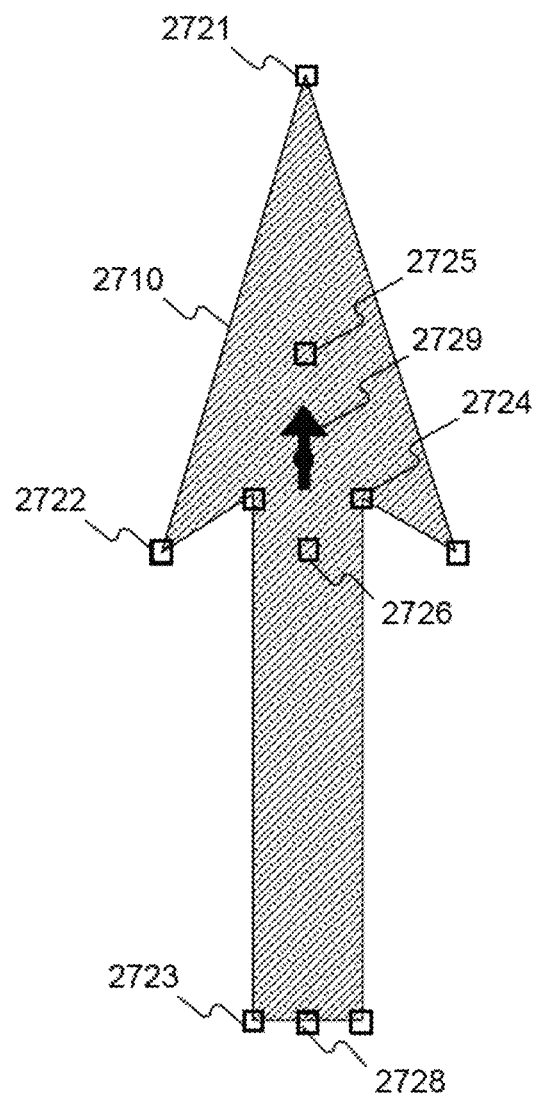
FIG. 27B illustrates exemplary image processing of a detected directional arrow consistent with the disclosed embodiments.

FIG. 27B illustrates exemplary image processing of a detected directional arrow consistent with the disclosed embodiments. As shown in FIG. 27B, vehicle 200 may detect straight arrow 2710. Processing unit 110 may be configured to identify one or more points associated with the directional arrow which may be used to determine a direction, location, and/or other information associated with the directional arrow. For example, processing unit 110 may use one or more image processing algorithms or techniques to isolate points or features from the captured image.

In some embodiments, processing unit 110 may identify a tip point 2721 of the directional arrow. Tip point 2721 may be used, for example, to determine the heading direction of the arrow. One or more points associated with the head of the arrow may also be identified, such as exterior vertex points 2722 on either side of the head of the arrow. Processing unit 110 may also identify interior vertex points 2724 associated with the head of the arrow. In some embodiments, the direction and location of the arrow may be defined by one or more points associated with the head of the arrow alone. For example, processing unit 110 may determine a midpoint between exterior vertex points 2722 and this midpoint, in combination with tip point 2721 may indicate the direction of straight arrow 2710. Other points may also be determined instead of, or in addition to the points associated with the arrow head. For example, one or more points associated with the arrow body may be detected, such as corner points 2723 or end point 2728. Internal points may also be detected, such as internal point 2726 representing a central point of the detected arrow, or internal point 2725 representing a central point of the head of the detected arrow. Additional points or features not identified in FIG. 27B may also be identified, such as an edge line of the arrow or various points along the edge line. In some embodiments, two or more of the identified points may be sufficient to represent a location and direction of the arrow. In some embodiments, the points or features may be selected based predefined specification identifying points that should be sampled to enable processing to resolve an orientation of the arrow (e.g., with a certain level of confidence). For example, a certain number of points may be specified at a wide edge of the arrow, on the sides of the arrow, in the middle or center and at the tip of the arrow, etc. In some embodiments, the required number of points may depend on various other factors. For example, the number of points may depend on the detected arrow (e.g., the type of arrow, the size of the arrow, the distance to the arrow, etc.), the image quality or conditions (e.g., image clarity, signal to noise ratio), a confidence level of the determined points, conditions of the road (type or surface of the road, road reflectivity, visibility of the arrow on the road, etc.), or factors related to the vehicle (e.g., speed of the vehicle, etc.). Processing unit 110 may also be configured to associate real world coordinates with one or more of the identified points or features. In still other further embodiments, a trained system (e.g., a neural network) may be trained to resolve the orientation of an arrow.

Figure 27C:
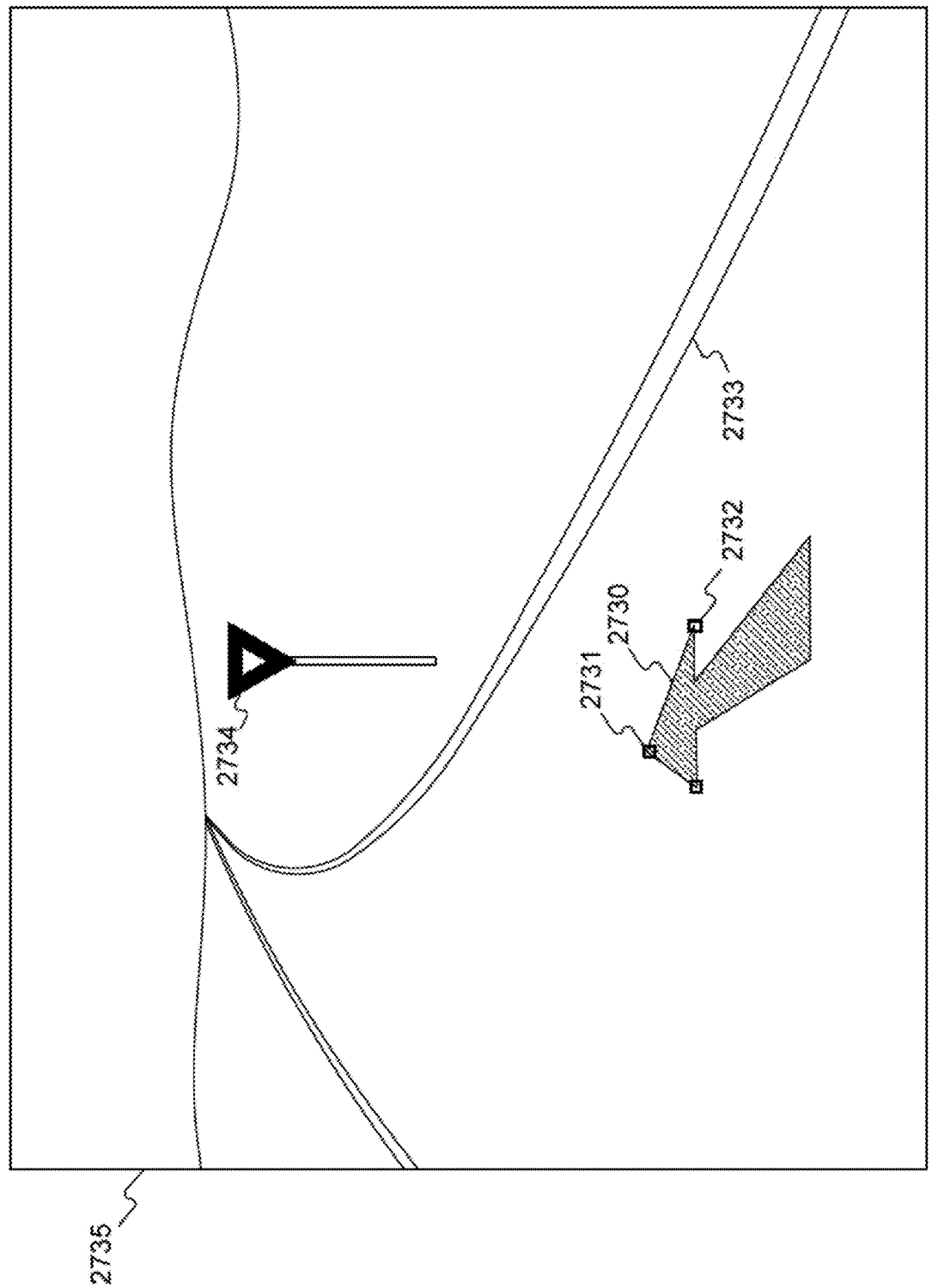
FIG. 27C shows an exemplary image of a vehicle's surrounding environment that may be used to detect a directional arrow consistent with the disclosed embodiments.

FIG. 27C shows an exemplary image 2735 of a vehicle's surrounding environment that may be used to detect a directional arrow consistent with the disclosed embodiments. Image 2735 may be captured, for example, by vehicle 200 via one of image capture devices 122 and 124 included in image acquisition unit 120. Image 2735 may include an image of at least one directional arrow 2730. Image 2735 may also include one or more landmarks 2734, such as a road sign and/or lane marks 2733, which may be used for navigation and/or lateral positioning, as described above. Some elements shown in FIG. 7C, such as points 2731 and 2732 which do not appear in the captured image 2735 but are detected and/or determined by vehicle 200, are also shown for reference.

Vehicle 200 may be configured to detect directional arrow 2730 from image 2735 based on various image processing algorithms or techniques. Processing unit 110 may further identify various points 2731 and 2732, which may correspond to points identified with respect to FIG. 27B, as described above. Processing unit 110 may further be configured to determine a real world location of the arrow and/or various points associated with the arrow, such as tip point 2731. Accordingly, processing unit 110 may analyze other features of image 2735, such as landmark 2734, which may have a known location in sparse map 800. This may involve determining the location of the directional arrow in the image relative to the detected landmark or determining the position of the vehicle based on the detected landmark and then determining a distance from the vehicle to the directional arrow. When a landmark is not available, the location of the directional arrow and/or points may be determined relative to a position of the vehicle, which may be determined through dead reckoning. For example, the vehicle may use sensors to determine its ego motion and estimate its position relative to the target trajectory, as described above. The real-world coordinates associated with the directional arrow may be represented as absolute coordinates (e.g., latitude/longitude coordinates), or may be relative to other features, such as based on a longitudinal position along a target trajectory and a lateral distance from the target trajectory.

Additional information from image 2735 and/or vehicle 200 may also be analyzed to determine the direction of directional arrow 2730. For example, without other context of the image, directional arrow 2730, which may be a straight arrow on the road surface shown in image 2735, may appear more like lane reduction arrow 2711 without accounting for other elements in the captured image. Accordingly, processing unit 110 may be configured to correct or account for the detected points based on the location of the camera, the camera angle, lens distortion, the camera viewing angle or other various factors. In some embodiments, processing unit 110 may also analyze other elements of the image, such as lane mark 2733 to determine the location and/or direction of directional arrow. For example, the lateral location of the directional arrow may be determined or calibrated based on the distance between directional arrow 2730 and lane mark 2733, determined from image 2735. The direction of the directional arrow may similarly be determined or calibrated based on lane mark 2733. For example, processor may determine that directional arrow 2730 is a straight arrow based on one or more features or points detected in the image. Accordingly, processing unit 110 may align the direction of arrow 2730 with lane mark 2733 or calibrate a direction determined through the detected points based on lane mark 2733. Various other elements from image 2735 may also be used to determine or correct the location and/or direction of the detected directional arrow.

In some embodiments, further processing techniques may also be used. For example, similar to the detection of lane marks as described above, processing unit 110 may be configured to detect one or more anomalies in the image and correct the detected points or features accordingly. Such anomalies may appear in the image captured by vehicle 200 due to, for example, an object obstructing the camera's view of the lane mark, debris on the lens, etc. In some instances, the anomaly may be on the directional arrow itself, which may be damaged or worn away, or partially covered, for example, by dirt, debris, water, snow or other materials on the road. Such anomalies may result in erroneous points or features detected on the arrow. Accordingly, the processor may omit the erroneous points or may adjust the point to be in line with other detected points on the arrow. In other embodiments, the error may be corrected after the point has been uploaded, for example, by determining the point is outside of an expected threshold based on other points uploaded during the same trip or based on an aggregation of data from previous trips along the same road segment. As another example, the detected arrow may have rounded corners, and thus may not have clearly defined points. Processing unit 110 may be configured to determine a point along the rounded edge to represent the associated vertex (e.g., the tip of the arrow). In other embodiments, processing unit 110 may extrapolate the point based on other detected features of the arrow, for example, by detecting edges of the head of the arrow and extrapolating the edges to find a projected vertex point where the edge lines would meet.

In accordance with the disclosed embodiments, vehicle 200 may be configured to upload data associated with the detected arrow to a central server to be processed and included in a road navigational map. For example, vehicle 200 (or vehicles 1205, 1210, 1215, 1220, or 1225) may upload the data to server 1230 using the various wireless communication methods described above. Rather than upload an image of the detected directional arrow, the directional arrows may be included in sparse map 800 as one or more points, location identifiers, and/or directional indicators, thus reducing the size of sparse map 800 and/or the data that must be uploaded remotely by the vehicle. For example, the directional arrow may be represented by a location component and directional component (shown as element 2729 in FIG. 27B) associated with the detected directional arrow. The location identifier may correspond to one of the identified points shown in FIG. 27B, such as tip point 2721 or internal points 2725 or 2726. The location identifier may comprise real-world coordinates of the identified point, which may be identified based on the captured image, as described above. The directional arrow may also be represented by a directional indicator associated with the direction of the detected directional arrow. Various means of conveying the direction may be used. In some embodiments, the directional indicator may be established as a vector, based on two or more points associated with the directional arrow. For example, if the tip point of the arrow is known, a single other point, such as end point 2728, may be sufficient to establish the directional indicator. Accordingly, the real-world location of one or more points may be uploaded by vehicle 200. In other embodiments, the directional indicator may be represented as an angle or compass direction. For example, the directional indicator may represent an angle relative to the direction of travel of the lane, or a heading based on real world cardinal directions or a coordinate system of the road navigational map. In some embodiments, the various points or features detected by processing unit 110 may be uploaded and the location and direction may be identified on the server side. In other embodiments, the location identifier and directional indicator may be determined by vehicle 200.

In some embodiments, various other information or attributes of the directional arrow may be part of sparse map 800. For example, the vehicle or the server may be configured to identify the type or meaning of the detected directional arrow. Accordingly, a type code or other identifier may be associated with the arrow. In some embodiments the type code may reference a list of known or predetermined arrow types. For example, processing unit 110 may further be able to correlate the detected image, points or features to a particular arrow type, such as a straight arrow, turn arrow, etc. Processing unit 110 may access a library or database of predefined arrows to identify the detected directional arrow through processing the image. For example, the library may be based on road marking templates, guidelines, or standards of one or more localities or jurisdictions. Alternatively, this process may occur on the server side based on the data transmitted by the vehicle. For example, based on a number of points defining the shape of the directional arrow, the server may access a library to associate the detected directional arrow with a type code. For general, or unrecognized directional arrows, an image signature enabling identification of the directional arrow may also be stored. In some embodiments, the location identifier, the directional indicator, and/or any additional information may facilitate the use of the directional arrows as landmarks for navigation, as described in detail above.

In some embodiments, the mapped directional arrows may be continuously updated within the model, for example, using crowdsourcing techniques. A particular vehicle may upload location identifiers and directional indicators during multiple occasions of travelling the same road segment or data may be selected from a plurality of vehicles (such as 1205, 1210, 1215, 1220, and 1225) travelling the road segment at different times. Sparse map 800 may then be updated or refined based on subsequent location identifiers and directional indicators received from the vehicles and stored in the system. As the mapped directional arrows are updated and refined, the updated road navigation model and/or sparse map may be distributed to a plurality of autonomous vehicles.

Embodiments of the present disclosure may further provide for navigation of an autonomous vehicle based on a detected arrow and its orientation. After detecting and processing a directional arrow on a road surface, vehicle 200 may be configured to determine and/or implement an autonomous navigational action. For example, as described above, vehicle 200 may capture an image of the surrounding environment using image capture devices 122 and 124 included in image acquisition unit 120. Processing unit 110 may then detect a directional arrow within the captured image and determine a direction associated with the arrow. In some embodiments, processing unit 110 may also identify a type code or other indication of the meaning of the arrow. Then, in addition to, or instead of providing the data to the server for generating a sparse map associated with the road segment, vehicle 200 may be configured to determine an autonomous navigation action based on the detected arrow and direction.

Figure 28B:
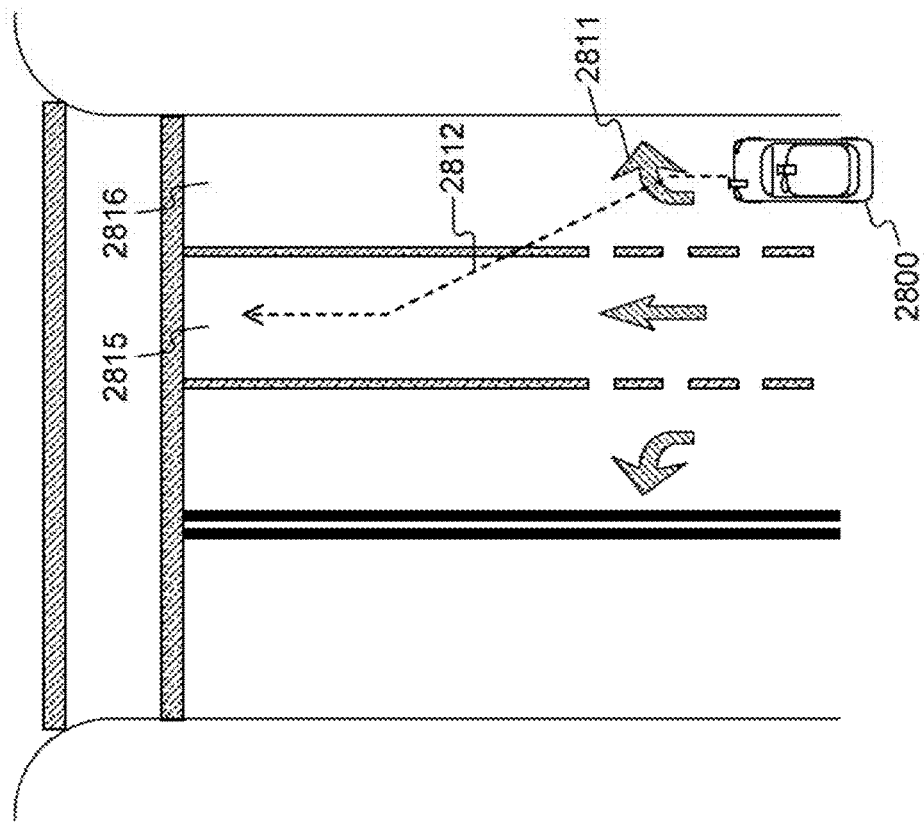
FIG. 28B shows a plan view of an exemplary autonomous navigation action by a vehicle from a turn lane, consistent with the disclosed embodiments.
Figure 28A:
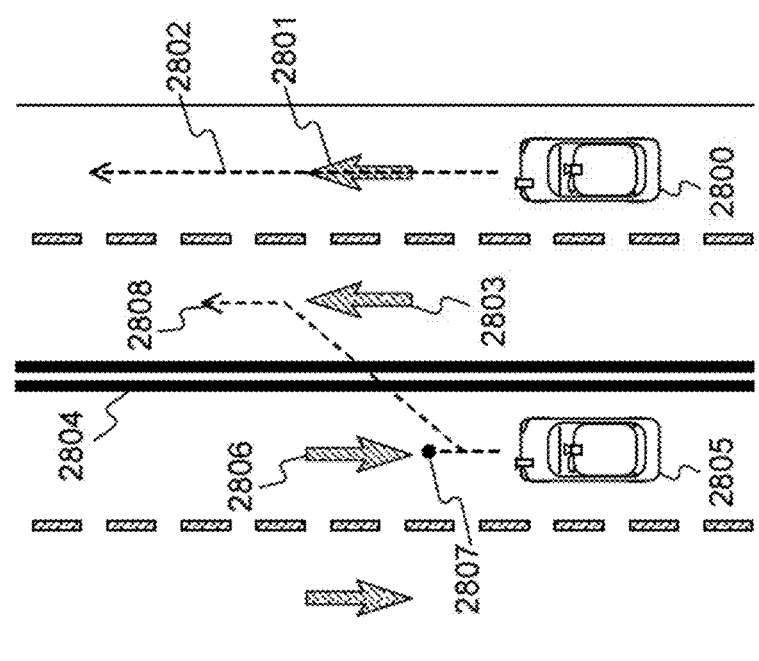
FIG. 28A shows a plan view of an exemplary autonomous navigation action by a vehicle on a straight road segment, consistent with the disclosed embodiments.

FIG. 28A shows a plan view of an exemplary autonomous navigation action by a vehicle on a straight road segment, consistent with the disclosed embodiments. Vehicle 2800 may detect a straight arrow 2801 within the current lane of travel. In this example, vehicle 2800 may determine that the detected arrow is consistent with the vehicle's current target trajectory. Accordingly, the autonomous navigational action determined and implemented by vehicle 2800 may include maintaining the current heading direction, as shown by autonomous navigation action 2802.

Conversely, vehicle 2805 may detect a straight arrow 2806 within the current lane of travel. In this example, vehicle 2805 may determine that the detected arrow is inconsistent with the current trajectory. For example, if the detected directional arrow is substantially opposite to a direction of travel of the vehicle (e.g., the direction of the arrow differs from the current heading direction of the vehicle by more than 90 degrees in either direction, etc.), the vehicle may determine an autonomous navigation action. For example, the vehicle may initiate a braking action 2807 to slow or stop the vehicle and/or implement a steering action 2808 to move the vehicle into a lane with the correct direction of travel. In addition to the directional arrow, other elements within a captured image may also be analyzed to inform the navigation action determination. For example, vehicle 2805 may detect straight arrow 2803 in the adjacent lane, which is consistent with the current direction of travel, and may implement a steering action to move into the correct lane. Vehicle 2804 may also detect lane mark 2804 and may determine that the correct lanes of travel are on the opposite side of the lane mark.

FIG. 28B shows a plan view of an exemplary autonomous navigation action by a vehicle from a turn lane, consistent with the disclosed embodiments. Vehicle 2800 may be approaching an intersection and may detect a right turn arrow 2811 within the current lane of travel, lane 2816. Vehicle 200 may determine that the arrow indicates the current lane is right turn only and no through traffic is permitted. If the target trajectory of vehicle is consistent with the turn (e.g., the vehicle needs to turn right at the intersection), the vehicle may determine an autonomous navigation action of maintaining the current heading of the vehicle. The vehicle may also begin preparations for later navigation actions, such as completing the right turn at the intersection. If the target trajectory of the vehicle is inconsistent with directional arrow 2811, vehicle 2800 may determine and/or implement steering action 2812 to move into a lane consistent with the vehicle's target trajectory or intended route. For example, vehicle 2800 may determine that lane 2815 is consistent with the vehicle's route. Similar navigation actions may be performed when a vehicle detects other arrows, such as a lane transition arrow (see, e.g., lane transition arrow 2711 in FIG. 27A).

Figure 28D:
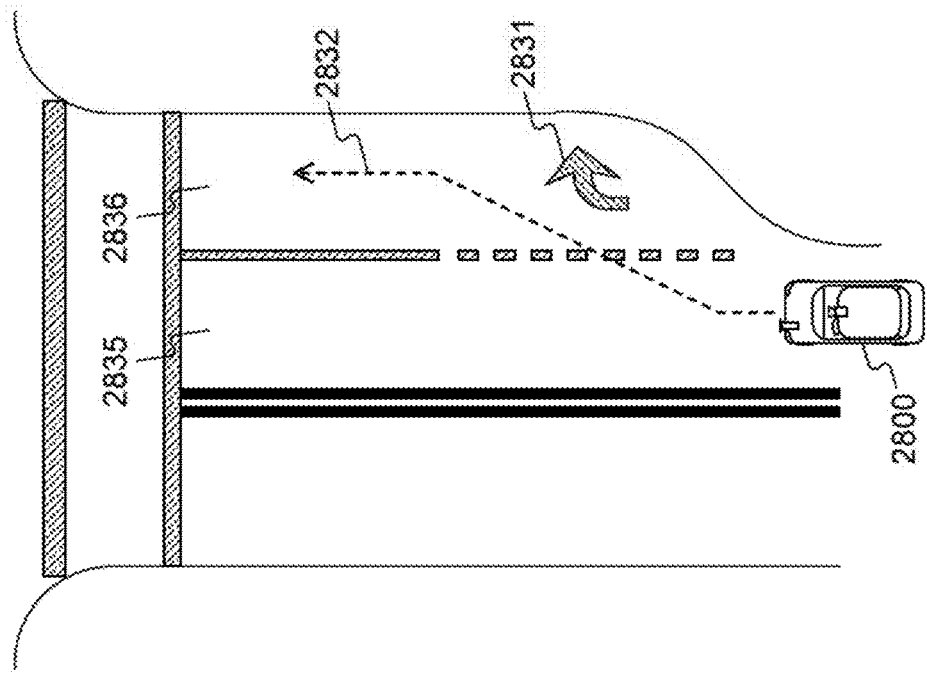
FIG. 28D shows a plan view of an exemplary autonomous navigation action by a vehicle based on a directional arrow outside of the current lane, consistent with the disclosed embodiments.
Figure 28C:
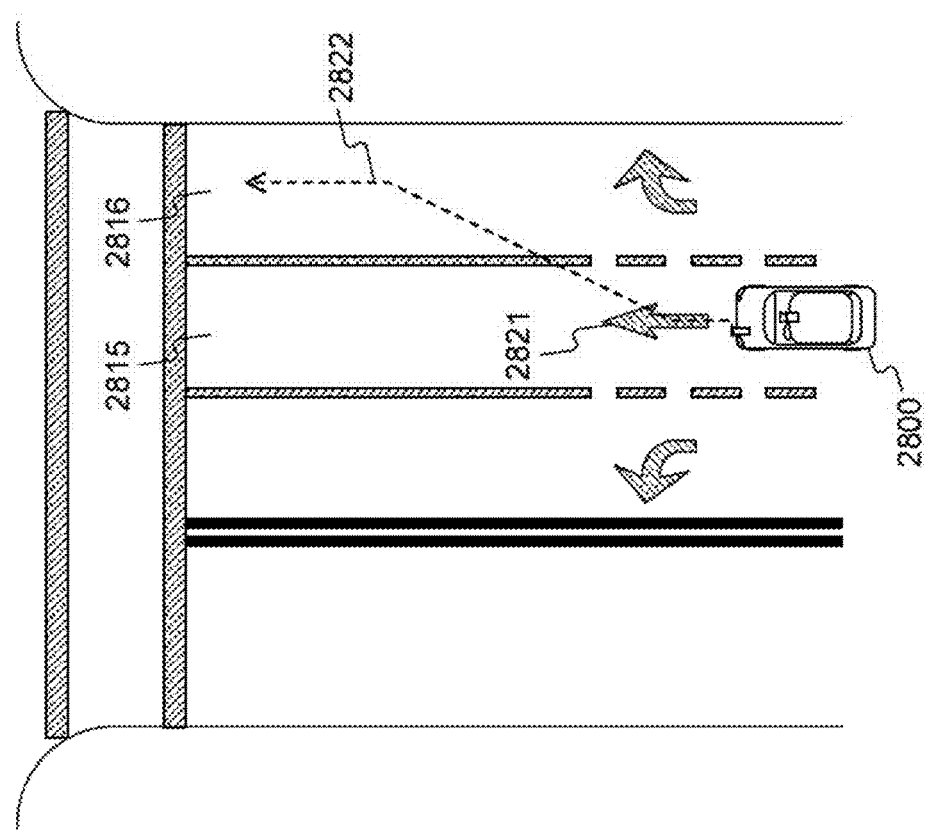
FIG. 28C shows a plan view of an exemplary autonomous navigation action by a vehicle into a turn lane, consistent with the disclosed embodiments.

In another example, vehicle 2800 may be in a straight only lane and may determine that it needs to be in a turn lane. FIG. 28C shows a plan view of an exemplary autonomous navigation action by a vehicle into a turn lane, consistent with the disclosed embodiments. Vehicle 2800 may detect a straight arrow 2821 in lane 2815 and determine the lane use of the current lane is inconsistent with the target trajectory of intended route. Accordingly, vehicle 2800 may determine and/or implement steering action 2822.

In some embodiments, the vehicle may rely on directional arrows outside of the current lane of travel for the vehicle. In such embodiments, processing unit 110 may detect a directional arrow within a captured image, but based on the position of the arrow relative to the vehicle, processing unit 110 may associate the directional arrow with an adjacent lane. An autonomous vehicle navigation may also be determined from such directional arrows outside of the current lane of travel. For example, FIG. 28D shows a plan view of an exemplary autonomous navigation action based on a directional arrow outside of current lane 2835, consistent with the disclosed embodiments. In this example, vehicle 2800 may not detect any directional arrows in the current lane of travel, but may detect turn arrow 2831 in an adjacent lane of travel. Based on analysis of the image and the detected arrow, vehicle 2800 may determine that adjacent lane 2836 is a turn-only lane. If the vehicle's intended route of travel is straight ahead, no autonomous navigation action may be taken, or the autonomous navigation action may be to maintain the current heading of the vehicle. If the target trajectory or intended route includes a turn at the upcoming intersection, vehicle 2800 may determine and/or implement steering action 2832 into the adjacent lane associated with the detected arrow. Vehicle 2800 may also navigate based on arrows detected in other locations in the surrounding environment, such as traffic signs, etc.

Figure 28E:
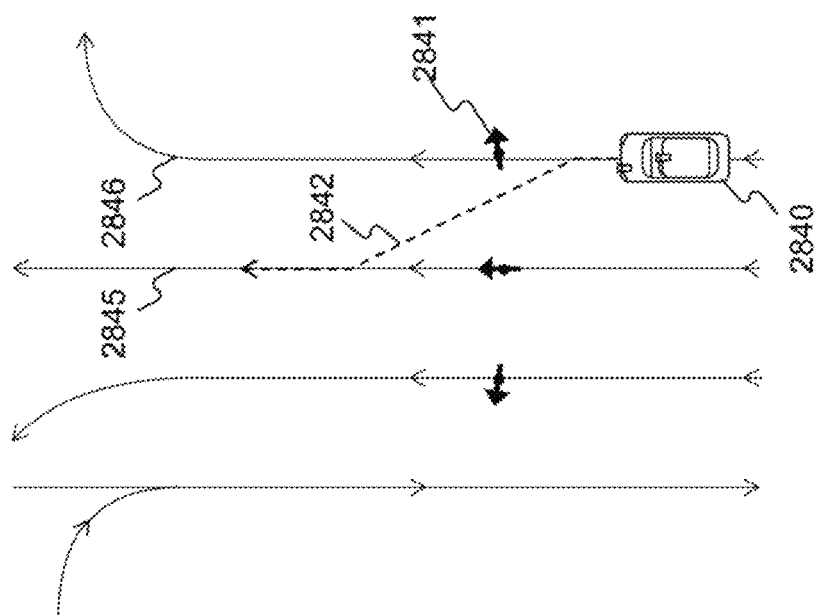
FIG. 28E shows an exemplary autonomous navigation action by a vehicle based on a mapped directional arrow, consistent with the disclosed embodiments.

In some embodiments, an autonomous vehicle may navigate based on directional arrows included in a road navigation model, such as sparse map 800. For example, the vehicle may receive sparse map 800 containing a mapped directional arrow. As described above, these mapped arrows may be determined based on data one or more previous vehicles traversing the same roadway. In some instances, the vehicle navigating based on the directional arrow in sparse map 800 may confirm the position and/or direction of the mapped arrow based on an arrow detected on the roadway. In other instances, the vehicle may interpret the mapped directional arrow, but may not detect the real-world arrow on the roadway. For example, the arrow may be worn, obscured by another object, or covered with dirt, snow, or other debris. In such instances, the autonomous vehicle may rely on the mapped arrow for navigation. FIG. 28E shows an exemplary autonomous navigation action by a vehicle based on a mapped directional arrow, consistent with the disclosed embodiments. Vehicle 2840 may receive a sparse map as shown, which, in this example, may correspond to the intersection shown in FIG. 28B. Vehicle 2840 (overlaid on the sparse map for illustrative purposes) may determine its longitudinal alignment along target trajectory 2846. Vehicle 2840 may then determine an autonomous navigation action based on mapped arrow 2841. If vehicle 2840 determines mapped arrow 2841 is consistent with the intended route (e.g., turning right at the intersection), the autonomous navigation action may include maintaining the same heading direction and/or reducing the vehicle's speed to prepare for the turn. In other instances, vehicle 2840 may determine that mapped arrow 2841 is inconsistent with the intended route of the vehicle (e.g., if the vehicle's intended route is straight through the intersection). Accordingly, vehicle 2840 may determine and/or implement steering action 2842, which may align the vehicle with a new target trajectory 2845. Various other autonomous navigation actions may also be performed, similar to those described above with respect to FIGS. 28A-28D.

Figure 29A:
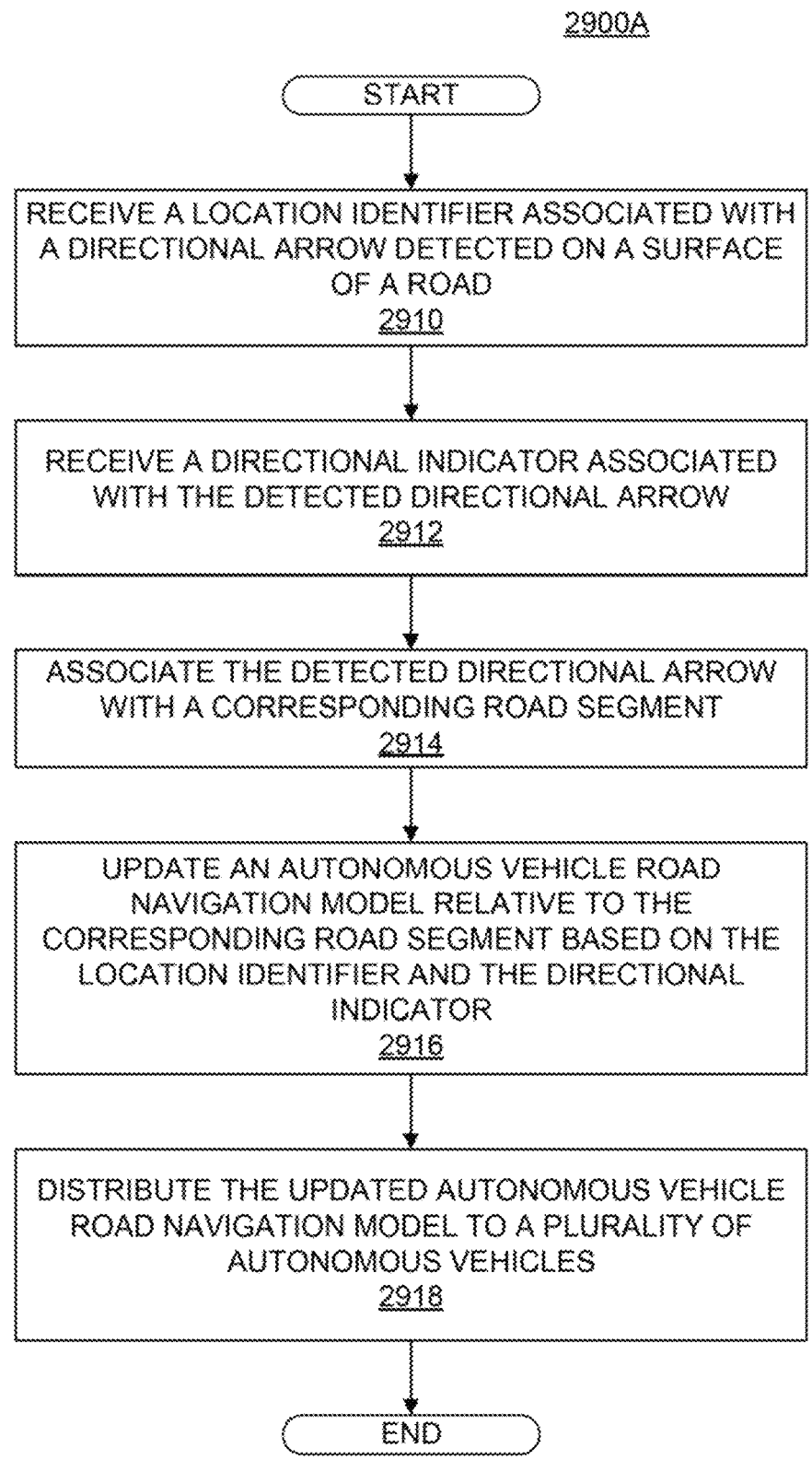
FIG. 29A is a flowchart showing an exemplary process for mapping a directional arrow for use in autonomous vehicle navigation consistent with disclosed embodiments.

FIG. 29A is a flowchart showing an exemplary process 2900A for mapping a directional arrow for use in autonomous vehicle navigation consistent with disclosed embodiments. Process 2900A may be performed by one or more processing devices included in a server, such as server 1230.

At step 2910, process 2900A may include receiving at least one location identifier associated with a directional arrow detected on a surface of a road. In some embodiments, the location identifier may be determined based on acquisition, from a camera associated with a host vehicle, of at least one image representative of an environment of the host vehicle. The directional arrow may be detected, for example, by vehicle 200 by capturing one or more images through image acquisition unit 120. The location identifier may further be determined by analysis of the at least one image to detect the directional arrow on the surface of the road in the environment of the host vehicle. For example, processing unit 110 may then analyze the captured images to identify the directional arrow within the captured image. Determining the location identifier may further include analysis of the at least one image to determine a position of the detected directional arrow relative to at least one location associated with the host vehicle. Processing unit 110, for example, may determine a location of the directional arrow relative to the location of the vehicle. The location may further be identified by identifying other features from the captured image, such as a landmark or lane mark with a known position.

The location identifier may also include a location in real world coordinates of a point associated with the detected directional arrow. For example, processing unit 110 may determine one or more points associated with the detected arrow, as described above with respect to FIG. 27B. One or more of these points may be associated with real-world coordinates, which may be determined based on the position of the vehicle and/or through analysis of a captured image. In some embodiments, the point may coincide with a location associated with a tip of the directional arrow. For example, tip point 2721 may be determined, as shown in FIG. 27B. In some instances, the true tip of the arrow may not be determined, but rather a reference point indicating the direction of the arrow, for example, when the arrow has a worn or rounded point. In other embodiments, the point may coincide with a location associated with an interior of the directional arrow. For example, the point may coincide with a center point of the arrow, a center point of the head, or other internal reference points.

At step 2912, process 2900A may include receiving at least one directional indicator associated with the detected directional arrow. Similar to the location identifier, the directional indicator may be determined by processing unit 110 based on an image acquired by vehicle 200. The direction of the arrow may be determined using various methods, as described above. For example, the directional indicator may be represented as a vector and may include an ordered pair of points associated with the detected directional arrow. Through the ordered pair of points, a direction may be ascertained, for example by determining a direction of a line from a first point to a second point in the ordered pair (e.g., from a tail point to a tip point, a center point to a tip point, etc.). The directional indicator may also include a designation of a point associated with the detected directional arrow as a tip of the directional arrow. Knowing which point corresponds to the tip point may be sufficient to identify the direction if at least one other point is known. In some embodiments, the directional indicator may include locations in real world coordinates of two or more points associated with a head of the detected directional arrow. For example, the tip point and one or more other vertex points of the head of the arrow may be identified.

At step 2914, process 2900A may include associating the detected directional arrow with a corresponding road segment. The association may be made based on location information associated with the detected arrow, and/or location of the vehicle. For example, server 1230 may correlate one or more real-world coordinates associated with the location identifier, with real-world locations of road segments in sparse map 800.

At step 2916, process 2900A may include updating an autonomous vehicle road navigation model relative to the corresponding road segment based on the at least one location identifier and based on the at least one directional indicator associated with the detected direction. Accordingly, updating the autonomous vehicle road navigation model may also include storing at least one indicator of position in real world coordinates and at least one indicator of orientation of the detected directional arrow. In some embodiments, the autonomous vehicle road navigation model may also include at least one target trajectory for a vehicle to follow along the corresponding road segment. In some embodiments, the target trajectory may be represented as a three-dimensional spline, for example, as shown in FIG. 9B. The location identifier and directional identifier may therefore be located with the road navigational model. For example, in sparse map 800, the directional arrow may be tied to a target trajectory of the vehicle.

In some embodiments, the directional arrows may be mapped using data received from a plurality of vehicles, such as through a crowdsourcing technique, as described above with respect to FIG. 27. For example, process 2900A may include receiving a first communication from a first host vehicle, the first communication including the at least one location identifier associated with the detected directional arrow, and receiving a second communication from a second host vehicle, the second communication including at least one additional directional indicator associated with the detected directional arrow. For example, the second communication may be received from a subsequent vehicle travelling on the same road segment, or from the same vehicle on a subsequent trip along the same road segment.

Process 2900A may further include refining a determination of at least one position associated with the detected directional arrow based on the at least one location identifier received in the first communication from the first host vehicle and based on the at least one location identifier received in the second communication from the second host vehicle. This may include using an average of the multiple location identifiers and directional arrows. Server 1230 may also be configured to filter out "ghost" identifiers or indicators that may not reflect the real-world directional arrow. For example, if a location identifier and directional indicator of a detected directional arrow are inconsistent with the associated target trajectory at that location, or the heading direction of the vehicle transmitting the data, the data may be omitted from the model. Accordingly, a processor performing process 2900A may forego the update to the autonomous vehicle road navigation model if a direction of travel of a host vehicle, from which the at least one location identifier and the at least one directional indicator were received, is not consistent with an orientation of the detected directional arrow determined based, at least in part, on the at least one directional indicator associated with the detected directional arrow. For example, the directional arrow data may be omitted if the direction of the directional indicator differs from the heading direction of the vehicle by more than a certain threshold (e.g., greater than 90 degrees in either direction).

At step 2918, process 2900A may include distributing the updated autonomous vehicle road navigation model to a plurality of autonomous vehicles. For example, server 1230 may distribute the updated autonomous vehicle road navigation model to vehicles 1205, 1210, 1215, 1220, and 1225, which may use the model for navigation. The autonomous vehicle road navigation model may be distributed via one or more networks (e.g., over a cellular network and/or the Internet, etc.), through wireless communication paths 1235, as shown in FIG. 12.

Figure 29B:
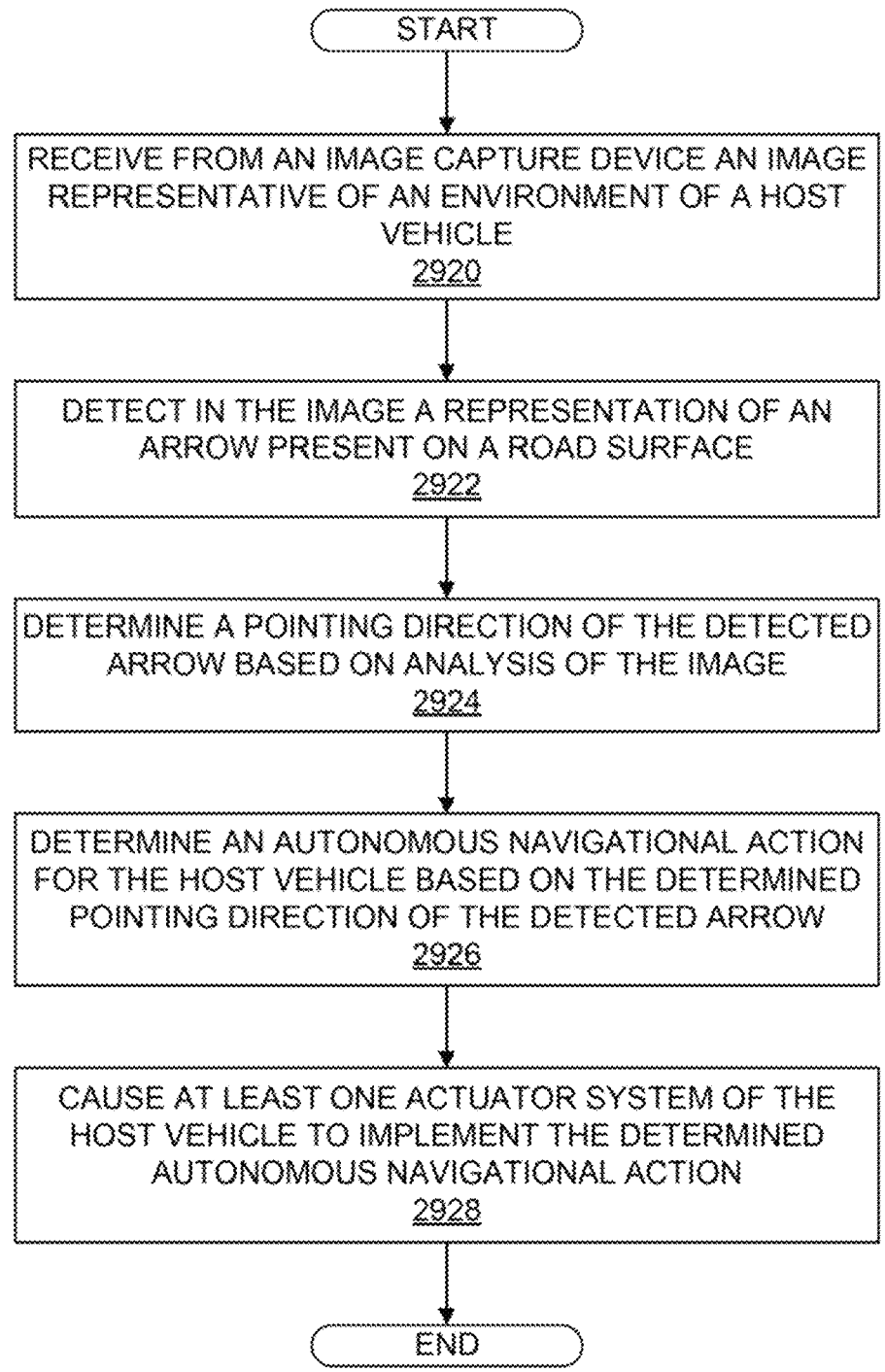
FIG. 29B is a flowchart showing an exemplary process for autonomously navigating a host vehicle along a road segment based on a detected directional arrow consistent with disclosed embodiments.

FIG. 29B is a flowchart showing an exemplary process 2900B for autonomously navigating a host vehicle along a road segment based on a detected directional arrow consistent with disclosed embodiments. Process 2900B may be performed by one or more processors included in processing unit 110. At step 2920, process 2900B may include receiving from an image capture device at least one image representative of an environment of the host vehicle. The image may be received from an image capture device of the vehicle, such as through image capture devices 122 and 124 included in image acquisition unit 120. The captured image may include an image of one or more directional arrows, similar to image 2735 described above (FIG. 27C).

At step 2922, process 2900B may include detecting in the at least one image a representation of an arrow present on a road surface. The image may be processed by processing unit 110 using various image processing techniques to identify the representation of the arrow. At step 2924, process 2900B may include determine a pointing direction of the detected arrow based on analysis of the at least one image. This may include determining one or more points or features of the detected arrow as described above with respect to FIG. 27B. For example, processing unit 110 may determine a tip point of the arrow and at least one other point (e.g., tail point, center point, internal point, two or more corner points, etc.). Based on these points, a direction of the arrow may be determined. When analyzing the images, processing unit may also take into account other factors such as the location of the camera, the camera angle, lens distortion, the camera viewing angle or other various factors.

At step 2926, process 2900B may include determining an autonomous navigational action for the host vehicle based on the determined pointing direction of the detected arrow. Various navigational actions based on detected directional arrows are described above with respect to FIGS. 28A-28D. In some embodiments, the detected arrow may be consistent with the vehicle's current direction of travel and the navigational action may include maintaining the vehicle's current heading direction. Conversely, if the detected arrow is inconsistent with the vehicle's current direction of travel, a corrective action may be determined and/or implemented. For example, the determined autonomous navigational action may include braking of the host vehicle, wherein the braking is implemented after a determination that the pointing direction of the detected arrow is substantially opposite to a direction of travel of the host vehicle. The determined autonomous navigational action may also include steering of the host vehicle based on a determination that the pointing direction of the detected arrow is inconsistent with a planned direction of travel for the host vehicle. For example, the vehicle may determine that it is in a turn lane and may move into an adjacent lane as shown in FIG. 28B. Alternatively, the vehicle may determine it is in a straight-only lane and may move into an adjacent turn lane, as shown in FIGS. 28C and 28D. Various other navigational actions may be implemented in addition to the examples provided above.

At step 2928, process 2900B may include causing at least one actuator system of the host vehicle to implement the determined autonomous navigational action. For example, based on the determined autonomous navigational action, vehicle 200 may be configured to operate one or more components of the vehicle, such as a steering mechanism, braking mechanism, or various other components. In some embodiments, the vehicle may instead initiate planning for a navigational action. For example, the detected arrow may not signal to immediately begin turning but may be factored in to longer term planning of the trajectory of the vehicle.

Figure 29C:
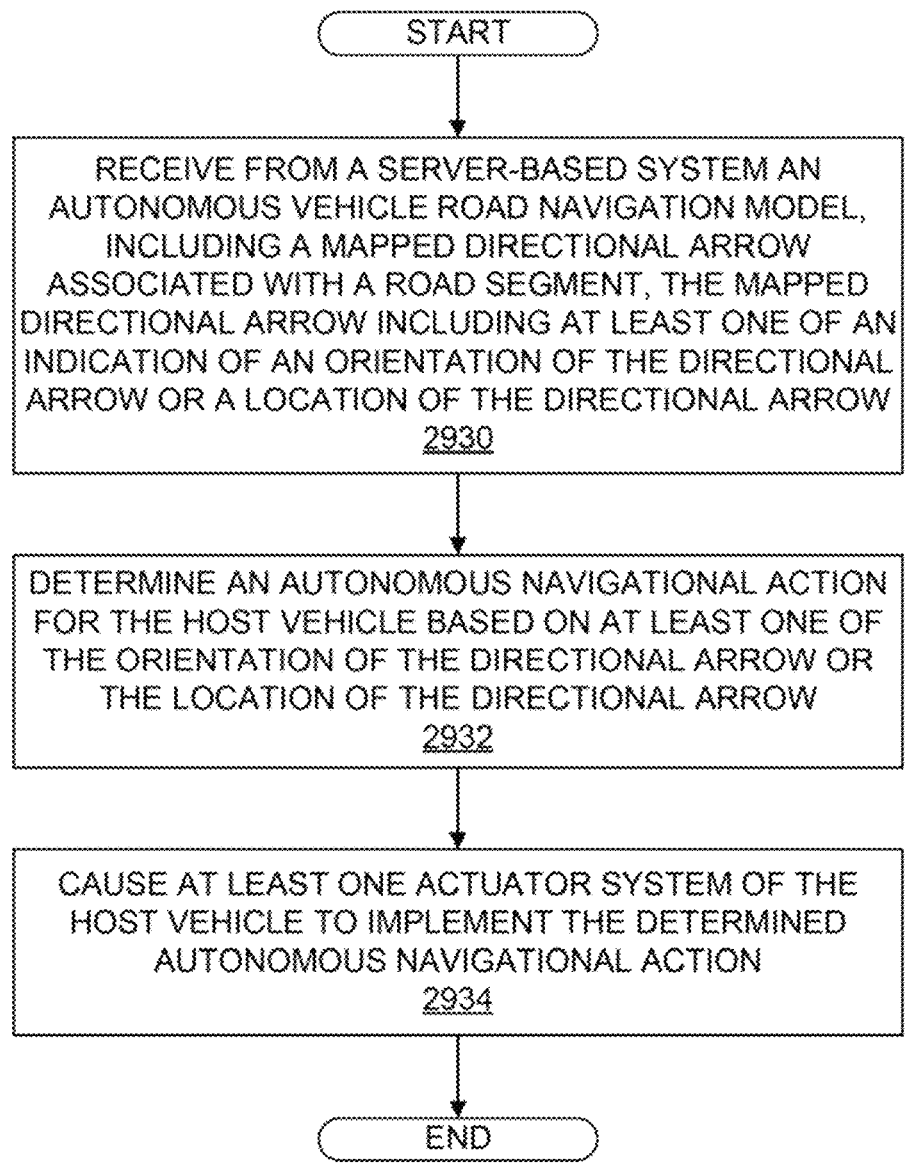
FIG. 29C is a flowchart showing an exemplary process for autonomously navigating a host vehicle along a road segment based on a mapped directional arrow consistent with disclosed embodiments.

An autonomous vehicle may also be configured to navigate based on mapped directional arrows, as described above. FIG. 29C is a flowchart showing an exemplary process 2900C for autonomously navigating a host vehicle along a road segment based on a mapped directional arrow consistent with disclosed embodiments. Process 2900C may be performed by one or more processors included in processing unit 110. At step 2930, process 2900C may include receiving from a server-based system an autonomous vehicle road navigation model. For example, vehicle 200 may receive sparse map 800 or another road navigation model developed using process 2900A. In some embodiments, the autonomous vehicle road navigation model may include a target trajectory for the host vehicle along the road segment, which may be represented as a three-dimensional spline, for example, as shown in FIG. 9B. The autonomous vehicle road navigation model may also include a mapped directional arrow associated with the road segment. The mapped directional arrow includes at least one of an indication of an orientation of the directional arrow or a location of the directional arrow, as described above. For example, the directional arrow may be mapped using location identifiers and directional indicators received from a plurality of vehicles according to process 2900A.

At step 2932, process 2900C may include determining an autonomous navigational action for the host vehicle based on at least one of the orientation of the directional arrow or the location of the directional arrow. In some embodiments, the determined autonomous navigational action may include steering of the host vehicle in a direction that increases a difference between a heading direction of the host vehicle and a pointing direction of the directional arrow. For example, the mapped directional arrow may indicate that the current lane is turn-only, which may be inconsistent with the vehicle's intended route of travel. Accordingly, the vehicle may move into an adjacent lane, thereby increasing the difference between the heading direction of the vehicle and the mapped directional arrow, as shown in FIG. 28E. Conversely, the determined autonomous navigational action may include steering of the host vehicle in a direction that reduces a difference between a heading direction of the host vehicle and a pointing direction of the directional arrow. For example, the vehicle may determine based on the mapped arrow that the current lane of travel is straight-only, which may be inconsistent with the intended route of travel. Accordingly, the vehicle may move into an adjacent lane, which may allow the vehicle to turn at an upcoming intersection. In some instances, the vehicle may determine the mapped directional arrow is consistent with the vehicle's current trajectory and/or intended route of travel. Accordingly, the determined autonomous navigational action may include maintaining a current heading direction of the host vehicle.

In some instances, the vehicle navigating based on the directional arrow in sparse map 800 may confirm the position and/or direction of the mapped arrow based on an arrow detected on the roadway. For example, the vehicle may receive from an image capture device at least one image representative of an environment of the host vehicle. In some embodiments, the vehicle may be configured to determine the autonomous navigational action for the host vehicle based on at least one of the orientation of the directional arrow or the location of the directional arrow even where a representation of the directional arrow does not appear in the at least one image representative of the environment of the host vehicle. In other words, the vehicle may not detect the arrow on the roadway (e.g., the arrow may be worn, obscured by another object, or covered) but may still rely on the mapped arrow to determine a navigation action.

Moreover, in some embodiments, the mapped directional arrow and/or the detected directional arrow may be used to determine a longitudinal position of the vehicle, similar to the landmarks discussed above. In such embodiments, process 2900C may further include receiving from an image capture device at least one image representative of an environment of the host vehicle and determining a longitudinal position of the host vehicle along the target trajectory based on a location of the mapped directional arrow and based on detection of the directional arrow in the at least one image. For example, the location of the detected directional arrow relative to the vehicle may be compared to the distance between an expected longitudinal position of the vehicle and the mapped directional arrow in sparse map 800.

At step 2933, process 2900C may include causing at least one actuator system of the host vehicle to implement the determined autonomous navigational action. Similar to process 2900B, vehicle 200 may be configured to operate one or more components of the vehicle based on the determined autonomous navigational action, such as a steering mechanism, braking mechanism, or various other components. In some embodiments, the vehicle may instead initiate planning for a navigational action. For example, the detected arrow may not signal to immediately begin turning but may be factored into longer term planning of the trajectory of the vehicle.

Selective Road Information Harvesting Based on Data Quality

The disclosed systems and methods may enable a vehicle to collect data while driving and transmit the data to a server or a cloud platform. This process, called harvesting, allows, for example, a "wisdom of crowds" algorithm to be applied on the server side. For example, a system may include an imaging device configured to capture images relating to the environment around a vehicle. The system may also include at least one processor configured to receive the captured images. The processor may also be configured to analyze the images and determine navigation information related to the vehicle.

The processor may further be configured to determine whether a fault condition exists relative to the navigation information. For instance, the processor may be configured to analyze the images and identify adverse weather (e.g., a rainy day) based on the analysis of the images. Additionally, the processor may be configured to determine that a fault condition is present due to the adverse weather. The navigation information collected when a fault condition exists may be inaccurate, and uploading inaccurate navigation information to a server may be counterproductive. Accordingly, the processor may also be configured to forego transmission of the navigation information from the vehicle to a server if a fault condition is determined to exist. On the other hand, if a fault condition is determined not to exist, the processor may be configured to transmit the navigation information to the server.

In some embodiments, the server may generate a road navigation model (and/or a map) based, at least in part, on the navigation information received from individual vehicles. Alternatively or additionally, the server may update a road navigation model based, at least in part on the navigation information received from individual vehicles. The server may also transmit the generated (and/or updated) road navigation model (and/or map) to one or more vehicles.

Figure 30A:
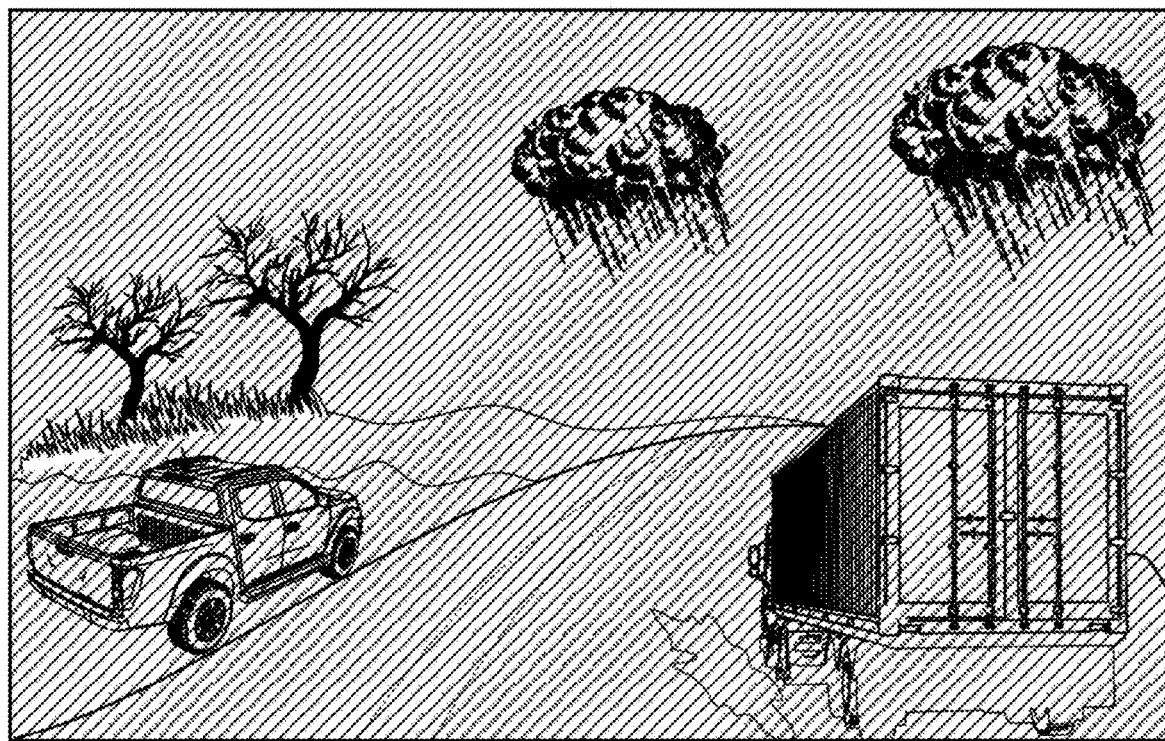
FIGS. 30A-D illustrate exemplary images relating to various fault conditions consistent with the disclosed embodiments.

FIGS. 30A-D and 31 are exemplary illustrations of captured images relating to the environments around a vehicle. FIG. 30A is an exemplary illustration of an image captured by an image capture device associated with a vehicle, which is traveling on a road in a raining day. A processing unit associated with the vehicle may be configured to receive the image. The processing unit may also be configured to analyze the images and determine navigation information related to the vehicle. For example, the processing unit may identify, based on the image, the road segment that the vehicle is traveling and/or road features of the road segment. Alternatively or additionally, the processing unit may identify objects around the vehicle (e.g., other vehicles around the vehicle). The processing unit may further identify adverse weather based on the image analysis and/or information acquired by one or more sensors associated with the vehicle. For example, the processing unit may determine that it was raining when the image was captured by detecting, for example, a low light condition and/or reflection of one or more objects on the road, based on the analysis of FIG. 30A. Other situations which may adversely affect image quality may include, for example, exposure to direct sunlight, or dirt (and/or a speck, a blotch, a smudge, or any other obstruction) covering a portion of the imaging device (e.g., a lens, image sensor, etc.) or the window of the housing through which the imaging device captures images, or the like, or a combination thereof. The processing unit may also be configured to forego transmission of the navigation information from the vehicle to a server if it determines that it was raining (i.e., a type of fault conditions).

Figure 30B:
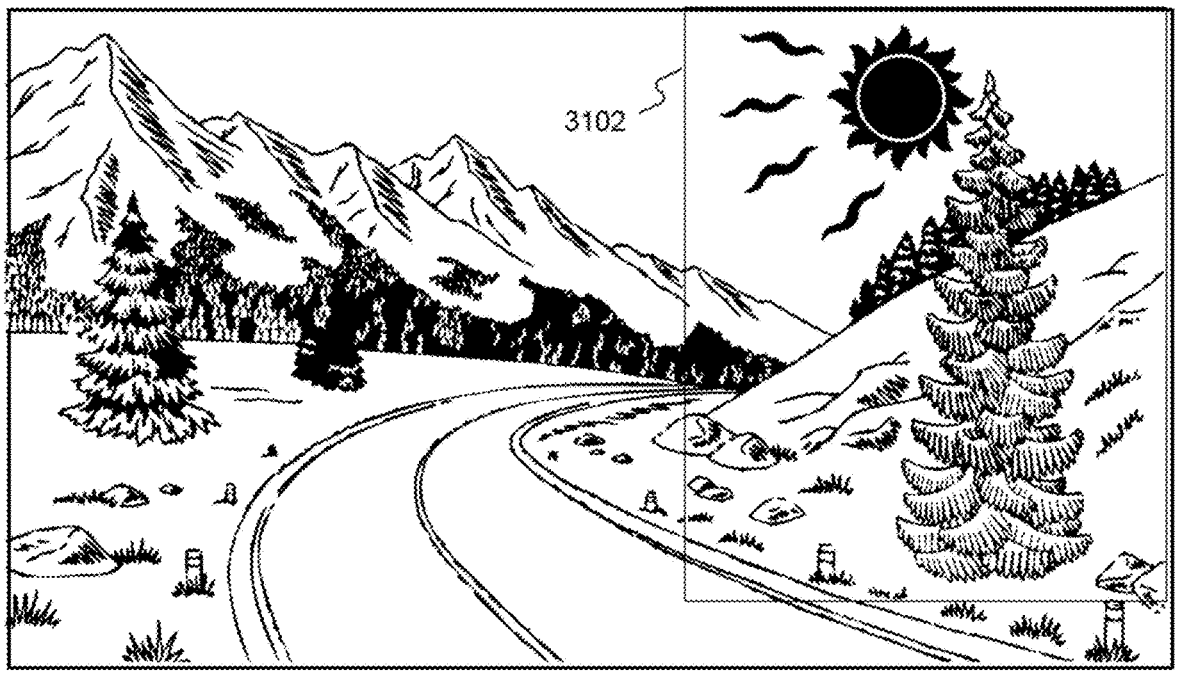
Figure 30C:
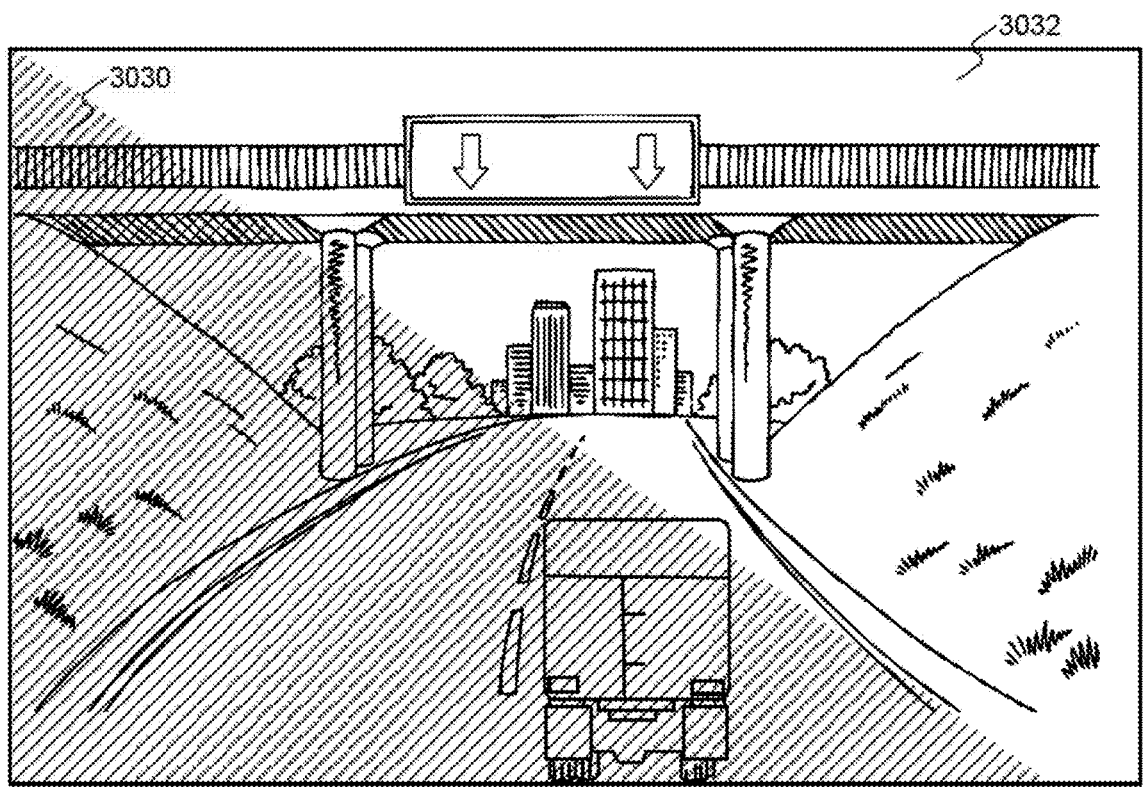
Figure 30D:
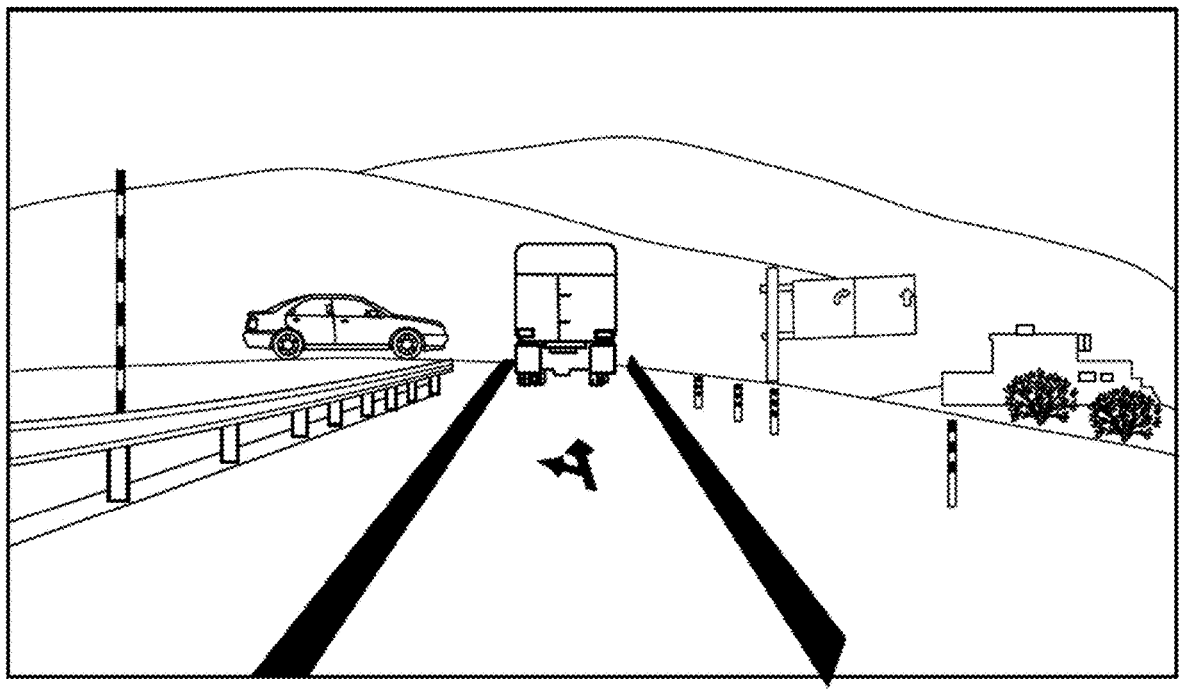

FIGS. 30B and 30C illustrate other exemplary types of fault conditions that a vehicle may encounter. FIG. 30B illustrates an image captured in a sunny day representing the environment around a vehicle traveling on a road in which sun glare appears to in region 3002 of the image. Region 3002 may appear too bright or overexposed (and/or having bleaching effect of bright light) because of the sun glare, which may affect the quality of the navigation information detected in the image. A processing unit associated with the vehicle may detect a fault condition based on the indicator of the sun glare and forego transmission of the navigation information from the vehicle to a server. FIG. 30C illustrates another exemplary image representing an environment of the vehicle. The image may include region 3030, which may appear underexposed (e.g., because the sunlight is blocked by a high building at the left of the vehicle), while region 3032 may appear normal or slightly overexposed. The navigation information detected in region 3031 (e.g., the lane structure, the lane markings, etc.) may be inaccurate or incomplete due to the underexposure in the region. A processing unit associated with the vehicle may determine that a fault condition exists and forego transmission of the navigation information from the vehicle to a server. As yet another example, FIG. 30D illustrates an exemplary image in which no fault condition is detected based on the analysis of the image. A processing unit associated with the vehicle may transmit the navigation information detected by the vehicle around the time of the image being captured to a server.

Figure 31:
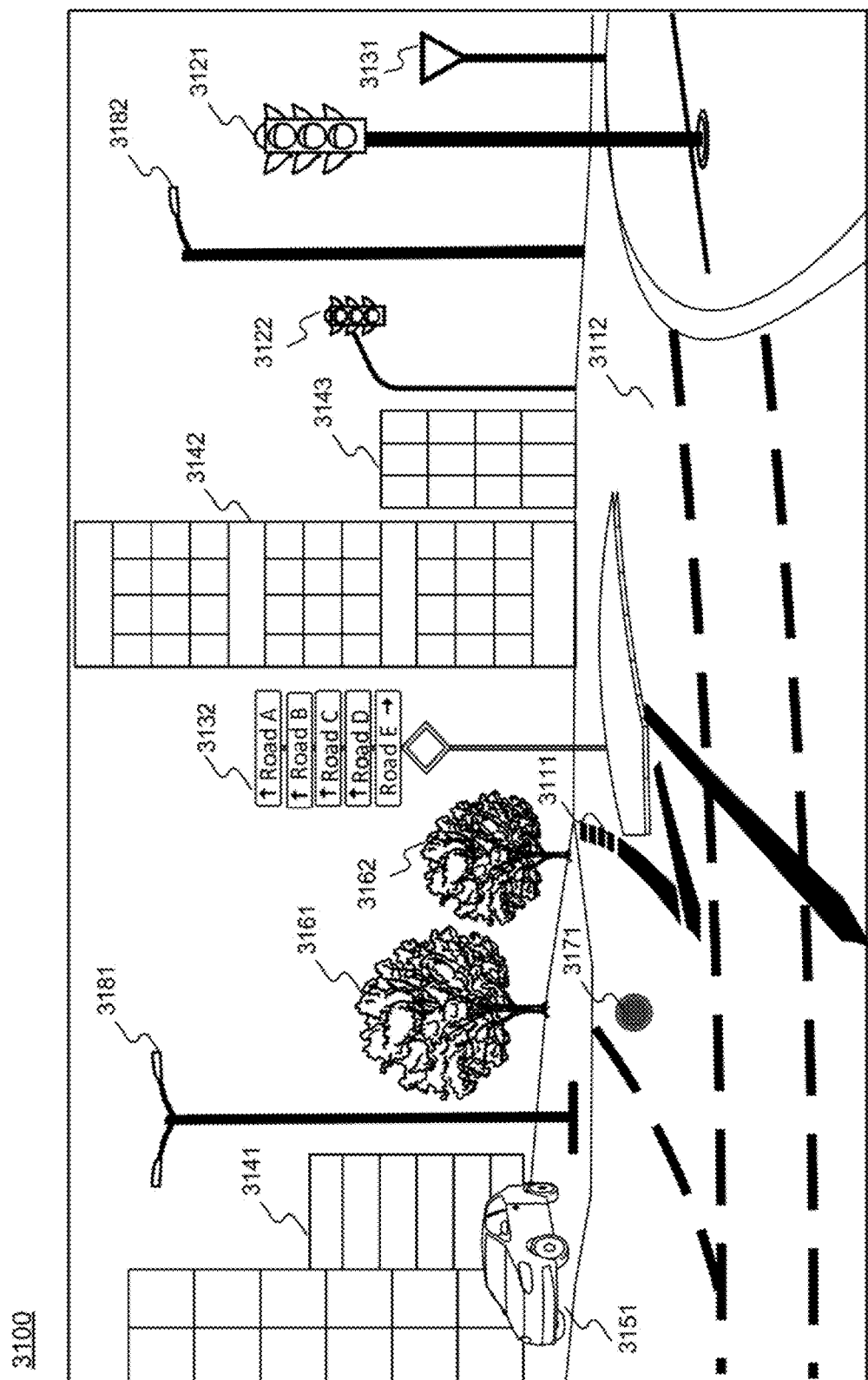
FIG. 31 illustrates an exemplary image of the environment of a vehicle consistent with the disclosed embodiments.

FIG. 31 illustrates an exemplary image 3100 captured by an imaging capture device, which represents the environment of a vehicle. A processing unit associated with the vehicle may receive and analyze image 3100. The processing unit may further determine navigation information based on image 3100. For example, the processing unit may detect road segments 3111 and 3112 and the lane markings thereof based on the analysis of the image. The processor may also detect other types of navigation information such as traffic lights 3121 and 3122, road signs 3131 and 3132, buildings 3141, 3142, and 3143, vehicle 3151, trees 3161 and 3162, manhole cover 3171, street lamps 3181 and 3182. The processing unit may also be configured to transmit the detected navigation information (or a portion thereof) to a server if no fault condition is determined to exist, as described elsewhere in this disclosure. Alternatively, if the processing unit detects a fault condition, the processing unit may be configured to forgo the transmission of the navigation information.

Figure 32:
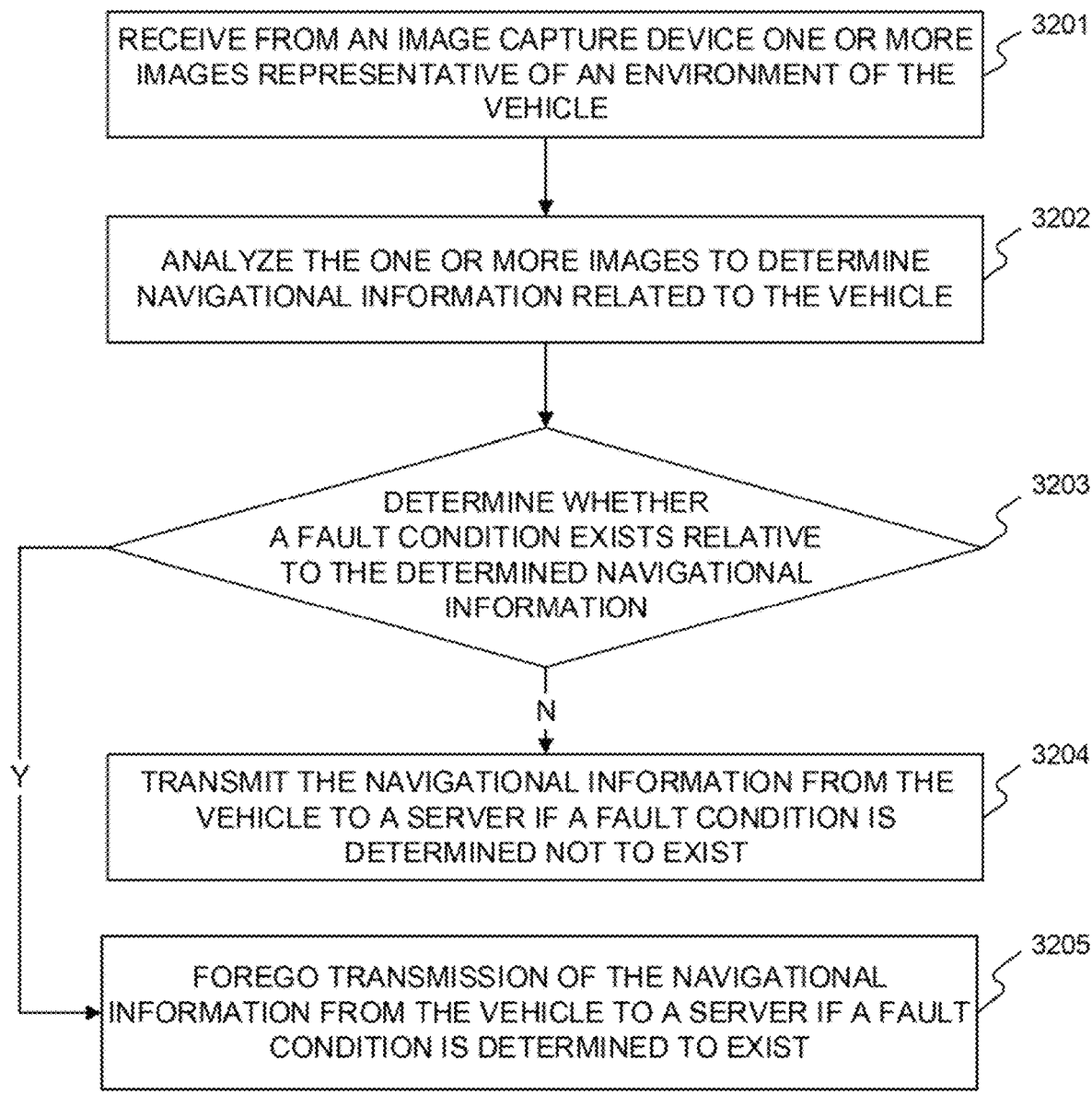
FIG. 32 is a flowchart showing an exemplary process for transmitting navigation information consistent with the disclosed embodiments.

FIG. 32 is a flowchart of showing an exemplary process 3200 for transmitting navigation information to a server. At step 3201, processing unit 110 may receive a plurality of images via data interface 128 between processing unit 110 and image acquisition unit 120. For instance, a camera included in image acquisition unit 120 (e.g., image capture device 122, 124, or 126) may capture a plurality of images of an area forward of vehicle 200 (or to the sides or rear of a vehicle, for example) and transmit them over a data connection (e.g., digital, wired, USB, wireless, Bluetooth, etc.) to processing unit 110. In some embodiments, one or more images received from image acquisition unit 120 may represent an environment of the vehicle. As discussed, FIGS. 30A-30D illustrate exemplary images acquired by one or more image capture devices representing the environments of one or more vehicles.

At step 3202, processing unit 110 may determine navigation information related to the vehicle. In some embodiments, processing unit 110 may analyze the one or more images to determine navigation information. For example, by performing the analysis, processing unit 110 may detect a set of features within the images, such as lane markings, vehicles, pedestrians, road signs, highway exit ramps, traffic lights, or the like, or a combination thereof. As discussed, FIG. 31 illustrates an exemplary image 3100 captured by an imaging capture device, which represents the environment of a vehicle. Processing unit 110 may analyze image 3100. Processing unit 110 may detect road segments 3111 and 3112 and the lane markings thereof based on the analysis of the image. Processing unit 110 may also detect other types of navigation information such as traffic lights 3121 and 3122, road signs 3131 and 3132, buildings 3141, 3142, and 3143, vehicle 3151, trees 3161 and 3162, manhole cover 3171, street lamps 3181 and 3182.

Alternatively, processing unit 110 may analyze information acquired by one or more sensors associated with the vehicle to determine navigation information. In other embodiments, processing unit 110 may analyze the one or more images and the information acquired by one or more sensors associated with to determine navigation information. For example, processing unit 110 may analyze the images and information provided by one or more sensors (e.g., a GPS device, a speed sensor, an accelerometer, a suspension sensor, or the like, or a combination thereof) and determine a representation of a path traveled by the vehicle over a road segment (i.e., a type of navigation information). Alternatively or additionally, processing unit 110 may determine other types of navigation information such as the speed of the vehicle during a traversal of a road segment, the stop location for the vehicle along a road segment traversed by the vehicle, the location information relating to the vehicle during a traversal of a road segment, or the like, based on the analysis of the images and information provided by the sensor(s). In some embodiments, the location information relating to the vehicle during a traversal of a road segment may be determined based, at least in part, on data acquired by a GPS unit associated with the vehicle.

In some embodiments, exemplary navigation information determined by processing unit 110 may include information relating to a road feature, a vehicle, a pedestrian, a landmark, or the like, or a combination thereof.

Exemplary road features may include a lane structure, a lane marking, the lateral spacing between the vehicle and a detected lane marking during a traversal of a road segment, the type of the road segment (e.g., a highway exit ramp), a road signature profile (e.g., road geometry, road roughness profile, road curvature profile, road width profile), or the like, or a combination thereof.

Exemplary lane structures may include the number of lanes of the road segment, the type of lanes (e.g., one-way lane, two-way lane, driving lane, passing lane, etc.), width of lanes, etc. In some embodiments, the navigation information may also include a lane assignment (e.g., which lane of a plurality of lanes a vehicle is traveling in).

Exemplary landmarks may include a manhole cover, a tree, overhead branch, a driveway, a sign post, a lamp post, bush, a drain, an overhead cable, a street light, a telecommunications component, or the like, or a combination thereof. In some embodiments, processing unit 110 may also determine the location associated with each of the identified landmarks (or objects). A landmark may be semantic or non-semantic. A semantic landmark may include any class of objects for which there's a standardized meaning (e.g., speed limit signs, warning signs, directional signs, etc.). A non-semantic landmark may include any object that is not associated with a standardized meaning (e.g., general advertising signs, signs identifying business establishments, etc.). In some embodiments, a semantic landmark may be identified based on the location and the type of the object.

In some embodiments, processing unit 110 may also determine the type of at least one of the detected landmarks and a landmark type designator for the at least one of the detected landmarks. For example, processing unit 110 may determine the landmark type designator of a detected traffic sign as a stop sign. Alternatively or additionally, processing unit 110 may determine a descriptor of at least one feature associated with at least one of the detected landmarks. For instance, processing unit 110 may determine the descriptor of a building close to an intersection as "white, triangular building."

In some embodiments, processing unit 110 may identify one or more potential landmarks based on the analysis of the images and/or information acquired by one or more sensors associated with the vehicle. For example, processing unit 110 may determine that an object detected in an image is likely to be a stop sign (e.g., by determining that the confidence level of the object being a stop sign is greater than a first threshold, but less than a second threshold). Processing unit 110 may designate this detected object as a potential landmark. A potential landmark may be semantic or non-semantic. In some embodiments, processing unit 110 may also determine the location associated with a detected potential landmark. In some embodiments, processing unit 110 may further determine a landmark type designator for at least one of the detected potential landmarks. For example, processing unit 110 may determine the landmark type designator of a detected potential traffic sign as a stop sign. Alternatively or additionally, processing unit 110 may determine a descriptor of at least one feature associated with at least one of the detected potential landmarks. For instance, processing unit 110 may determine the descriptor of a building close to an intersection as "white, triangular building."

At step 3203, processing unit 110 may determine whether a fault condition exists relative to the determined navigation information. A fault condition may refer to a condition under which the quality of the navigation information determined is questionable or inaccurate. Exemplary fault conditions may include conditions relating to adverse weather (e.g., rain, snow, fog, etc.), conditions relating to lighting condition (e.g., low light or sun glare in certain field of view of the image capture devices), conditions relating to one or more sensors provided in the vehicle (e.g., one or more sensors may not be operating or are malfunctioning), conditions relating to the data associated with the navigation information (e.g., certain data or parameter associated with the navigation information is missing), or the like, or a combination thereof.

In some embodiments, processing unit 110 may determine the existence of a fault condition based on analysis of the one or more images, an output of one or more sensors, the determined navigation information, or the like, or a combination thereof. For example, processing unit 110 may determine whether a fault condition exists based on the analysis of one or more images received from image acquisition unit 120. By way of example, FIG. 30A illustrates an exemplary image captured by a camera associated with a vehicle, which may represent an environment of the vehicle. Processing unit 110 may analyze the image and detect adverse weather (e.g., it is raining) based on at least one indicator of the adverse weather (e.g., the precipitation detected on a windshield or a road surface, the reflection of the objects on the wet road, raindrops, etc.). As discussed and as another example, FIG. 308 illustrates an exemplary image representing an environment of the vehicle in which sun glare appears to in region 3002 of the image. Region 3002 may appear too bright or overexposed (or having bleaching effect of bright light) because of the sun glare, which may affect the quality of the navigation information detected in the image. Processing unit 110 may detect a fault condition based on the indicator of the sun glare. FIG. 30C illustrates another exemplary image representing an environment of the vehicle. The image may include region 3031, which may appear underexposed (e.g., because the sunlight is blocked by a high building at the left of the vehicle), and region 3032, which may appear normal or slightly overexposed. The navigation information detected in region 3031 (e.g., the lane structure, the lane markings, etc.) may be inaccurate or incomplete due to the underexposure in the region. Processing unit 110 may determine that a fault condition exists. As yet another example, FIG. 30D illustrates an exemplary image in which no fault condition is detected based on the analysis of the image.

Alternatively or additionally, processing unit 110 may analyze information acquired by one or more sensors associated with the vehicle and determine adverse weather. Exemplary sensors to be used to detect a fault condition may include a GPS unit, a RADAR unit, a LIDAR unit, a speed sensor, or the like, or a combination thereof. For instance, processing unit 110 may determine the location of the vehicle based on information provided by a GPS device associated with the vehicle and determine that it is raining based on the determined location and weather information in the area (e.g., from a weather service provider). As another example, processing unit 110 may determine a fault condition based on the analysis of one or more sensor outputs indicating that at least one sensor has experienced a malfunction. As yet another example, processing unit 110 may determine adverse weather based on the image analysis and the information acquired by one or more sensors. By way of example, processing unit 110 may determine that it is raining based on the image analysis and information provided by a rain sensor associated with the vehicle.

Alternatively or additionally, processing unit 110 may analyze the navigation information and detect a fault condition based on the analysis. For example, processing unit 110 may detect a fault condition indicating a lack of a valid value for at least one parameter associated with the navigation information (e.g., if there is data missing). By way of example, processing unit 110 may detect a speed limit sign (e.g., a type of navigation information) in one or more images. Processing unit 110 may determine that the value of the speed limit is missing (e.g., due to illegibility of the number shown in the image). Processing unit 110 may detect the missing information as a fault condition.

In some embodiments, processing unit 110 may determine a state of the current weather based on the one or more images, information acquired by the sensor(s) associated with the vehicle, and/or the determined navigation information. Processing unit 110 may also determine a fault condition based on the state of the current weather. Exemplary states of the current weather may include clear, sunny, snow, rain, fog, low sun-light, or the like, or a combination thereof. In some embodiments, processing unit 110 may determine the state of the current weather using a multiclass classifier neural network. For example, processing unit 110 may determine the state of the current weather using a classifier running every a number of frames (e.g., 100 frames). The classifier may receive the frames as the input and generate a prediction of the current weather. For example, for a set of 100 frames, the classifier may generate predictions of the current weather: clear: 0.998; snow: 0.001; rain: 0; fog: 0.001; lowSun: 0.001. Processing unit 110 may determine that the state of the current weather as "clear," based on the predictions provided by the classifier. Processing unit 110 may further determine that no fault conduction (relating to the weather) exists. As another example, for another set of 100 frames, the classifier may generate predictions of the current weather: clear: 0; snow: 0.813; rain: 0.055: fog: 0.127; lowSun: 0.005. Processing unit 110 may also determine that the state of the current weather as "snow," based on the predictions. Processing unit 110 may further detect a fault condition (i.e., snow).

If processing unit 110 determines that a fault condition does not exist, at step 3204, processing unit 110 may cause a communication unit (e.g., wireless transceiver 172) to transmit the navigation information from the vehicle to a server (e.g., server 1230). In some embodiments, processing unit 110 may continuously transmit the navigation information detected to the server. Alternatively or additionally, processing unit 110 may periodically transmit the navigation information detected. Alternatively or additionally, processing unit 110 may transmit the navigation information detected depending on the status of the communication with the server. For instance, the communication unit associated with the vehicle may have poor reception in an area, and the transmission of data may be slow because of the reception issue. Processing unit 110 may cause the communication unit to transmit the navigation information detected to the server when the communication unit has a good connection with the server.

If a fault condition is detected, at step 3205, processing unit 110 may cause the communication unit to forego transmission of the navigation information from the vehicle to the server. For example, processing unit 110 may cause the communication unit not to transmit the navigation information relating to the fault condition(s) detected. In some embodiments, processing unit 110 may cause the communication unit to resume the transmission of the navigation information after no fault condition is detected.

In some embodiments, the server may generate a road navigation model based, at least in part, on the navigation information received from the vehicle. Alternatively or additionally, the server may update an existing road navigation model based, at least in part, on the navigation information received from the vehicle. The server may also transmit the generated (and/or updated) road navigation model to one or more vehicles (which may include the vehicle that transmits the navigation information). For example, processing unit 110 may receive a road navigation model from the server. The road navigation model may include at least one update based on the navigation information transmitted to the server by the vehicle (via, e.g., a communication unit associated with the vehicle). In some embodiments, the road navigation model generated and/or updated by the server using the navigation information received from the vehicle may be for an autonomous vehicle to navigate. For example, the vehicle (e.g., an autonomous vehicle or a vehicle capable of autonomous driving) may receive the road navigation model from the server and cause at least one navigational maneuver by the vehicle based on the autonomous vehicle road navigation model. In some embodiments, the autonomous vehicle road navigation model may include a target trajectory for the vehicle, which may be represented in the autonomous vehicle road navigation model as a three-dimensional spline.

Alternatively or additionally, the server may generate a map (e.g., a sparse map) based, at least in part, on the navigation information received from the vehicle. Alternatively or additionally, the server may update a map (e.g., a sparse map) based, at least in part, on the navigation information received from the vehicle. The server may also transmit the generated (or updated) map to one or more vehicles (which may include the vehicle that transmits the navigation information).

In some embodiments, a vehicle may navigate along a road segment according to the generated (or updated) sparse map and/or a generated road navigation model using the navigation information transmitted by one or more vehicles (e.g., vehicles 1205, 1210, 1215, 1220, or 1225).

Free Space Mapping and Navigation

The disclosed systems and methods may enable a vehicle to detect one or more location identifiers associated with a lateral region of free space adjacent to a road segment. The vehicle may transmit data relating to the detected location identifiers to a server, and the server may, in turn, update an autonomous vehicle road navigation model for the road segment based on the received data relating to the location identifiers. For example, the server may map the lateral region of free space adjacent to the road segment to an existing map (e.g., a sparse map), based on the location identifiers. The server may also update an autonomous vehicle road navigation model to include a mapped representation of the lateral region of free space. In some embodiments, the server may transmit the updated autonomous vehicle road navigation model to one or more autonomous vehicles.

In other embodiments, the disclosed systems and methods may enable an autonomous driving system to navigate a host vehicle along a road segment. The autonomous driving system may receive an autonomous vehicle road navigation model associated with the road segment from a server. The autonomous vehicle road navigation model may include a sparse map associated with the road segment, which may include a mapped representation of a lateral region of free space adjacent to the road segment. The autonomous driving system may also receive at least one image representative of an environment of the host vehicle from an image capture device. The autonomous driving system may further determine at least one navigational action for the host vehicle based on mapped representation of the at least one lateral region of free space adjacent to the road segment even where a representation of the at least one lateral region of free space does not appear in the at least one image representative of the environment of the host vehicle. The autonomous driving system may also cause one or more actuator systems associated with the host vehicle to implement the determined at least one navigational action for the host vehicle.

Figure 33:
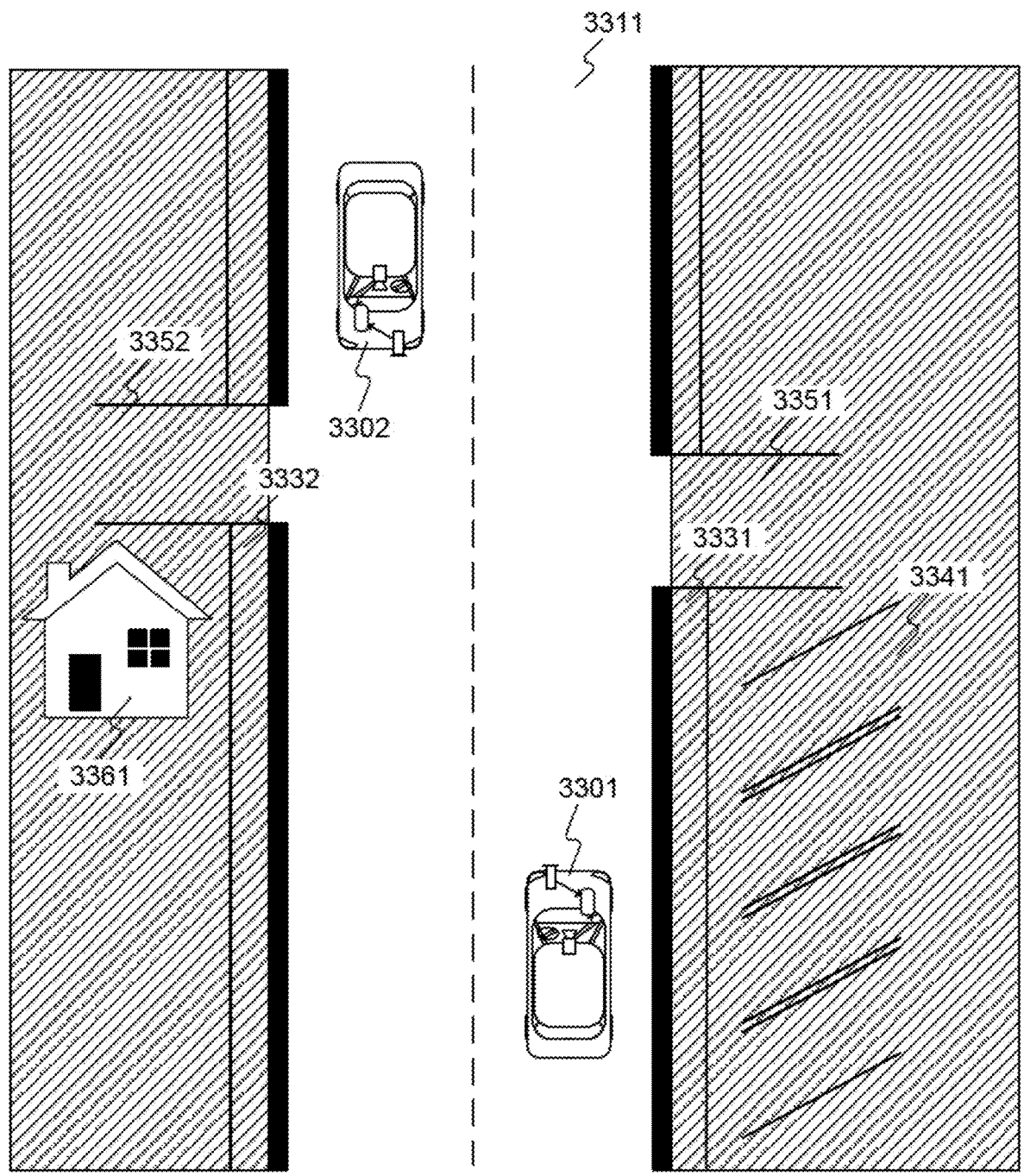
FIG. 33 is a schematic illustration of a system for mapping road segment free spaces and/or for autonomously navigating a host vehicle along a road segment, consistent with the disclosed embodiments.

FIG. 33 is a schematic illustration of a system for mapping road segment free spaces and/or for autonomously navigating a host vehicle along a road segment, consistent with the disclosed embodiments. As illustrated in FIG. 33, vehicles 3301 and 3302 may be traveling along road segment 3311. Vehicle 3301 may detect a lateral region of free space adjacent to road segment 3311. For example, an image capture device (e.g., image capture device 122, image capture device 124, and image capture device 126) associated with vehicle 3301 may capture one or more images of the environment around vehicle 3301. A processing unit associated with vehicle 3301 may analyze the images and determine one or more location identifiers associated with a lateral region of free space adjacent to road segment 3311. For example, the processing unit may determine a curb along road segment 3311 as a location identifier. The processing unit may also detect the lateral region of free spaces adjacent to road segment 3311 based on the location identifier. By way of example, the processing unit may determine sidewalk 3331 (i.e., a free space region) based on the curb detected along road segment 3311. The processing unit may further be configured to cause a communication device associated with vehicle 3301 to transmit the information relating to the location identifiers and/or the detected free space region.

Alternatively or additionally, a communication device associated with vehicle 3301 may transmit the image(s) captured by the image capture device to a server via a network, and the server may determine one or more location identifiers based on the image(s). The server may also determine one or more lateral regions of free space adjacent to road segment 3311, based on the location identifier(s). The server may also be configured to map a free space region to a map (e.g., a sparse map) and update an autonomous vehicle road navigation model for the road segment to include a mapped representation of the free space region. In some embodiments, the server may transmit the updated autonomous vehicle road navigation model to a plurality of autonomous vehicles. For example, the server may transmit the updated autonomous vehicle road navigation model to vehicle 3302 (and/or vehicle 3301). An autonomous system associated with vehicle 3302 may be configured to navigate vehicle 3302 based on the updated autonomous vehicle road navigation model.

FIG. 34 is a flowchart showing an exemplary process 3400 for mapping road segment free spaces. At step 3402, at least one processor associated with a server (e.g., server 1230) may receive from one or more vehicles (e.g., a first vehicle) one or more location identifiers associated with a lateral region of free space adjacent to a road segment. Exemplary lateral regions of free space adjacent to a road segment may include one or more of a driveway intersecting the road segment, a parking lot, or a sidewalk, or the like, or a combination thereof. Exemplary location identifiers may include one or more points or lines associated with a boundary of a region of free space, a landmark, one or more points or lines associated with a landmark, or the like, or a combination thereof. For example, referring to FIG. 33, an image capture device associated with vehicle 3301 may capture one or more images representing the environment around vehicle 3301. A processor unit associated with vehicle 3301 may determine one or more location identifiers associated with a free space region adjacent to road segment 3311. By way of example, the processor unit may determine one side of driveway 3351 (i.e., a location identifier) based on the analysis of the captured image. As another example, the processing unit 110 may determine a curb along road segment 3311 and one or more points or lines of a boundary of sidewalk 3331 adjacent to the curb. As yet another example, the processing unit may determine the presence of house 3361 (i.e., a landmark), which is adjacent to sidewalk 3332 and driveway 3352, based on the image.

In some embodiments, the processing unit may also determine one or more free space regions based on the determined location identifier. For example, the processing unit may determine driveway 3351 (e.g., location, boundaries, and/or shape thereof) based on the location identifier. Alternatively or additionally, the processing unit may transmit the location identifier(s) to the server, and the server may determine one or more free space regions based on the location identifier(s) received.

In some embodiments, the processing unit associated with the vehicle and/or the processor of the server may determine one or more additional characteristics associated with a free space region adjacent to a road segment. Exemplary additional characteristics of a free space region may include a type indicator (indicating the type of a free space region), shape, color, or the like, or a combination thereof. Exemplary type indicator may include a driveway, a parking lot, a sidewalk, or the like, or a combination thereof. For example, the processing unit associated with the vehicle may determine the type of a lateral region of free space (e.g., the free space region being a driveway, a parking lot, or a sidewalk) and determine a type indicator accordingly. The processing unit 110 may also be configured to transmit the additional characteristic(s) (e.g., a type indicator) to the server. Alternatively or additionally, the processor of the server may determine one or more additional characteristics associated with a free space region adjacent to a road segment, based on the location identifier.

In some embodiments, the processor of the server may be configured to receive one or more location identifiers from one or more other vehicles. For example, referring to FIG. 33, an image capture device associated with vehicle 3302 may capture one or more images representing the environment around vehicle 3302. A processor unit associated with vehicle 3302 may determine one or more location identifiers associated with a free space region adjacent to road segment 3311. By way of example, the processor unit associated with vehicle 3302 may determine one side of driveway 3352 (i.e., a location identifier) based on the analysis of the captured image. As another example, the processing unit associated with vehicle 3302 may determine a curb along road segment 3311 and one or more points or lines of a boundary of sidewalk 3332 adjacent to the curb. The processing unit associated with vehicle 3302 may also be configured to transmit the determined location identifier(s) to the server. In some embodiments, the server may consolidate (and/or aggregate) the location identifiers received from individual vehicles. For example, the server may receive information relating to one line of driveway 3351 from vehicle 3301 (i.e., a first location identifier associated with driveway 3351) and receive information relating to another line of driveway 3351 from vehicle 3302 (i.e., a second location identifier associated with driveway 3351). The server may consolidate the location identifiers associated with driveway 3351 received from the vehicles. For example, the server may associate both lines of driveway 3351 received from vehicle 3301 and vehicle 3302 to driveway 3351. In some embodiments, the server may also determine a refined mapped representation of driveway 3351 based on the aggregated location identifiers received from vehicle 3301 and vehicle 3302, as described elsewhere in this disclosure. In some embodiments, the server may remove duplicate location identifiers received from one or more vehicles.

At step 3404, the processor of the server may update an autonomous vehicle road navigation model for the road segment to include a mapped representation of the lateral region of free space based on the received one or more location identifiers. The mapped representation of the lateral region of free space may include location information associated with one or more detected boundaries of the lateral region of free space.

In some embodiments, the mapped representation of the lateral region of free space may include one or more additional characteristics associated with the free space region. For example, the mapped representation of the lateral region of free space may include a type indicator indicating the type of the free space region (e.g., the free space region being a driveway a parking lot, or a sidewalk).

In some embodiments, the updated autonomous vehicle road navigation model may include at least one target trajectory for the vehicle to navigate (e.g., to follow along the road segment, or drive through a free space region). A target trajectory may be represented in the autonomous vehicle road navigation model as a three-dimensional spline.

In some embodiments, the processor of the server may update the autonomous vehicle road navigation model for the road segment to include a refined mapped representation of the lateral region of free space, based on the one or more location identifiers received from the first vehicle and the one or more location identifiers received from the second vehicle. For example, the processor of the server may receive information relating to one line of driveway 3351 from vehicle 3301 (i.e., a first location identifier associated with driveway 3351) and receive information relating to another line of driveway 3351 from vehicle 3302 (i.e., a second location identifier associated with driveway 3351). The processor of the server may consolidate the location identifiers associated with driveway 3351 received from the vehicles. For example, the processor of the server may associate both lines of driveway 3351 received from vehicle 3301 and vehicle 3302 to driveway 3351. In some embodiments, the processor of the server may also determine a refined mapped representation of driveway 3351 based on the aggregated location identifiers received from vehicle 3301 and vehicle 3302 (compared to a mapped representation of driveway 3351 determined on the location identifier received from just one of vehicle 3301 and vehicle 3302).

At step 3406, the processor of the server may distribute the updated autonomous vehicle road navigation model to a plurality of autonomous vehicles. For example, the processor of the server may transmit the updated autonomous vehicle road navigation model to vehicle 3301 and vehicle 3302 (and other vehicles). In some embodiments, an autonomous vehicle may navigate according to the updated autonomous vehicle road navigation model.

FIG. 35 is a flowchart showing an exemplary process 3500 for autonomously navigating a host vehicle along a road segment. At step 3502, at least one processor of a system associated with a host vehicle may receive from a server (e.g., server 1230) an autonomous vehicle road navigation model. The autonomous vehicle road navigation model may include a sparse map associated with a road segment. In some embodiments, the autonomous vehicle road navigation model may include a mapped representation of at least one lateral region of free space adjacent to the road segment. As described above, exemplary lateral regions of free space may include one or more of a driveway, a parking lot, or a sidewalk, or the like, or a combination thereof. For example, referring to FIG. 33, vehicle 3302 may be an autonomous vehicle and may receive an autonomous vehicle road navigation model from a server. The autonomous vehicle road navigation model may include a mapped representation of parking lots 3341, which are adjacent to the road segment. In some embodiments, the autonomous vehicle road navigation model may also include one or more target trajectories representing valid travel paths for the host vehicle along the road segment (and/or one or more free space regions). In some embodiments, at least one of the one or more target trajectories representing valid travel paths for the host vehicle along the road segment may be represented as a three-dimensional spline.

In some embodiments, the autonomous vehicle road navigation model may include one or more mapped representation of at least one lateral region of free space adjacent to a road segment that is generated by process 3400 described above. For example, the server may update an autonomous vehicle road navigation model to include a mapped representation of the lateral region of free space based on one or more location identifiers received from one or more vehicles. An autonomous vehicle may receive the updated autonomous vehicle road navigation model from the server.

At step 3504, the processor may receive at least one image representative of an environment of the host vehicle from an image capture device (e.g., image capture device 122, image capture device 124, and image capture device 126) associated with the host vehicle.

At step 3506, the processor may determine at least one navigational action for the host vehicle based on mapped representation of the at least one lateral region of free space adjacent to the road segment even where a representation of the at least one lateral region of free space does not appear in the at least one image representative of the environment of the host vehicle. As such, the autonomous system may navigate the host vehicle based on the mapped lateral space even where the lateral space is occluded from the view (e.g., due to the blocked view by another vehicle, building, a fault condition (as described elsewhere in this disclosure), etc.). For example, referring to FIG. 33, the autonomous system associated with vehicle 3302 may determine at least one navigational action (e.g., navigating to enter driveway 3351) based on the mapped lateral space (e.g., driveway 3351) even when the driveway 3351 is occluded from the view (e.g., driveway 3351 being covered by snow).

In some embodiments, a navigational action may include a steering action resulting in a lateral move of the host vehicle away from the mapped representation of the at least one lateral region of free space adjacent to the road segment. For example, the lateral region of free space may include a driveway. Another vehicle may come out of the driveway. To avoid a potential collision, the autonomous vehicle associated with the host vehicle may determine a steering action resulting in a lateral move of the host vehicle away from the driveway.

At step 3508, the processor may cause one or more actuator systems associated with the host vehicle to implement the determined at least one navigational action for the host vehicle. Exemplary navigational actions may include a braking action, a coasting action, or a steering action, or the like, or a combination thereof. For example, referring to FIG. 33, the autonomous system associated with vehicle 3302 may cause one or more actuator systems associated with vehicle 3302 to navigate to enter driveway 3351 by taking a braking action to decrease the speed and steering to the left into driveway 3351.

In some embodiments, the processor may be configured to cause the implementation of the navigational action based on one or more other factors. For example, the processor may be configured to cause implementation of the navigational action based on a determination that the lateral region of free space adjacent to the road segment has a size sufficient to allow a pedestrian (and/or another vehicle) to enter the road segment. By way of example, the autonomous system associated with vehicle 3302 may cause one or more actuator systems associated with vehicle 3302 to navigate to enter driveway 3351 and keep closer to one side of driveway 3351 so that driveway 3351 has a size sufficient to allow a pedestrian to walk (and/or another vehicle to drive to road segment 3311) when vehicle 3302 enters driveway 3351.

Relevant Traffic Light Manning and Navigation

The present disclosure describes a navigation system for an autonomous vehicle that may be configured to identify traffic lights along a roadway traveled by an autonomous vehicle. The navigation system may be configured to receive information from the autonomous vehicles about locations of various traffic lights along the roadway, map the locations of the traffic map on a sparse map available to the navigation system and to the autonomous vehicles, and receive from the autonomous vehicles various information related to the traffic lights, as well as information related to the autonomous vehicle navigation. For example, when an autonomous vehicle approaches a traffic light that has a green light, and proceeds to travel along a roadway, the system may be configured to receive the information about the state of the traffic light (e.g., the traffic light has a green light) as well as the information that the autonomous vehicle has continued to travel along the roadway. Using the received information, the system may determine the relevancy of the traffic light to a lane traveled by the autonomous vehicle.

In various embodiments, the navigation system includes functionality for mapping traffic lights and for determining traffic light relevancy for use in autonomous vehicle navigation. Furthermore, the navigation system may be used to provide autonomous vehicle navigation. The navigation system may be part of server 1230, or/and may be part of a vehicle control system associated with an autonomous vehicle. In some embodiments, the navigation system may include a first navigation system that may be associated with an autonomous vehicle (also referred to as a vehicle navigation system), and a second navigation system that may be associated with server 1230 (also referred to as a server navigation system). The navigation system may include non-transitory storage devices or computer-readable media. In some embodiments, the storage devices may include hard drives, compact discs, flash memory, magnetic-based memory devices, optical based memory devices, and the like. The navigation system may include one or more processors configured to perform instructions that may be stored on one or more non-transitory storage devices associated with the navigation system. In some embodiments, the navigation system may include a separate mapping system and a separate navigation system.

A navigational action may be executed by a vehicle relating to vehicle navigation. For example, navigational actions are actions that are related to vehicle motion, such as steering, braking, or acceleration of the vehicle. In various embodiments, the navigational action may include parameters such as rate of steering, rate of braking or rate of acceleration. In various embodiments, navigational action may include actions that may not be directly related to the motion of a vehicle. For example, such navigational actions may include turning on/off headlights, engaging/disengaging antilock brakes, switching transmission gears, adjusting parameters of a vehicle suspension, turning on/off vehicle warning lights, turning on/off vehicle turning lights or brake lights, producing audible signals and the like. In various embodiments, navigational actions are based on navigational data available to server 1230.

The navigational data available to server 1230 may include any suitable data available for server 1230 that may be used to facilitate navigation of various vehicles communicating with server 1230. Examples of navigational data may include the position of various autonomous and human-operated vehicles that are in communication with server 1230, velocities of the various vehicles, accelerations of the various vehicles, destinations for the various vehicles, and the like.

It should be noted that navigational actions involve any suitable actions that change navigational information of a vehicle. In an example embodiment, change of vehicle's velocity may constitute a navigational action, as it changes the navigational information for the vehicle. The navigational information may describe dynamic or kinematic characteristics of the vehicle, and may include a position of the vehicle, a distance between the vehicle and the traffic light, a velocity of the vehicle, a speed of the vehicle, an acceleration of the vehicle, an orientation of the vehicle, an angular velocity of the vehicle, and an angular acceleration of the vehicle, as well as forces acting on the vehicle. The navigational information may be recorded by the vehicle control system. For example, a position of the vehicle may be continuously recorded to provide indicators for a path traveled by the vehicle along a road segment. For instance, the indicators of the path may be a trajectory for the vehicle. In some cases, the trajectory for the vehicle may indicate a stopping location for the vehicle along the road segment.

The navigational information may also include parameters related to vehicle characteristics, such as a mass of the vehicle, a moment of inertia of the vehicle, a length of the vehicle, a width of the vehicle, a height of the vehicle, vehicle traction with a roadway, and the like.

In various embodiments, the navigation system may receive from an autonomous vehicle at least one location identifier associated with a traffic light detected along a road segment. The term "location identifier" may be any suitable identifier (e.g., a numerical identifier, an alphanumerical identifier, a set of numbers such as coordinates of the traffic light and the like) associated with a traffic light that allows unique identification of a location of the traffic light at least by server 1230. For example, server 1230 may use the location identifier to identify the location of the traffic light on the map. Additionally, or alternatively, the traffic light location identifier may allow unique identification of the traffic light by at least one vehicle in the proximity of the traffic light. For instance, a vehicle may identify the traffic light using the traffic light identifier on a sparse map accessible to the vehicle.

The navigation system may also receive, from an autonomous vehicle, a state identifier associated with the traffic light detected along the road segment. A state identifier for a traffic light may be used to identify a state for a traffic light that can be used on a roadway. For example, the state of the traffic light can be represented by a color of the traffic light (e.g., red, green, yellow, or white), by an image displayed by the traffic light (e.g., green arrow, orange palm, image of a person, and the like), or by words displayed by the traffic light (e.g., speed of a vehicle, indication to slow down, indication of road work, and the like).

In various embodiments, the navigation system may receive from multiple autonomous vehicles various states of the traffic light, when the autonomous vehicles pass through the traffic light at different times throughout the day. In an example embodiment, the information about the state of the traffic light may be collected from an autonomous vehicle at several different locations from the traffic light. For example, the information about the state of the traffic light may first be received from the vehicle at a first distance from the traffic light. The first distance may be, for example, a distance at which the traffic light is first observed by the vehicle control system associated with the autonomous vehicle. The information about the state of the traffic light may then be received for the autonomous vehicle when it is located at a set of locations relative to the traffic light, including a location when the vehicle enters a junction of a roadway related to the traffic light or passes the junction of the roadway. In various embodiments, the autonomous vehicle may collect state information for all the traffic lights of the junction that are observable to the autonomous vehicle as it moves towards, through, or away from the junction. In various embodiments, the navigation system may determine a relationship between the states of all the traffic lights of the junction that are observable to the autonomous vehicle by determining a correlation between all of the collected state-related data (e.g., by determining correlation between one traffic light having a green light state and another traffic light having a red light state).

In some embodiments, traffic lights may include parameters that may not be observable to a human vehicle operator (e.g., human driver), but may be detectable by an autonomous vehicle. For example, a traffic light may communicate with an autonomous vehicle using wireless communication. The wireless communication may include one or more devices configured to exchange transmissions over an air interface to one or more networks (e.g., cellular, the Internet, etc.) using an electromagnetic field at the radio frequency, infrared frequency, or ultraviolet frequency. Additionally, or alternatively, wireless communication may use magnetic fields, electric fields or sound. Such transmissions can include communications between a traffic light and an autonomous vehicle in the proximity of the traffic light, and/or in some cases, such communication may include communication between the traffic light and server 1230 and between server 1230 and an autonomous vehicle. It should be noted, that various other forms of communication between the traffic light and the vehicle may be used that may include audio communication (e.g., communication using soundwaves such as ultrasound, laser-based communications and the like). In some cases, communications may include time-dependent visible communications (e.g., time-dependent signal produced by LED sources).

In various embodiments, a traffic light may include a traffic light communication system for generating a signal to an autonomous vehicle. For example, the traffic light communication system may include a signal generating module for generating a "stop" signal, a "go" signal, a "slowdown" signal, a "speedup" signal and the like. For example, the "stop" signal may indicate that the autonomous vehicle needs to abruptly stop. Such signal, for example, may correspond to a red light. The "go" signal may indicate that the vehicle needs to start or continue moving. Such signal may correspond, for example, to a green light. The "slowdown" signal may indicate that the autonomous vehicle needs to slow down. In some embodiments, the "slowdown" signal may include additional parameters incorporated in information related to the signal that may include the required speed for the vehicle or deceleration of the vehicle. In an example embodiment, the "slowdown" signal may correspond to yellow light. The "speed up" signal may indicate that the autonomous vehicle needs to increase its speed. It should be noted that various signals described above are only illustrative and various other signals may be incorporated as well. For example, generated signals may indicate that the vehicle needs to turn to the right, turn to the left, change lanes, or make a U-turn.

In various embodiments, in addition to generating signals, the traffic light communication system may receive navigational information from various vehicles and generate signals based on the received information. For example, the traffic light communication system may receive vehicle's speed and a distance of the vehicle from the traffic light, and may generate deceleration request for the vehicle based on the vehicle's speed and the distance from the traffic light.

In various embodiments, communication may include various ways to authenticate communication from/to a traffic light as well as to provide secure communication between the traffic light and an autonomous vehicle. Additionally, or alternatively, secure communication may be established between the autonomous vehicle and server 1230. In an example embodiment, secure communication may be established through the use of private and public keys. For example, the autonomous vehicle and server 1230 may exchange the public key for encrypting the secure information and may use private keys for information decryption. Similarly, the autonomous vehicle may exchange public keys with the traffic light communication system. In some embodiments, the traffic light communication system may authenticate through server 1230. For example, the traffic light communication system may provide password information to the server 1230 and server 1230 may issue a secure token to the traffic light communication system. In some embodiment, server 1230 may encrypt the secure token using the public key of the traffic light communication system and transmit the encrypted token to the traffic light communication system. Further server 1230 may be configured to encrypt the secure token using public key associated with an autonomous vehicle and transmit the encrypted token to the autonomous vehicle. In various embodiments, the traffic communication system may include the secure token for a communication data packet transmitted to the autonomous vehicle to provide authentication for the vehicle. Additionally, or alternatively, the traffic communication system may include the secure token for a communication data packet transmitted to server 1230. In a similar way, the autonomous vehicle may include the secure token for a communication data packet transmitted to the traffic light communication system. Additionally, or alternatively, the autonomous vehicle may include the secure token for a communication data packet transmitted to server 1230. It should be noted, that the secure communication process described above is only illustrative, and various other approaches may be used. The authenticated secure communication between various autonomous vehicles, traffic lights, and server 1230 (as well as secure communication among various autonomous vehicles) may ensure that system for navigation of various autonomous vehicles cannot be compromised by a third party (e.g., a party attempting to alter movements of the autonomous vehicles).

Figure 36A:
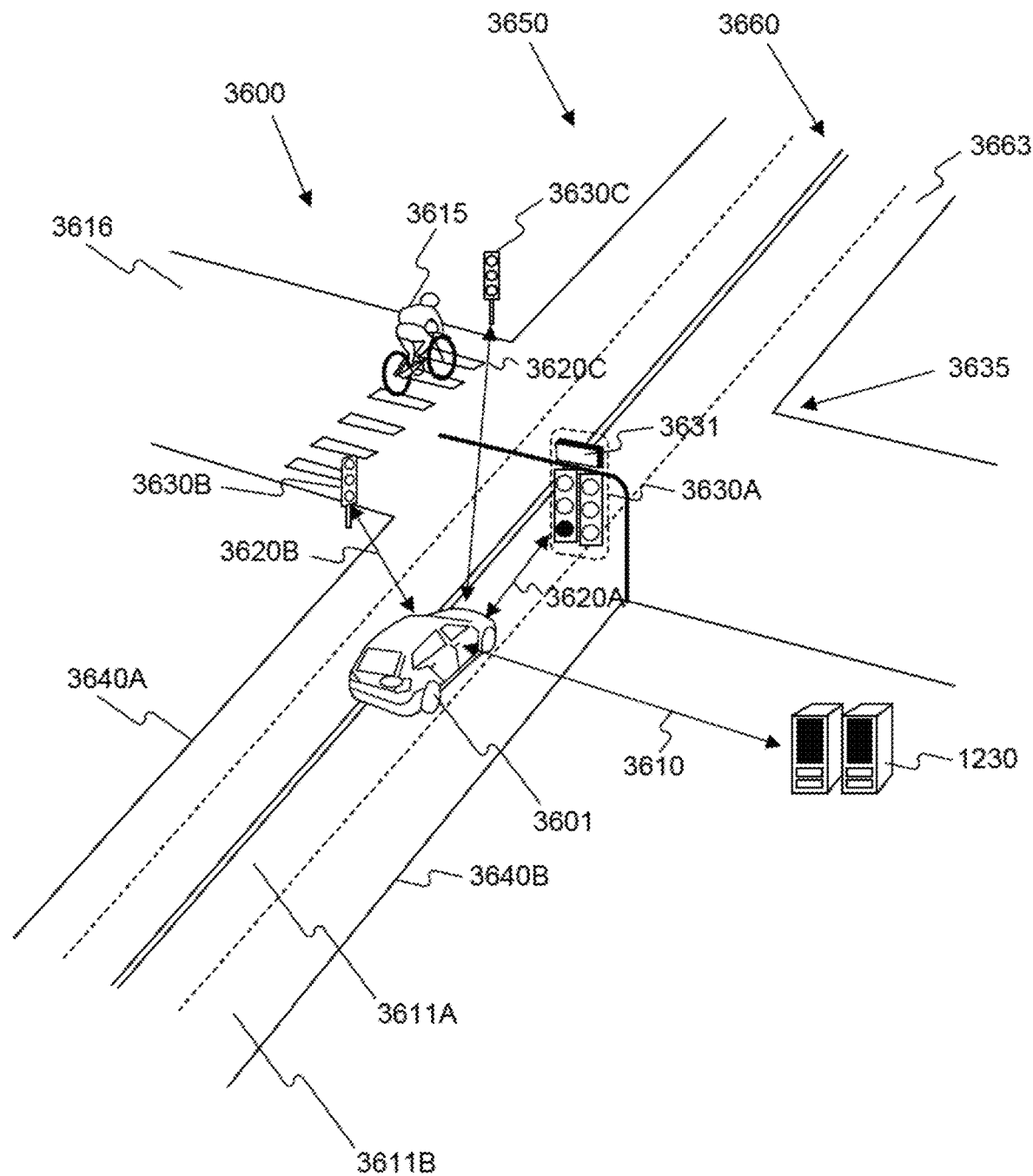
FIG. 36A is a schematic illustration of a roadway including an intersection, consistent with the disclosed embodiments.

FIG. 36A shows a system 3600 that includes server 1230, traffic lights 3630A-3630C, and a vehicle 3601. In some embodiments, vehicle 3610 may bean autonomous vehicle. Vehicle 3601 may be traveling along a lane 3611A of a roadway 3660 that contains an intersection 3635. Vehicle 3601 may detect a traffic light (e.g., traffic light 3630A) and determine a location of traffic light 3630A. In various embodiments, when referring to representative vehicles, vehicle 3601 is used, when referring to a representative lane traveled by vehicle 3601, lane 361I A is used, and when referring to a representative traffic light related to a representative lane, traffic light 3630A is used. FIG. 36A illustrates a set of roads that may be defined as a roadmap 3650 as indicated in FIG. 36A. Roadmap 3650 may include all the lanes/pathways, roadways, driveways, bicycle lanes, pedestrian lanes, sidewalks, etc. in proximity to vehicle 3601 (e.g., a region about vehicle 3601 with a radial distance of ten feet to few miles). A portion of a roadway around vehicle 3601 may be defined as a road segment 3663 indicated in FIG. 36A.

In an example embodiment, vehicle 3601 may determine a location identifier of traffic light 3630A based on the vehicle 3601 location (e.g., obtained via a vehicle's GPS) and/or based on direction to traffic light 3630A as well as the apparent distance to traffic light 3630A (e.g., distance deduced from multiple images captured by camera of vehicle 3601). In some embodiments, distance to a traffic light located to the left or right side of a moving vehicle 3601 may be obtained using triangulation. For example, distance to traffic light 3630B or 3630C may be obtained using triangulation.

Figure 36B:
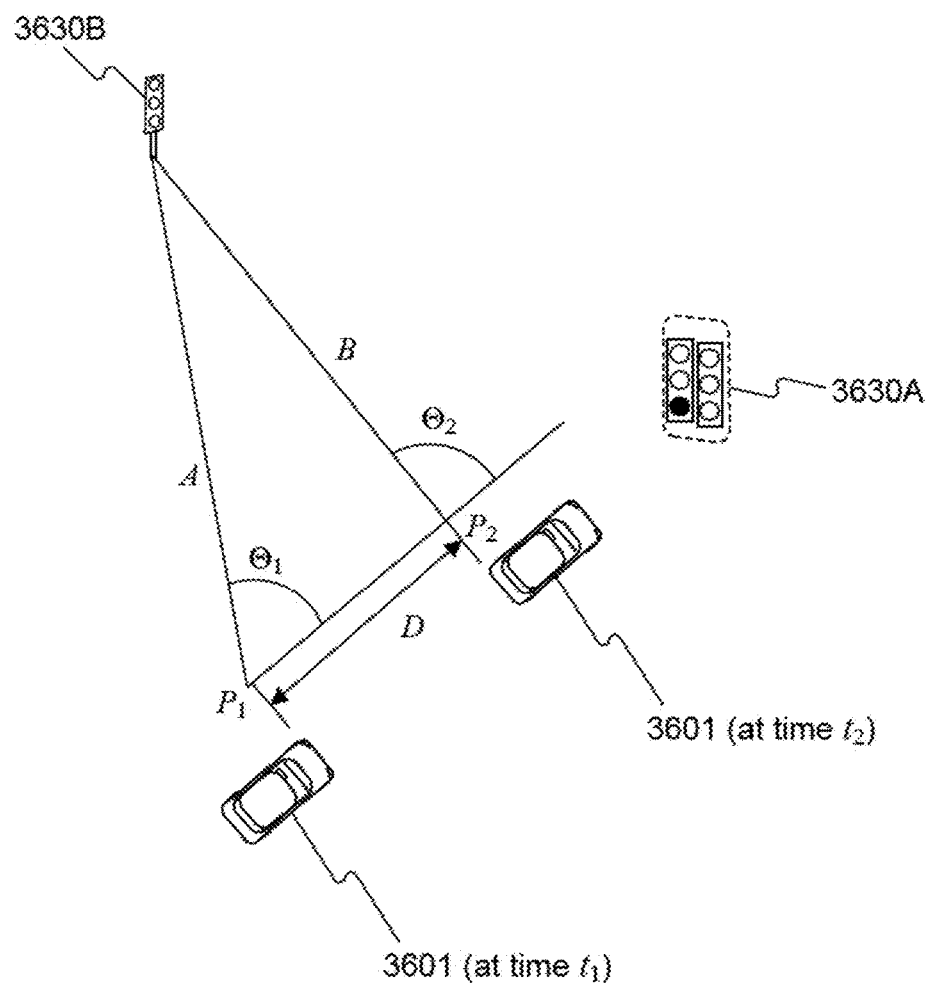
FIG. 36B is a schematic illustration of a triangulation technique for determining a position of a vehicle relative to a traffic light, consistent with the disclosed embodiments.

FIG. 36B shows a triangulation example where vehicle 3601 is traveling from point $P_1$ corresponding to a position of vehicle 3601 at a first time (time $t_1$) to point $P_2$ corresponding to a position of vehicle 3601 at a second time (time $t_2$) through a distance D that can be accurately measured by vehicle 3601. In an example embodiment, vehicle 3601 is traveling towards traffic light 3630A, which may not be used for triangulation, as it may be in a path of vehicle 3601. Vehicle 3601 camera may observe traffic light 3630B and measure angles $\theta_1$ and $\theta_2$, as shown in FIG. 36B. Using angles $\theta_1$ and $\theta_2$, and distance D, sides A and B may be determined (using, for example, the law of sines) providing the distances A and 8, and corresponding directions, characterized by angles $\theta_1$ and $\theta_2$, from vehicle 3601 to traffic light 3630B. The distance to traffic light 3630A may then be determined by using a displacement vector (e.g., distance and direction) between traffic light 3630B and 3630A. It should be noted that displacement vector between traffic lights 3630B and 3630A may be known to the navigation system as traffic lights 3630A-3630C may be recognized landmarks on the map related to the roadway traveled by vehicle 3601. It should be noted, that for vehicles with accurate GPS, (e.g., GPS reporting the location of a vehicle with the accuracy of a few feet to a few tens of feet) the triangulation procedure may not be necessary and position of vehicle 3601 may be evaluated using GPS coordinates.

In an example embodiment, the navigation system may be configured to receive a location of vehicle 3601 and determine the one or more recognized landmarks in the vicinity of the location of vehicle 3601, such as traffic lights 3630A-3630C. It should be noted, that the triangulation approach may be one of many approaches used to measure distance and direction to various traffic lights. Additionally, or alternatively, vehicle 3601 may measure distance and direction to a traffic light (e.g., traffic light 3630A) using any other suitable means (e.g., radar, lidar, acoustic sensors, information received from one or more transceivers outside of a vehicle, etc.). In various embodiments, vehicle 3601 may determine locations of various traffic lights such as traffic lights 3630A-3630C, and report location identifiers for these traffic lights to the navigation system. In an example embodiment, vehicle 3601 may be configured to report location identifiers of traffic lights 3630A-3630C to the navigation system. In an example embodiment, location identifiers may be coordinates of traffic lights 3630A-3630C.

Vehicle 3601 may use any suitable means to detect a state of a traffic light (e.g., a state of traffic light 3630A). For example, vehicle 3601 may use a signal detection device for detecting the state of traffic light 3630A. In an example embodiment, the signal detection device may be a camera for capturing visible light. For example, the camera may be used to capture image data for traffic light 3630A. The image data for traffic light 3630A may correspond to a "red light," a "green light," a "yellow light," an "image of a palm," an "arrow indicating a turn," and the like. In some cases, image data may include video data associated with a state of traffic light 3630A. For example, state of traffic light 3630A may be characterized by a video data that may include a "blinking red light," a "blinking yellow light," a "moving/blinking text," and the like. It should be noted, that any other suitable image data may be detected by a camera for capturing visible light.

It should be further noted that, as discussed above, a signal detection device may detect any suitable signal emitted by a traffic light communication system. For example, the signal detection device may detect a radio frequency electric field, an infrared frequency electric field, a time-dependent magnetic field, or any other suitable electric field. It should be noted that various other means of communication between the traffic light and the vehicle may be used. For example, communications means may include audio communication (e.g., communication using soundwaves such as ultrasound), laser-based communications and the like. In some cases, communication signal may include a time-dependent visible communication signal (e.g., a time-dependent signal produced by LED sources). In various embodiments vehicle 3601 may detect the state of traffic lights 3630A-3630C by communicating (e.g., receiving a signal) via communication channels 3620A-3620C. In some embodiments, vehicle 3601 communication with traffic lights 3630A-3630C may include not only receiving signals, but also sending signals to traffic lights 3630A-3630C.

In various embodiments, the navigation system may be configured to receive, from vehicle 3601, a state identifier associated with a traffic light detected along the road segment. For example, such state identifier may be communicated by vehicle 3601 to server 1230 via a connection 3610 as shown in FIG. 36A that may be a wireless connection. In some embodiments, vehicle 3601 may be configured to send to server 1230, image data related to signal from traffic lights 3630A-3630C, and in some embodiments, vehicle 3601 may be configured to analyze image data of traffic lights 3630A-3630C. In some embodiments, vehicle 3601 may be configured to analyze any relevant data communicated to vehicle 3601 from traffic lights 3630A-3630C via communication channels 3620A-3620C using a traffic communication system (e.g., a system 3631 as shown in FIG. 36A) to obtain the state identifier (e.g., a state of a traffic light)

associated with the traffic light detected along the road segment. In some embodiments, the vehicle navigation system associated with vehicle 3601 may be configured to receive a state identifier associated with a respective traffic light via traffic communication system 3631.

In various embodiments, the navigation system may be configured to receive, from a vehicle, navigational information indicative of one or more aspects of the motion of the first vehicle along the road segment. In an example embodiment, based on a position of vehicle 3601 or/and other related navigational information (e.g., a prior position of vehicle 3601 and a known time-dependent trajectory of vehicle 3601), the navigation system may determine a lane of travel followed by vehicle 3601 along roadway 3630. In an example embodiment, a processor of the navigation system may be configured to execute instructions to analyze navigational information for vehicle 3601 and determine the lane of travel followed by vehicle 3601.

The navigation system may be configured to determine, based on the navigational information associated with a vehicle, a lane of travel traversed by the vehicle along the road segment. In an example embodiment, vehicle 3601 may report the lane of travel to server 1230 based on the previously determined lane of travel and a set of lane-switching navigational actions executed by a vehicle (e.g., navigational actions that result in vehicle 3601 switching lanes). Additionally, or alternatively, vehicle 3601 may determine the lane of travel (and communicate the lane of travel to server 1230) based on a proximity of a left curbside 3640A and/or a right curbside 3640B, a proximity of a road shoulder feeder lane and the like. Additionally, or alternatively, vehicle 3601 may determine the lane of travel by communicating with neighboring vehicles that may determine their lanes of travel. In some cases, when roadway may not have a well-defined lane of travel, vehicle 3601 may be configured to communicate with server 1230 a distance to the left and/or right curbside/shoulder of the road.

In various embodiments, the navigation system may be configured to, determine, based on navigational information and based on a state identifier received from a vehicle, whether a traffic light is relevant to a lane of travel traversed by the vehicle. For example, if state identifier for a traffic light corresponds to a red light state, and a vehicle stops in front of the traffic light, the navigation system may determine that the traffic light is relevant to the lane traveled by the vehicle. In some embodiments, the navigation system may be configured to receive state identifiers corresponding to the traffic lights as well as navigational information from various autonomous vehicles in order to determine the relevancy of various traffic lights. For instance, a first vehicle may communicate to the navigation system a first state identifier for a traffic light and first navigational information associated with the movement of the first vehicle, and a second vehicle may communicate to the navigation system a second state identifier for the traffic light and a second navigational information associated with the movement of the second vehicle.

In various embodiments, the relevancy of traffic lights 3630A-3630C to lane 3611A may be determined by obtaining a correlation between navigational actions of various vehicles traveled in lane 3611A, and various state identifiers observed for traffic lights 3630A-3630C. Additionally, or alternatively, the navigation system may determine the relevancy for traffic lights 3630A-3630C by determining a direction to traffic lights 3630A-3630C. For example, traffic lights 3630A-3630C may be determined to be in front of vehicle 3601, along a lane followed by vehicle 3601 (e.g., for cases when the lane contains a curve), to the side of vehicle 3601, facing vehicle 3601, sideways to vehicle 3601 and the like. Further, the navigation system may compare images associated with traffic lights 3630A-3630C with images of various traffic lights (e.g., images of traffic lights having a green light, red light, yellow light, etc.) stored in a memory of the navigation system to determine the state of traffic light 3630A. In various embodiments, a traffic light may be relevant if it is determined by the navigation system that the traffic light is in front of vehicle 3601, and/or along a lane followed by vehicle 3601. It should be noted that such relevancy criteria for a traffic light are illustrative, and other relevancy criteria for the traffic light that utilizes the navigation system may be used, as discussed further.

In various embodiments, the lanes of roadway 3660 such as lanes 3611A and 3611B may be identified by numerical, alphanumerical values or any other suitable identifiers. In an example embodiment, vehicle 3601 may determine the lane identifier by analyzing navigational information of vehicle 3601 using the vehicle control system associated with vehicle 3601. The analysis of navigational information may include evaluating the position of vehicle 3601 and/or distance to a curbside 3640A or 3640B for vehicle 3601. In some embodiments, the lane may have markers related to its identifier positioned along the lane that may be detected and identified by the vehicle control system of vehicle 3601.

In various embodiments, when traffic light 3630A communicates with vehicle 3601 via traffic light communication system 3631, traffic light communication system 3631 may communicate the lane identifier to the navigation system. The navigation system may compare the lane identifier received from traffic light communication system 3631 with the lane identifier obtained by vehicle 3601 using the vehicle control system via analysis of the navigational information. If the lane identifier received from traffic light communication system 3631 matches the lane identifier obtained by vehicle 3601 via analysis of the navigational information, then traffic light 3630A is relevant to the lane traveled by vehicle 3601.

In various embodiments, the relevance of a traffic light to a given lane may be obtained by the navigation system using statistical data. For example, server 1230 may receive from various autonomous vehicles a location identifier associated with a traffic light detected along a road segment, a state identifier associated with the traffic light detected along the road segment and navigational information indicative of one or more aspects of the motion of autonomous vehicles traveling along the road segment. The navigation system may use navigational information associated with autonomous vehicles, to determine a lane of travel followed by the autonomous vehicles along the road segment using any suitable approaches discussed above. For example, the server navigation system may use GPS data for a vehicle or use data obtained by the vehicle control system of the vehicle. The sever navigation system may collect statistical data relating navigational information such as types of motion executed by an autonomous vehicle and the state identifier for the traffic light that is relevant to the lane traveled the autonomous vehicle. In some embodiments, the server navigation system may collect statistical data relating navigational actions for a vehicle and the changes in the state identifier for the traffic light.

In some jurisdictions, a lane assignment may dynamically change at, for example, different times of the day or according to varying congestion levels for lanes traveling through a junction (e.g., lanes traveling into a particular location may experience heavy traffic in the morning, and lanes traveling away from the location may experience heavy traffic in the afternoon). Accordingly, in some embodiments, the system may monitor at, for example, one more junctions with such dynamic traffic light systems or lane assignments to obtain (e.g., through image analysis, a report, information broadcast by a traffic signal, etc.) and record the time of the reported traffic light state and/or the congestion state of a host vehicle's lane of travel and/or a congestion state at other lanes passing through the junction.

As another example, a person, such as a public official (e.g., a policer officer) may direct traffic in lieu of the traffic lights. Traffic may thus travel in contradiction with the signal indicated by the traffic light. In some embodiments, the system can be configured to detect the official directing traffic, e.g., through image analysis. In another example, the official may use an electronic beacon or any other object that may be detected by a sensor onboard the vehicle, indicating that the official is directing traffic in a manner which may contradict a traffic light operating within the junction.

Figure 37A:
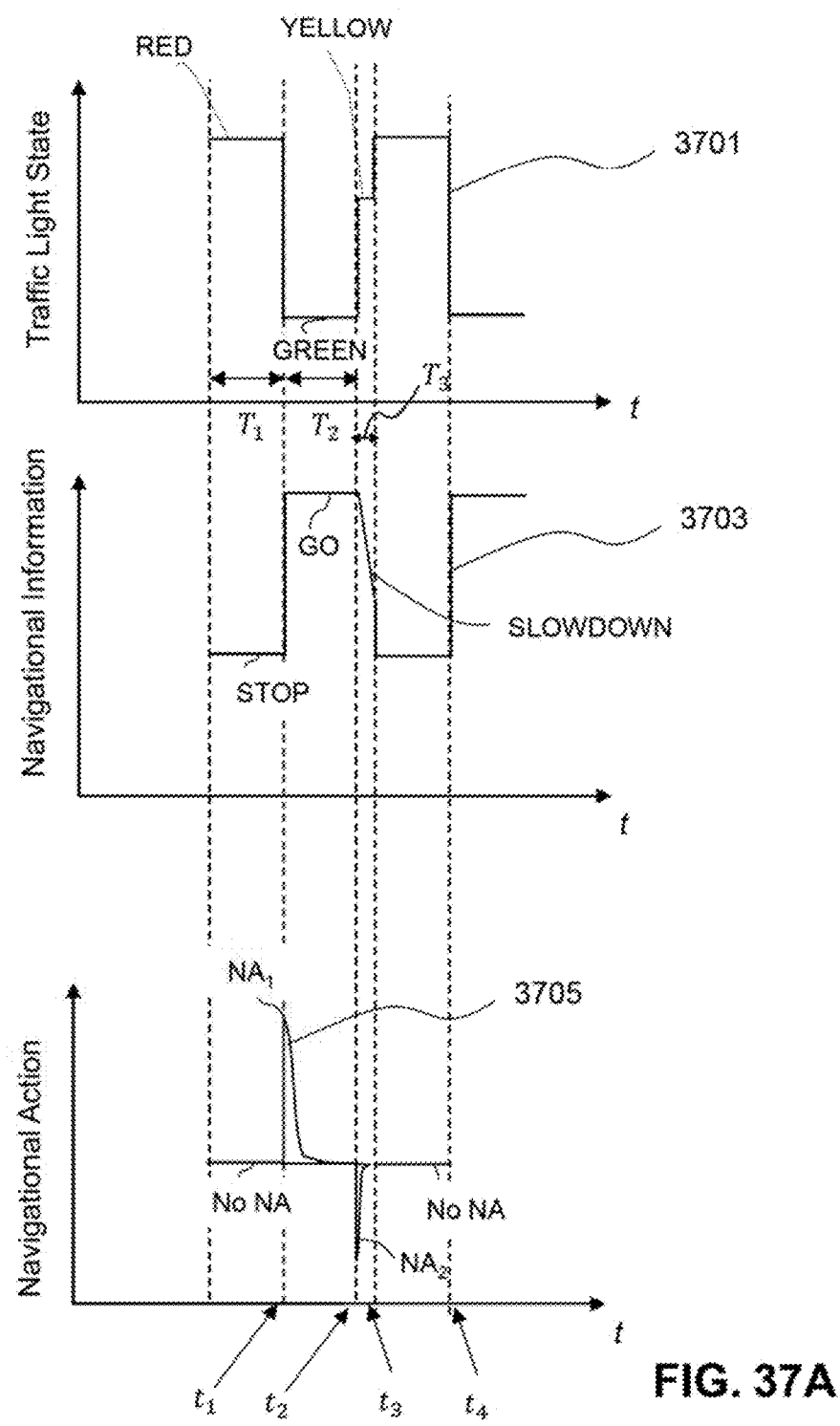
FIGS. 37A and 37B are illustrative graphs of time-dependent variables determining navigation of a vehicle, consistent with the disclosed embodiments.

FIG. 37A illustrates a possible relation between the time-dependent navigational information of an autonomous vehicle (e.g., vehicle 3601) traveling in lane 3611A as shown in FIG. 36A, and time-dependent state identifier for a traffic light (e.g., traffic light 3630A). A graph 3701 shows a time-dependent traffic light state identifier for traffic light 3630A. Traffic light 3630A may be in a first state corresponding to the color red (the color red being the state identifier) observed during a time interval $T_1$. The state identifier for traffic light 3630A may change to a different, second state corresponding to color green observed during a time interval $T_2$, and may change to a third state corresponding to color yellow observed during a time interval $T_3$. It should be noted, that the state identifiers discussed above are only illustrative, and various other state identifiers are possible.

A graph 3703 shows a time-dependent function of navigational information for vehicle 3601 evaluated as a function of time. During the time interval $T_1$, vehicle 3601 may stop (e.g., navigational information may correspond to no observable motion of vehicle 3601. e.g., the navigational information may be characterized by a state "STOP", corresponding, for example, to the time-dependent function of navigational information having a value of zero). During the time interval $T_2$, vehicle 3601 may start and continue motion (e.g., the navigational information may be characterized by a state "GO", corresponding, for example, to the time-dependent function of navigational information having a value of one), and during the time interval $T_3$, vehicle 3601 may slow down to a stop at the completion of the time interval $T_3$ (e.g., the navigational information may be characterized by a state "SLOWDOWN", corresponding, for example, to the time-dependent function of navigational information having a value between one and zero). It should be noted, that a change in some or any of the navigational information, and consecutively, the change in the time-dependent function shown, for example, by graph 3703, corresponds to a navigational action for vehicle 3601. For example, change between state "STOP" to state "GO" constitutes a navigational action.

Graph 3703 indicates that the time-dependent behavior of the time-dependent function of the navigational information for vehicle 3601 directly correlates with the time-dependent behavior of the state identifier for traffic light 3630A as described by graph 3701. While graphs 3701 and 3703 are plotted for vehicle 3601 traveling in lane 3611A, the server navigation system may generate similar graphs for various other vehicles (autonomous or non-autonomous vehicles) traveling in the same or a different lane. If vehicles traveling in lane 3611A exhibit a direct correlation between vehicles' navigational information and state identifiers corresponding to traffic light 3630A, then server navigation system may conclude that traffic light 3630A is relevant to lane 3611A.

Figure 37B:
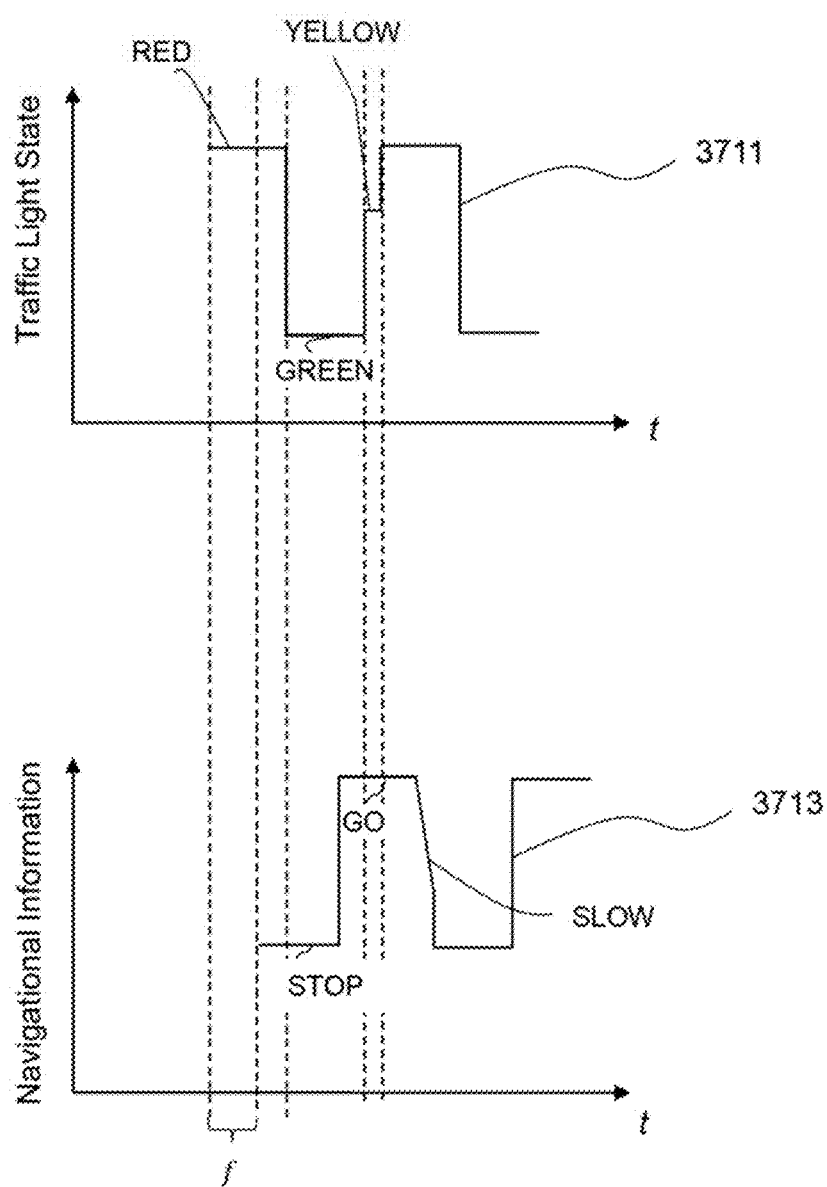

FIG. 37B shows an example embodiment, where a time-dependent function of navigational information shown by a graph 3713 for a vehicle (e.g., vehicle 3601) may be shifted by a phase factor f relative to a time-dependent state identifier shown by a graph 3711. In an example embodiment, the time-dependent state identifier, as shown by a graph 3711, may be related to the state of traffic light 3630B or 3630C that is not positioned directly in front of vehicle 3601 traveling along lane 3611A. Similar to graph 3701, graph 3711 may include red light, green light or yellow light states labeled correspondingly as "RED," "GREEN," and "YELLOW" for a traffic light (e.g., traffic light 3630B) associated with the time-dependent state identifier shown by graph 3711. Similar to graph 3703, graph 3713 may show that the time-dependent function of the navigational information for vehicle 3601 may be characterized by regions of a state "STOP", where the time-dependent function of the navigational information may be zero, regions of a state "GO", where time-dependent function may be one, and regions of a state "SLOWDOWN" where time dependent function of navigational information may be between zero and one. In various embodiments, even though the time-dependent function of the navigational information for vehicle 3601 exhibits a phase shift f, server navigation system may conclude that traffic light 3630B is relevant to lane 3611A, at least because state identifier shown by graph 3711 may be used together with the known phase shift f to predict the time-dependent function of the navigational information, as shown by graph 3713, for vehicles traveling along lane 3611A.

It should be noted, that traffic light 3630A may be relevant to lane 3611B as well as to lane 3611A. For example, vehicles traveling in lane 3611B may "obey" traffic light 3630A just as well as vehicles traveling in lane 3611A, where the term "obey" is used to indicate that navigational information for vehicles traveling in lane 3611B may directly correlate to a state identifier corresponding to traffic light 3630A. In an illustrative embodiment, the vehicles traveling in lane 3611A may obey traffic light 3630A by executing a first set of navigational actions that correlate with the state identifier for traffic light 3630A, that may include stopping at light 3630A when light 3630A is in a red light state (e.g., labeled "RED" in FIG. 36A, and also referred to as state "RED"), moving through light 3630A when light 3630A is in a green light state (e.g., labeled "GREEN" in FIG. 36A, and also referred to as state "GREEN"), slowing down in front of light 3630A when light 3630A is in a yellow light state (e.g., labeled "YELLOW" in FIG. 36A, and also referred to as state "YELLOW"), or turning left when the state identifier for light 3630A is a green turning arrow. The vehicles traveling in lane 3611B may obey traffic light 3630A by executing a second set of navigational actions (e.g., execute all of the navigational actions of the vehicles traveling in lane 3611A except for the action of turning left when the state identifier for light 3630A is a green turning arrow). When the state identifier for light 3630A is a green turning arrow, the vehicles traveling in lane 3611B may be configured to travel through light 3630A.

In various embodiments, the server navigation system may collect data related to a time-dependent state identifier for a traffic light (e.g., traffic light 3630A) and time-dependent navigational information related to various vehicles traveling along a given road segment (e.g., the road segment containing lanes 3611A and 3611B). The collected time-dependent state identifier for traffic light 3630A and the time-dependent navigational information may be used to establish the relevancy of traffic light 3630A to the given road segment.

In an example embodiment, as shown in FIG. 37A, navigational actions for vehicle 3601 may be a function of time and depend on a traffic light state identifier for a given lane. For example, when the traffic light state is in state "RED" as shown by graph 3701, no navigational actions may be required. When the traffic light state changes from state "RED" to state "GREEN" at a time $t_1$, a navigational action $NA_1$ may be required as shown by a graph 3705. In an example embodiment, $NA_1$ may correspond to vehicle 3601 accelerating and acquiring a nonzero velocity. At a time $t_2$, the traffic light state changes from state "GREEN" to state "YELLOW", and a navigational action $NA_2$ may be required as shown by graph 3705. In an example embodiment, $NA_2$ may correspond to vehicle 3601 starting deceleration at time $t_2$ and acquiring a zero velocity at a time $t_3$. After time $t_3$, no navigational action may be required until a time $t_4$ as shown by graph 3705.

It should be noted, that example embodiment of the relationship between the time-dependent traffic light state identifier, the time-dependent navigational information and the time-dependent navigational actions presented in FIG. 37A are only illustrative, and various other configurations describing the relationship between these time-dependent variables are possible. For instance, the time-dependent traffic light state identifier may have a variety of states besides states of "RED," "GREEN," or "YELLOW." In various embodiments, navigational information associated with vehicles other than vehicle 3601 traveling on the road segment (or on nearby road segments, such as a roadway 3616, as shown in FIG. 36) may influence time-dependent navigational actions for vehicle 3601.

It should also be noted, that time-dependent navigational actions may be influenced by other road-related events that may be unrelated (or not directly related) to time-dependent traffic light state identifier. For example, such events may include pedestrian jaywalking across lane 3611A traveled by vehicle 3601, unlawfully parked vehicles at curbside 3640A, mechanical failure of vehicle 3601 or other vehicles in proximity of vehicle 3601, police vehicles, fire engines or medical emergency vehicles in proximity of vehicle 3601, roadwork, adverse road conditions (e.g., ice, hail, rain, road defects, etc.) and the like.

In various embodiments, server 1230 may be configured to monitor vehicles traveling along a roadway 3660 and 3616 and to predict trajectories of vehicles to ensure that vehicles do not come in close proximity of one another. For example, server 1230 may be configured to transmit an indication for one or more collision avoidance navigational actions for the vehicles that are predicted to come in close proximity of one another. In various embodiments, the term "close proximity" may be a distance between the vehicles that may depend on the vehicles' speed or relative speed between two vehicles. In some embodiments, a close proximity distance between two vehicles along the lane of travel may be different than a close proximity distance between vehicles traveling in neighboring lanes. In an example embodiment, the close proximity distance between two vehicles traveling along the lane of travel may be based on a two-second rule (e.g., the distance that it takes for a vehicle to travel in two seconds) to provide an appropriate reaction time for vehicles operated by human drivers.

In some embodiments, a vehicle control system of an example vehicle may accept and execute (or schedule to execute at a later time) the collision avoidance navigational actions suggested by server 1230, and in other embodiments, the vehicle control system may execute (or schedule to execute at a later time) a different set of collision avoidance navigational actions. In some embodiments, the vehicle control system may ignore the execution of the collision avoidance navigational actions. In various embodiments, the vehicle control system may notify server 1230 on navigational actions executed or scheduled to be executed at a later time by the vehicle control system.

In various embodiments, the navigation system may be configured to update an autonomous vehicle road navigation model relative to a road segment, where the update is based on the at least one location identifier and based on whether the traffic light is relevant to the lane of travel traversed by a vehicle. The navigation model may be updated when such a model requires an update. For example, the model may require an update if the observed correlation between the time-dependent traffic light state identifier and the time-dependent navigational information for a vehicle do not match the expected navigational actions from the vehicle as determined from the navigational model. For example, the navigation system may obtain navigational actions $NA_V$ for a representative vehicle (e.g., vehicle 3601) traveling along lane 3611A of road segment 3663. The navigation system may compare navigational actions $NA_V$ with navigational actions obtained using the autonomous vehicle road navigation model $NA_{MODEL}$, and if $NA_V$ are different from $NA_{MODEL}$ the autonomous vehicle road navigation model may be updated.

In various embodiments, the updated autonomous vehicle road navigation model may be distributed to various autonomous vehicles. For example, the updated model may be used as a suggested or possible approach for the navigation system to determine navigational actions $NA_{MODEL}$ using the autonomous vehicle road navigation model. It should be noted that the navigation system may use alternative approaches, for obtaining navigational actions. For example, the navigation system may determine a direction to traffic light 3630A using an image capturing device, such as camera, to establish the relevancy of traffic light 3630A to lane 3611A. After establishing the relevancy of traffic light 3630A, the navigation system may determine the state of the traffic light 3630A based on image data obtained for traffic light 3630A. Based on the state of traffic light 3630A, the navigation system may determine an appropriate navigational action using a set of predetermined relationships between the states of traffic light 3630A and the possible navigational actions. For example, the navigation system may use a hash table to store navigational actions (values of the hash table) mapped to states of traffic light 3630A (keys of the hash table). In some embodiments, keys of the has table may include not only information about the states of traffic light 3630A but also navigational information for vehicle 3601 or navigational information for the vehicles located in the proximity of vehicle 3601.

In various embodiments, an update to the autonomous vehicle road navigation model may be performed when sufficient amount of information is collected for various vehicles traveling a lane of a roadway related to a traffic light in order to ensure the statistical certainty of the relevancy of the traffic light to the lane traveled by the vehicles. In an example embodiment, the certainty may be above 99%, 99.9%, 99.99% or higher. In some embodiments, the information may be collected for two vehicles traveling along the lane of the roadway, for ten vehicles traveling along the lane, for hundreds or even thousands of vehicles traveling along the lane. In various embodiments, the information relating navigational actions of vehicles to a traffic light state of a traffic light may be collected when other vehicles are in proximity of the vehicles traveling the road segments. For example, the information may be collected for vehicles traveling along roadway 3660 when other vehicles are traveling along roadway 3616.

Figure 38:
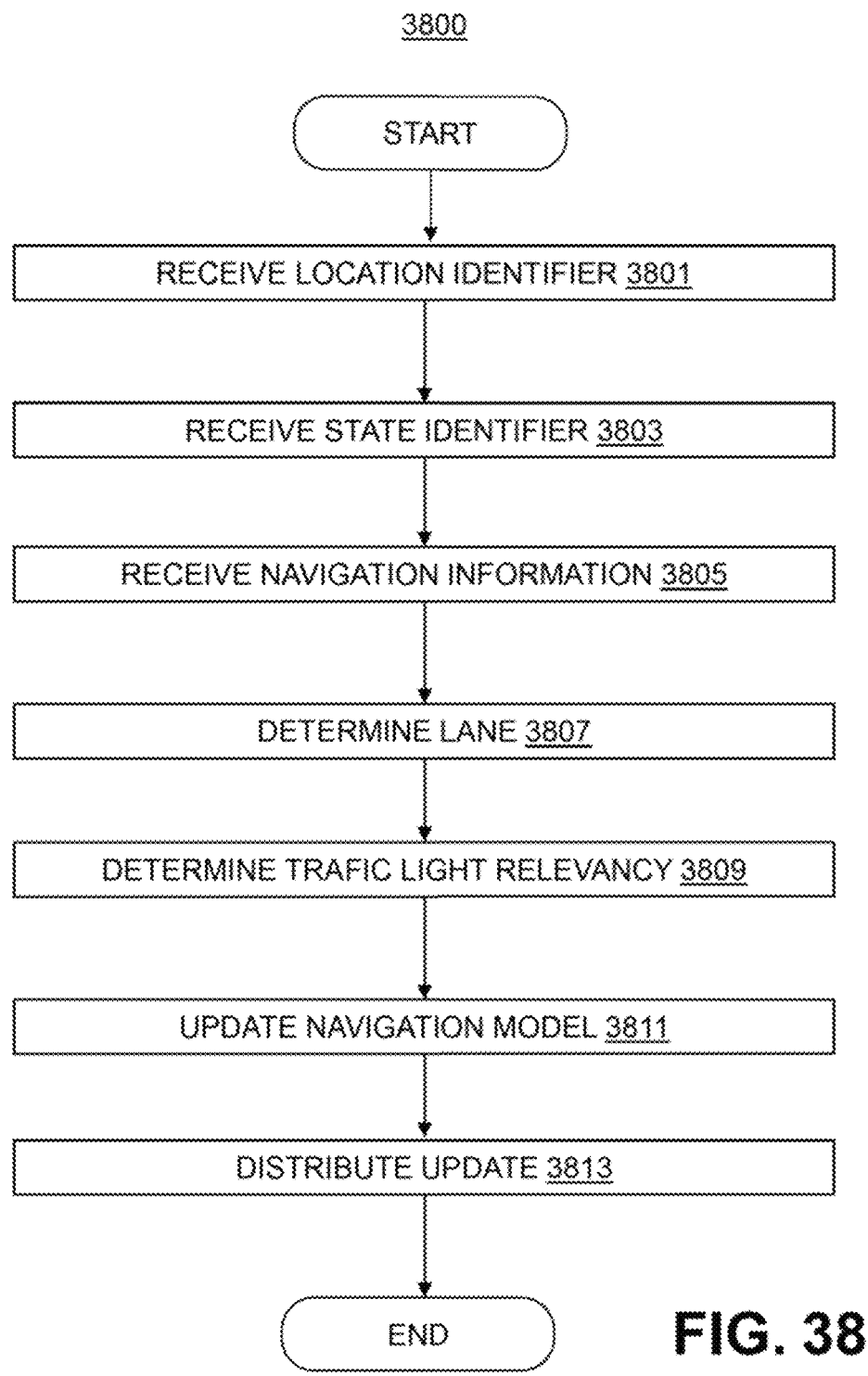
FIG. 38 is an illustrative process for updating an autonomous vehicle road navigation model, consistent with the disclosed embodiments.

FIG. 38 illustrates an example process 3800 for updating an autonomous vehicle road navigation model for various autonomous vehicles via the navigation system. In various embodiments, process 3800 may be performed by a processor of the navigation system. At step 3801 of process 3800, at least one processor of the navigation system may receive, from a vehicle, at least one location identifier associated with a traffic light detected along a road segment. For example, the processor may receive a location identifier associated with a traffic light 3630A, as shown in FIG. 36A. In various embodiments, the processor may receive a location identifier from one or more vehicles traveling along a road segment containing traffic light 3630A. For example, the processor may receive location identifier form vehicle 3601 traveling along lane 3611A. The location identifier for traffic light 3630A may be obtained using any of the suitable approaches described above.

At step 3803, the processor may receive, from a vehicle, a state identifier associated with the traffic light detected along the road segment. In an example embodiment, the state identifier may identify the traffic light as emitting red light (e.g., the state identifier is "RED" as shown in FIG. 36A), emitting green light (e.g., the state identifier is "GREEN" as shown in FIG. 36A) or emitting yellow light (e.g., the state identifier is "YELLOW" as shown in FIG. 36A). In some embodiments, various other state identifiers may be used. In various embodiments, the processor of the navigation system may receive the state identifier from one or more vehicles traveling along a road segment containing traffic light 3630A. In some embodiments, the state identifier received from the vehicle depends on the vehicle's time of travel along the road segment.

At step 3805, the processor may be configured to receive, from the vehicle, navigational information related to the vehicles traveling along the road segment. For example, the processor of the navigation system may be configured to receive navigational information of a vehicle (e.g., vehicle 3601) such as a position of vehicle 3601, a velocity of vehicle 3601, an acceleration of vehicle 3601, a deceleration of vehicle 3601 and the like. In some embodiments, the processor may be configured to receive navigational information related to the vehicles traveling along the same lane (e.g., lane 3611A), and in some embodiments, the processor may be configured to receive navigational information related to vehicles traveling next to the lane 361I A, across lane 3611A (e.g., vehicles traveling along roadway 3616 as shown in FIG. 36A) or in any other lane located in proximity to a traffic light contained by the road segment.

In various embodiments, the processor may be configured, at step 3803, to receive a first state identifier for a traffic light (e.g., traffic light 3630A) from at least one vehicle (e.g., a first vehicle) that is different from a second state identifier received from at least another vehicle (e.g., a second vehicle). For example, the first state identifier may correspond to a red light state corresponding to label "RED," as shown in FIG. 36A, or yellow light state, corresponding to label "YELLOW," as shown in FIG. 36A, and the second state identifier may correspond to a green light state corresponding to label "GREEN," as shown in FIG. 36A. In various embodiment, the processor of the navigation system may be configured, at step 3805, to receive navigational information associated with the first vehicle and the navigational information associated with the second vehicle that indicate a response to the first state identifier for traffic light 3630A by the first vehicle that may be different from a response to the second state identifier for traffic light 3630A by the second vehicle. For example, for the red light state received by the first vehicle, the first vehicle may slow down to a complete stop (i.e., have the first type of response) and for the green light state received by the second vehicle, the second vehicle, may continue or start a vehicle motion (i.e., have the second type of response). In some cases, the first state identifier for traffic light 3630A may be the same as the second state identifier.

In various embodiments, the processor of the navigation system may be configured, at step 3805, to receive navigational information associated with the first vehicle and the navigational information associated with the second vehicle indicating that the first response to the first state identifier for traffic light 3630A by the first vehicle may be substantially the same as the second response to the second state identifier for traffic light 3630A by the second vehicle. As defined herein, unless otherwise noted, the term "substantially" as applied to vehicle's response to a state identifier may indicate that the first response is at least qualitatively the same as the second response, while allowing to be different quantitatively. For example, the first and the second response may include braking, but the magnitude of deceleration for the first response may be different than the magnitude of deceleration for the second response.

At step 3807 the processor of the navigation system may determine the lane traveled by vehicle 3601. In an example embodiment, the processor may use the navigational information received from vehicle 3601 to determine the lane traveled by vehicle 3601. For example, the processor may determine the lane traveled by vehicle 3601 based on vehicle's position or based on vehicle's distance to various features of the road segment (e.g., based on a distance to the curbside of the roadway). In an example embodiment, the lane of travel followed by vehicle 3601 along the road segment may be determined by comparing a trajectory of vehicle 3601 traveled by vehicle 3601 (referred herein as traveled or actual trajectory) to one or more available target trajectories (as defined above) associated with the autonomous vehicle road navigation model for vehicles traveling the road segment. For example, the target trajectory may include information about the lanes of the road segment for different regions along the target trajectory. If the traveled trajectory of vehicle 3601 matches a segment of the target trajectory, the processor may be configured to determine a lane traveled by vehicle 3601 based on the lane associated with the segment of the target trajectory. Alternatively, if raveled trajectory for vehicle 3601 is near and to a side of the target trajectory, the processor may be configured to determine that a lane traveled by vehicle 3601 is a neighboring lane to the lane associated with the segment of the target trajectory.

At step 3809, the processor may determine the traffic light relevancy for a lane (e.g., lane 3611A). In an example embodiment, the lane relevancy may be determined by analyzing a correlation between the time-dependent navigational information for various vehicles traveling along the road segment containing a traffic light (e.g., traffic light 3630A) and the time-dependent state identifier for traffic light 3630A. For example, if there is a direct correlation between the navigational information (or one or more changes in the navigational information) and the state identifier for traffic light 3630A (or changes in the state identifier), the processor may determine that traffic light 3630A is relevant to lane 3611A. In various embodiments, the correlation between the time-dependent navigational information for various vehicles traveling along the road segment containing traffic light 3630A and the time-dependent state identifier for traffic light 3630A may be obtained by collecting information for multiple vehicles traveling along the road segment at different times.

At step 3811, the processor may update the autonomous vehicle road navigation model as it relates to the relationship between the time-dependent navigational information for various vehicles traveling along the road segment and the time-dependent state identifier for traffic light 3630A. In various embodiments, the update may include updating a location identifier for traffic light 3630A or updating the relevancy of traffic light 3630A to lane 3611A followed by vehicle 3601. In some embodiments, updating model may include updating relationship between the time-dependent navigational information for various vehicles traveling along the road segment and the time-dependent state identifier for traffic light 3630A that may be represented by a function.

At step 3813, the processor may be configured to distribute the updated model to various autonomous vehicles traveled in the proximity of the road segment. In an example embodiment, the navigation system may be configured to distribute the updated model to the most relevant vehicles (e.g., the vehicles that are approaching traffic light 3630A) first, and then distribute the model to various other vehicles.

It should be noted, that various steps of process 3800 may be modified or omitted. For example, the processor may receive navigational information at step 3805 that may include information about the lane traveled by a vehicle. For such a case, step 3807 of process 3800 may be omitted. In some instances, the processor may determine the relevancy of a traffic light, thus, resulting in step 3809 being unnecessary.

Figure 39:
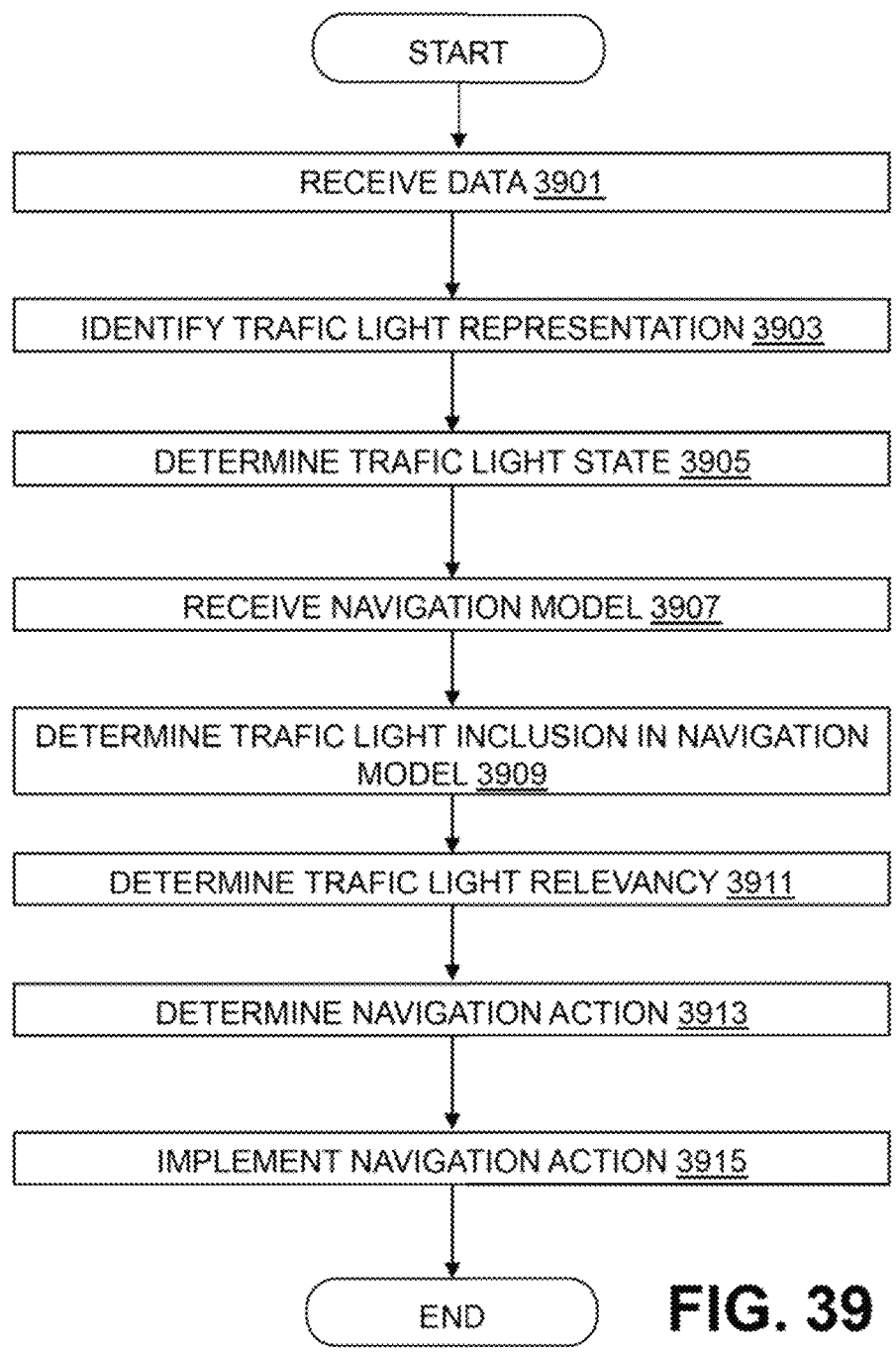
FIG. 39 is an illustrative process for selecting and implementing a navigational action, consistent with the disclosed embodiments.

FIG. 39 illustrates an example process 3900 for autonomous vehicle navigation using the navigation system. At step 3901 of process 3900, the processor of the navigation system may receive from a signal detection device various data signals from the environment of an example vehicle, such as vehicle 3601. For instance, such data signals may be audio data, video or image data, as well as data signals communicated from various traffic lights using traffic light communication systems 3631. In an example embodiment, the signal detection device for vehicle 3601 may be an image capturing device for capturing one or more images representative of an environment of vehicle 3601.

At step 3903, the processor may be configured to identify, based on the analysis of the data signal received from the signal detection device, a representation of at least one traffic light. In an example embodiment, analysis of received images from the image capturing device may be used to identify at least one traffic light in the images and to obtain a representation of the identified traffic light. In an example embodiment, the representation of an illustrative traffic light may be a traffic light location identifier described above. The location identifier for a traffic light may be obtained using any of the suitable approaches described above.

At step 3905 the processor may be configured to determine a state of the at least one identified traffic light (e.g., traffic light 3630A) based on the analysis of the images obtained using the image capturing device. In an example embodiment, the processor may compare the images obtained for various traffic lights with images of various traffic lights (e.g., images of traffic lights having a green light, red light, yellow light, etc. stored in a memory of the navigation system) to determine states of various traffic lights. In some embodiments the processor may be configured to transmit the images of the one or more traffic lights to server 1230 for further processing of the images (e.g. compressing images, editing images, etc.), analysis of the images (analysis of images for determining a state of the one or more of the identified traffic lights, as well as identifying other objects that may be present within the images, such as roadway landmarks) and/or storage of the images.

At step 3907, the processor may be configured to receive from the navigation system (or from any related server-based system) an autonomous vehicle road navigation model, where the autonomous vehicle road navigation model may include stored information related to various traffic lights associated with the road segment. In an example embodiment, the stored information may include location identifier for a traffic light, as well as one or more relevant lanes, associated with the traffic light, that are being followed by vehicles traveling along the road segment. Additionally, or alternatively, the stored information related to the various traffic lights may correlate with one or more possible trajectories available to vehicle 3601 traveling along the road segment. In an example embodiment, each possible trajectory may be associated with a trajectory related lane of the road segment. In some embodiments, a lane of the road segment may be related to a portion of a trajectory, for example, for cases when a trajectory passes through several different lanes. The possible trajectories may be provided by the autonomous vehicle road navigation model and may be represented by three-dimensional splines.

At step 3909, the processor may determine whether some of the identified traffic lights, identified in the images that are captured by the image capturing device, are among the mapped traffic lights associated with the autonomous vehicle road navigation model. For example, the navigation system may access a traffic light location identifier associated with the identified traffic lights, and may compare the location of the identified traffic light with locations of various mapped traffic lights associated with the autonomous vehicle road navigation model. After determining that the at least one traffic light, identified in the images, is among the mapped traffic lights associated with the autonomous vehicle road navigation model, the processor may be configured, at step 3911, to determine whether the identified traffic light, determined to be among the mapped traffic lights, is relevant to a lane traveled by vehicle 3601. The relevancy of the one or more traffic lights may be established using various approaches discussed above for the one or more traffic lights that have associated location identifiers. In an example embodiment, a relevant traffic light may be the light aligned with a lane of a road segment, such as traffic light 3630A that may be aligned with the lane 3611A. Additionally, or alternatively, the processor may determine at least another traffic light among the mapped traffic lights associated with the autonomous vehicle road navigation model that may not be aligned with lane 3611A traveled by vehicle 3601 (e.g., traffic lights 3630B or 3630C). Such traffic lights may be aligned with a lane of travel of the road segment that is different than lane 3611A. For example, traffic lights 3630B and 3630C correspond to roadway 3616, as shown in FIG. 36A that is different than roadway 3630, and thus are not aligned with lane 3611A. It can be said, that traffic lights 3630B and 3630C are aligned with roadway 3616. In various embodiments, the processor may use information about the state of one or more traffic lights not aligned with lane 3611A to determine possible navigational actions as previously described. Such information may be used, for example, when one or more traffic lights aligned with lane 3611A are obscured from a view of the image capturing device of vehicle 3601, or/and are not operational.

At step 3913 the processor may determine if a navigational action is required based on a state identifier for a traffic light, such as traffic light 3630A, that is relevant to lane 3611A traveled by vehicle 3601. If no relevant traffic lights are found, no navigational actions related to a traffic light may be needed. That does not necessarily imply that no navigational actions are needed, as some of the navigational actions may not be related to the navigational action related to a traffic light. For example, the navigational actions may be required if pedestrians or stopped vehicles are observed in lane 3611A traveled by vehicle 3601.

At step 3915, if the navigational action is required, the processor may be used to cause one or more actuator systems associated with vehicle 3601 to implement the determined one or more navigational actions for vehicle 3601. In various embodiments, the one or more actuator systems may include regular controls for vehicle 3601 such as a gas pedal, a braking pedal, a transmission shifter, a steering wheel, a hand brake and the like. In some embodiments, actuator systems may be internal systems not accessible by a human operator that perform similar functions as the regular controls accessible to the human operator. In an example embodiment, the navigation system may be configured to accelerate vehicle 3601 via an actuator system that may, for example, include a gas pedal of a vehicle.

It should be noted, that various steps of process 3900 may be modified or omitted. Additionally, or alternatively, the sequence of steps of process 3900 may be modified. For example, step 3905 may follow step 3911, and step 3907 may follow step 3903. In some embodiment, step 3909 may be omitted, when the determination of relevancy of an example traffic light is analyzed by the navigation system.

Navigation Based on Traffic Light Cycle Prediction

The navigation system may determine navigational actions for vehicles traveling along a roadway based on information about a timing of a traffic light, such as times when the state of the traffic light changes. For example, the navigation system may determine that a vehicle traveling along the roadway should slow down when the state of the traffic light changes from a green light state to a red light state.

In various embodiments, the navigation systems may map traffic lights for determining the traffic light relevancy, and provide autonomous vehicle navigation as described above. For example, the autonomous vehicle road navigation model may include a mapped location of a traffic light detected by a vehicle traveling in the proximity of the traffic light. In an example embodiment, a location identifier, received from the vehicle may be used to update the mapped location of the detected traffic light. The mapped location may be identified on a map of the autonomous vehicle road navigation model using associated coordinates (e.g., world coordinates). In some embodiments, the autonomous vehicle road navigation model may use local curvilinear coordinates (e.g., surface curvilinear coordinates) associated with the surface of a roadmap. For example, curvilinear coordinates may be defined along a surface or a roadway such that one coordinate direction is aligned with the direction of the roadway and another coordinate direction is aligned perpendicular to the roadway. In some embodiments, several curvilinear coordinate systems may be used, with each curvilinear coordinate system associated with a given roadway. In various embodiments, the positional error for landmarks (e.g., traffic lights) may be a few feet to a few tens of feet. In various embodiments, the positional error may be reduced by collecting statistical data related to a location identifier for a given landmark from various vehicles traveling in the proximity of the landmark.

The navigation system may be used to determine a cycle time of the traffic light. The term "cycle time" of the traffic light refers to aspects of time-dependent state of a traffic light, and more particularly, to aspects of time-periodic changes in the state of the traffic light. In an example embodiment, the cycle-time may refer to various time intervals associated with the time-periodic behavior of the traffic light, such as a period of the traffic light, and/or duration of any of the states of the traffic light. The navigation systems may store the cycle time, as well as any other suitable traffic light related information, associated with the traffic light, in a memory and/or a database that may be associated with server 1230.

In various embodiments, as described above, the navigation system may be configured to receive, from vehicle 3601, at least one location identifier associated with one of traffic light 3630A-3630C detected along a road segment. Additionally, the navigation system may be configured to receive at least one indicator of traffic light state timing associated with the detected traffic light. The term "traffic light state timing" refers to aspects of time-dependent state of a traffic light. In some embodiments, a traffic light may have discrete states. For example, the traffic light may emit a green, red, and yellow light, with each emitted light (e.g., emitted green light) being a discrete state.

It should be noted, that the above example is only illustrative and various other discrete states for a traffic light may be observed. The traffic light state timing may include a time interval for emitting a green light (referred to as a green duration time), a time interval for emitting a red light (referred to as a red duration time), and a time interval for emitting a yellow light (referred to as a yellow duration time). In addition, the traffic light state timing may include information about the order of different discrete states for a traffic light, as well as a time point during the day when a transition between two of the states of the traffic light has occurred. An example of the traffic light state timing for a traffic light may include the traffic light that emits a green light for one minute, a red light for one minute and yellow light for twenty seconds, with the yellow light following the green light, and the red light following the yellow light. In an example embodiment, the traffic light may switch from the red light to the green light at a precise time point during the day (with an error in the precision of time for the time point measured in seconds, milliseconds, or microseconds).

In various embodiments, as described above, the navigation system may be configured to update an autonomous vehicle road navigation model, when such a model requires an update. In an example embodiment, the navigation system may be configured to update the autonomous vehicle road navigation model relative to the road segment, wherein the update is based on the at least one location identifier and based on the at least one indicator of a traffic light state timing associated with a traffic light (e.g., traffic light 3630A) detected along the road segment. For example, the autonomous vehicle road navigation model may be updated if a state timing for traffic light 3630A, observed by vehicle

3601, differs from a traffic light state timing predicted by the autonomous vehicle road navigation model. Additionally, if vehicle 3601 observes the traffic light that is relevant to lane 3611A traveled by vehicle 3601, and that is not identified by the autonomous vehicle navigation model, the locator identifier and the traffic light state timing for the navigation model may be updated. In various embodiments, the updated autonomous vehicle road navigation model may be distributed to various autonomous vehicles, using any suitable approach (e.g., wireless transmission of data related to the model).

In various embodiments, the navigation system may be configured to receive from a first vehicle a location identifier associated with the traffic light detected along a road segment, and receive from a second vehicle, at least one indicator of traffic light state timing associated with the detected traffic light. In some embodiments, the navigation system may be configured to receive the location identifier from the first set of vehicles and the at least one indicator of traffic light state timing from the second set of vehicles. In some embodiments, the navigation system may be configured to calculate confidence levels for the location identifier and for the at least one indicator of traffic light state timing based on statistics from data collected from multiple vehicles.

In various embodiments, the update of the autonomous vehicle road navigation model may include an indication of a duration of time for a given discrete state of a traffic light (also referred to as a state duration time, such as, a green duration time, a red duration time or a yellow duration time) that may be detected by a vehicle (e.g., vehicle 3601). The state duration time may be measured by vehicle 3601. For example, vehicle 3601 may detect a first time for a first state transition (e.g., a transition from a first state for the traffic light to a second state for the traffic light, the second state being different from the first state), a second time for a second state transition (e.g., a transition from the second state for the traffic light to a third state for the traffic light, the third state being different from the second state), and calculate the state duration time as a time difference between the second and the first time. In an example embodiment, the first observed state transition may include a transition from a yellow light state to a red light state, and the second observed state transition may include a transition from a red light state to a green light state. Alternatively, the first observed state transition may include a transition from a red light state to a green light state, and the second observed state transition includes a transition from a green light state to a yellow light state. In various embodiments, a processor of the navigation may calculate the state duration time for the traffic light by subtracting the first time from the second time. In various embodiments, the indicator of a traffic light state timing may include one or more time values each associated with a corresponding observed traffic light state change event for the traffic light detected by a vehicle (e.g., vehicle 3601).

In some embodiments, several vehicles may be used to determine a state duration time for a traffic light. For example, a first vehicle approaching a traffic light (e.g., traffic light 3630A) may detect a first time for a first state transition (e.g., a transition from a red light state to a green light state). The first vehicle may communicate such transition to server 1230. The first vehicle may proceed through traffic light 3630A and may not detect a second time for a second state transition (e.g., transition from a green light state to a yellow state for traffic light 3630A). In an example embodiment, a second vehicle, that travels the same lane as the first vehicle, behind the first vehicle, may detect a second time for a second state transition (e.g., transition from a yellow light state to a red light state for traffic light 3630A). The second vehicle may communicate the second state transition to server 1230. In an illustrative embodiment, a processor of server 1230 (e.g., a processor of the navigation system) may calculate a state duration time for the traffic light by subtracting the first time detected by the first vehicle from the second time detected by the second vehicle. In an illustrative embodiment, the second state transition may be observed by the second vehicle a time interval apart from the first state transition that is comparable to expected state duration time to ensure that second state transition follows the first state transition. For example, the navigation system may be configured to collect times for second state transition from multiple vehicles and chose the time for the second state transition that is closest to the time for the first state transition observed by the first vehicle.

In various embodiments, either the first or the second vehicle may observer more than one state transition for traffic light 3630A. For example, the second vehicle may observe the second state transition (e.g., transition from a yellow light state to a red light state for traffic light 3630A) followed by observing a third state transition (e.g., transition from a red light state to a green light state for traffic light 3630A). In an example embodiment, the second vehicle may communicate the second and the third state transition to server 1230 for subsequent calculation of state duration time between the first and the second state transition and between the first and/or second and the third state transition.

It should be noted that examples of the observed state transitions are illustrative and transitions between various other states are possible. For example, distinguishing a state transition from a blinking green light to a red light may be possible, or distinguishing a transition from a blinking red light to a green light may be possible.

In an example embodiment, depending on precision for the state duration time, vehicle 3601 may capture multiple images (frames) of a traffic light at a specified frame rate per second. In an example embodiment, vehicle 3601 may capture one frame rate per second, two frame rates per second, ten frame rates per second, twenty-four frame rates per second (typical rate for video data), or hundred frame rates per second.

Figure 40:
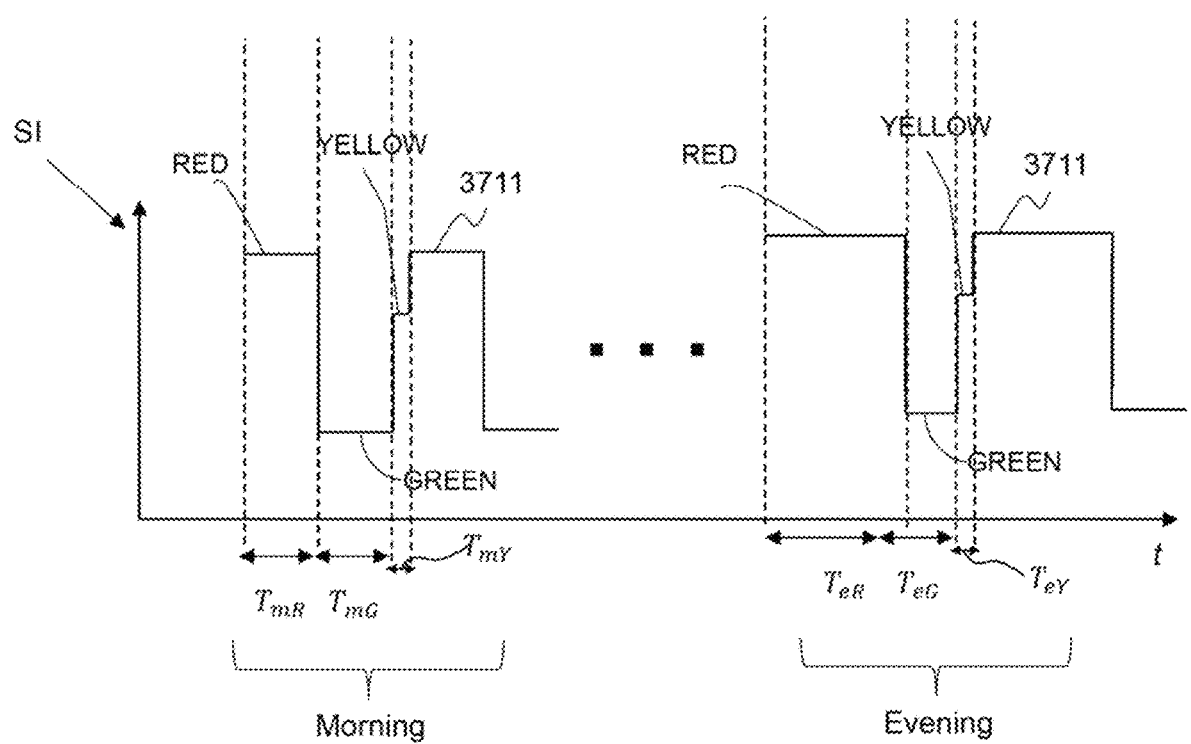
FIG. 40 is an illustrative graph of time-dependent traffic light state, consistent with the disclosed embodiments.

In an example embodiment, as shown in FIG. 40, the green duration time (labeled as "GREEN"), the red duration time (labeled as "RED"), and the yellow duration time (labeled as "YELLOW") may change throughout the day. For example, in the morning, the red, green and yellow duration times labeled as $T_{mR}$, $T_{mG}$, and $T_{mY}$ respectively, may be different from the evening red, green and yellow duration times labeled respectively as $T_{eR}$, $T_{eC}$, and $T_{eY}$. For example, as shown in FIG. 40, $T_{eR} > T_{mR}$.

In an example embodiment, the navigation system may be configured to receive from a first vehicle an indicator of a traffic light state timing associated with traffic light 3630A at the first time of day. For instance, the first vehicle may pass through traffic light 3630A in the morning, may measure the state duration time for traffic light 3630A, and may transmit information (e.g., a state duration time and a time of the day) to the navigation system. In an example embodiment, a second vehicle may pass through traffic light 3630A during a second part of the day (e.g., during the evening), may measure the state duration time for traffic light 3630A, and may transmit the detected information to the navigation system. The navigation system may be configured to collect information from the first and the second vehicle to establish time-dependent pattern of the state timing for traffic light 3630A throughout the day. For example, the navigation system may determine whether the state timing of traffic light 3630A varies with respect to time of day.

In various embodiments, vehicles traveling along roadway 3660 may observe state timings for traffic lights 3630B-3630C that are not directly related to lane 3611A traveled by the vehicles. In an example embodiment, by determining a state timing for light 3630B, the vehicles may uniquely determine a state timing for related traffic light 3630A as state timings of various traffic lights may be directly correlated. For example, light 3630A may be in a red light state when light 3630B may be in a green light state.

In various embodiments, a state timing of a traffic light may change depending on traffic patterns in the proximity of the traffic light. For example, traffic light 3630A may include a sensor that can detect the number of vehicles on roadway 3660, and alter the state timing of traffic light 3630A as well as related state timings of traffic lights 3630B and 3630C. In some embodiments, traffic light 3630A may communicate with a traffic light system for controlling state timings of various traffic lights in the proximity of traffic light 3630A. The traffic light system may be configured to update state timings for some or all the traffic lights. In some embodiments, the traffic light system may receive traffic-related information from several different traffic lights and optimize state timings for all the traffic lights based on the received information. In some embodiments, the traffic light system may be in communication with server 1230. For example, the traffic light system may communicate to server 1230 state timings of various traffic lights. Additionally, or alternatively, server 1230 may receive state timings of various traffic lights from vehicles traveling along various roadways (e.g., roadway 3660 and 3616).

In an example embodiment, a processor of server 1230 may be configured to determine whether a traffic light (e.g., traffic light 3630A) is sensor-operated. For example, the determination of whether traffic light 3630A is sensor-operated may be based on an indicator of traffic light state timing and based on navigational information received from various vehicles (e.g., vehicle 3601) traveling along roadway 3660. In an example embodiment vehicle 3601 may transmit to server 1230 information indicative of one or more aspects of the motion of vehicle 3601 along roadway 3660 such as navigational information for vehicle 3601 and/or navigational actions for vehicle 3601.

In an example embodiment, a processor of the navigation system may determine whether the traffic light is sensor operated by observing a traffic light state change (e.g., change from red light state to green light state) in response to (or shortly after) vehicle 3601 arriving at a stop in front of traffic light 3630A. Further, the processor may detect whether other vehicles are present at an intersection and evaluate how the number of vehicles or absence of thereof affects the state timing of traffic light 3630A. If the processor determines the correlation between the state timing and the number of cars present at the intersection, the processor may be configured to classify traffic light 3630A as the sensor operated light.

In some embodiment, vehicle 3601 may be configured to capture and transmit images of traffic light 3630A as well as images of various environmental elements (e.g., trees, curbside of roadway 3660, roadway cameras, roadway structures, etc.) to server 1230 for data analysis. Server 1230 may analyze images for detection of sensor-related structures in proximity of traffic light 3630A. For example, a sensor-related structure may be part of system 3631 located above traffic light 3630A, as shown in FIG. 36. Additionally, or alternatively, the images of traffic light 3630A, as well as images of various environmental elements, may be analyzed by a vehicle control system for detection of sensor-related structures in proximity of traffic light 3630A. Once a sensor-related structure is detected and identified, server 1230 may classify traffic light 3630A as the sensor operated light. Additionally, or alternatively, the determination of whether the detected traffic light is sensor-operated may be based on information received from vehicle 3601 indicating a detection of a sensor structure associated with a road surface in a vicinity of the detected traffic light. For example, the sensor structure may include tar lines on the road surface in a pattern associated with the sensor structure, cameras above or at a side of roadway 3660, and the like. In some embodiments, traffic light 3630A may operate as a sensor-operated light a first part of the day, and as a time-dependent non-sensor operated light a second part of the day.

Figure 41:
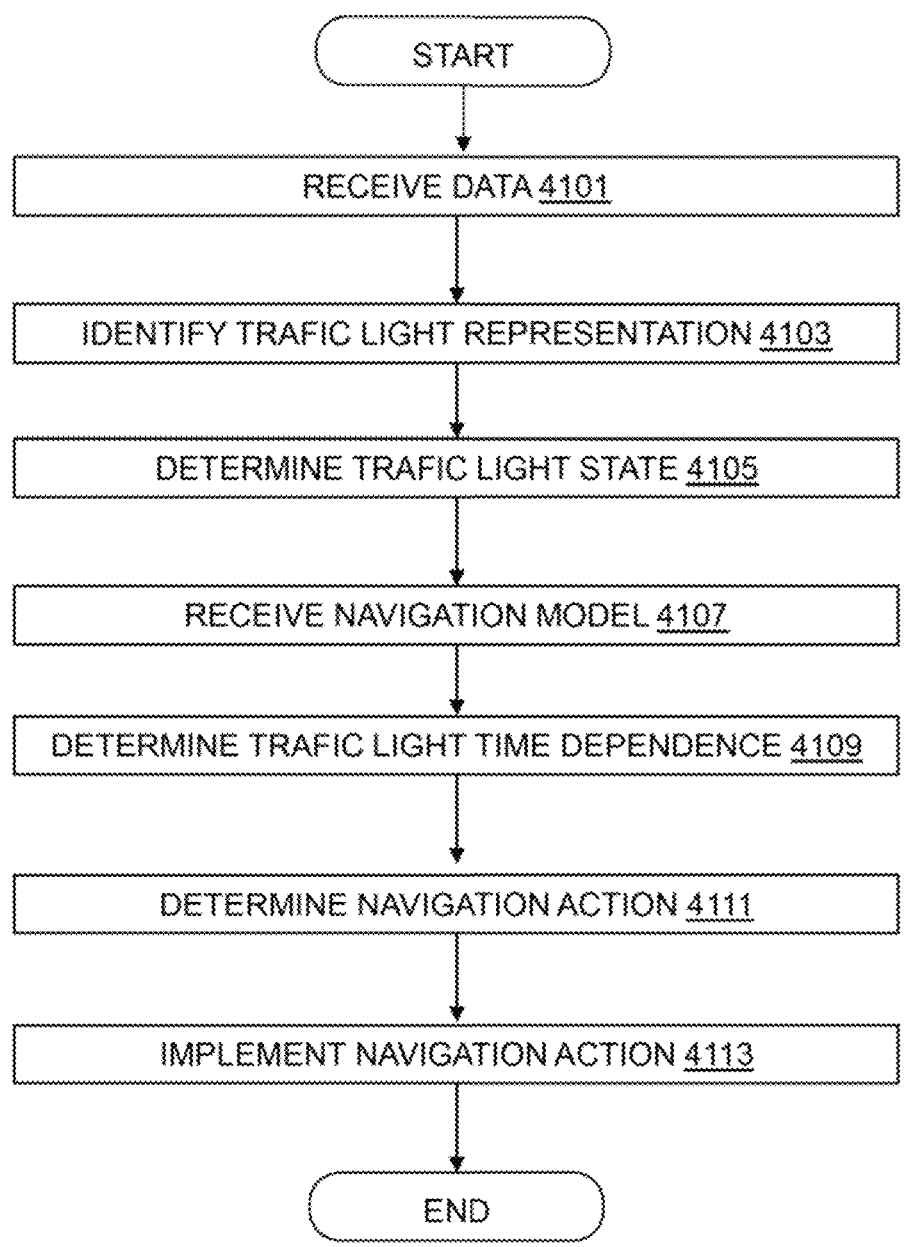
FIG. 41 is an illustrative process for selecting and implementing a navigational action for a vehicle, consistent with the disclosed embodiments.

FIG. 41 illustrates an example process 4100 for autonomous vehicle navigation based on a state timing of a traffic light using the navigation system. At step 4101 of process 4100, the processor of the navigation system may receive from a signal detection device (e.g., an image capturing device such as a camera) various data signals from the environment of an example vehicle, such as vehicle 3601. Step 4101 may be similar to step 3901 of process 3900, as shown in FIG. 39.

At step 4103, the processor may be configured to receive, from a vehicle, at least one location identifier associated with a traffic light detected along a road segment. Thus, the processor may identify, based on the analysis of the data signal received from the signal detection device, a representation of at least one traffic light. Step 4103 may be similar to step 3903 of process 3900, as shown in FIG. 39.

At step 4105 the processor may be configured to receive, from a vehicle, at least one indicator of traffic light state timing associated with the detected traffic light. In an example embodiment, the processor may determine a state of the at least one identified traffic light (e.g., traffic light 3630A) based on an analysis of images obtained using the signal detection device which may be an image capturing device. The processor may be used for analyzing images when image data is transmitted to the navigation system from vehicle 3601. Step 4105 may be similar to step 3905, as shown in FIG. 39. In some embodiment, the processor may be configured, based on the analysis of the images from the image capturing device, to identify a change in a state of traffic light 3630A, as well as to determine a time associated with the identified traffic light state change.

At step 4107, the processor may be configured to update an autonomous vehicle road navigation model relative to the road segment, where the update is based on the at least one location identifier and based on the at least one indicator of traffic light state timing associated with the traffic light detected along the road segment. Similar to step 3907 of process 3900, as shown in FIG. 39, the autonomous vehicle road navigation model may include stored information related to various mapped traffic lights associated with the road segment as discussed before. In an example embodiment, the stored information may include, among other things, location identifier for a traffic light, and one or more relevant lanes, associated with the traffic light, that are being followed by vehicles traveling along the road segment. Additionally, or alternatively, the stored information related to the mapped traffic lights may include one or more indicators of traffic light state timing for at least some of the mapped traffic lights. For example, the stored information may include information about state duration time for various states of one or more mapped traffic lights (e.g., traffic light 3630A). Furthermore, the stored information may include how state duration time for traffic light 3630A changes throughout the day.

At step 4109, the processor may determine, based on the autonomous vehicle road navigation model, at least one timing aspect associated with one or more determined states of traffic light 3630A. For example, one timing aspect may be a state duration time for a given state (e.g., green duration time, red duration time, or yellow duration time) for traffic light 3630A. Another, example timing aspect may be the time of the day when a state of traffic light 3630A changes (e.g., a time of the day may be 12:00 AM when the state of traffic light 3630A changes from a state of green light to a state of red light). In an example embodiment, the determined state of the traffic light 3630A may be a green light state, and at least one timing aspect may correspond to an amount of time traffic light 3630A remains in the green light state. In some embodiments, vehicle 3601 may observe a first and a second change in a state of traffic light 3630A, and the timing aspect determined by the processor may correspond to an expected or calculated amount of time between the first and the second change in the state of traffic light 3630A.

At step 4111 the processor may determine a navigational action for a vehicle based on the determined at least one timing aspect associated with the determined state of the at least one traffic light state. In an example embodiment, the processor may determine whether a navigational action is required based on a state identifier for a traffic light, such as traffic light 3630A, that is relevant to lane 3611A traveled by vehicle 3601. In addition, vehicle 3601 may determine whether a navigational action is required based on a state timing of traffic light 3630A. For example, vehicle 3601 may determine that a navigational action (e.g., braking action or coasting action) is required if traffic light 3630A is going to change from green light state to yellow light state prior to vehicle 3601 arriving at traffic light 3630A. As used herein, unless otherwise noted, being at a traffic light implies being in close proximity (e.g., within few tens of feet) of a region of a roadway that is directly underneath the traffic light, or next to the traffic light.

In various embodiments, depending on a state of traffic light 3630A or depending on a state of traffic light 3630A at a time when vehicle 3601 arrives at traffic light 3630A, navigation action may be required or may not be required. For example, if traffic light changes from a red light state to green light state when vehicle 3601 is at traffic light 3630A, the navigational action corresponding to vehicle acceleration may be required.

At step 4113, if the navigational action is required, the processor may be used to cause one or more actuator systems associated with vehicle 3601 to implement the determined one or more navigational actions for vehicle 3601. Step 4113 may be similar to step 3915 of process 3900 described above.

It should be noted, that various steps of process 4100 may be modified or omitted. Additionally, or alternatively, the sequence of steps of process 4100 may be modified. For example, step 4107 may be omitted, if the autonomous vehicle navigation model for vehicle 3601 is up-to-date.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for mapping road segment free spaces for use in autonomous vehicle navigation, the system comprising:
at least one processor programmed to:
receive from a first vehicle, one or more location identifiers detected by the first vehicle as the first vehicle navigates along a road segment according to a target trajectory, the one or more location identifiers being associated with a lateral region of free space adjacent to and intersecting with the road segment, wherein each of the one or more location identifiers associated with the lateral region of free space adjacent to and intersecting with the road segment includes coordinates that are relative to the target trajectory according to which the vehicle navigates;
update an autonomous vehicle road navigation model for the road segment to include a mapped representation of the lateral region of free space adjacent to and intersecting with the road segment based on the one or more location identifiers, wherein the autonomous vehicle road navigation model for the road segment includes the target trajectory; and
distribute the updated autonomous vehicle road navigation model to a plurality of autonomous vehicles, at least one of the autonomous vehicles being configured to autonomously navigate along the target trajectory based on the mapped representation of the lateral region of free space adjacent to and intersecting with the road segment included in the updated autonomous vehicle road navigation model, the autonomous navigation including causing implementation of a navigational action to avoid a potential collision based on a determination that the lateral region of free space adjacent to and intersecting with the road segment has a size sufficient to allow a pedestrian or a vehicle to enter the road segment.

2. The system of claim 1, wherein the lateral region of free space includes one or more of a driveway intersecting the road segment, a parking lot, or a sidewalk.

3. The system of claim 1, wherein the at least one processor is further programmed to receive an additional characteristic associated with the lateral region of free space adjacent to the road segment.

4. The system of claim 3, wherein the additional characteristic includes a free space type indicator.

5. The system of claim 4, wherein the free space type indicator includes at least one of a driveway, a parking lot, or a sidewalk.

6. The system of claim 3, wherein the additional characteristic is received from the first vehicle.

7. The system of claim 1, wherein the mapped representation of the lateral region of free space includes location information associated with one or more detected boundaries of the lateral region of free space.

8. The system of claim 7, wherein the mapped representation of the lateral region of free space further includes a free space type indicator.

9. The system of claim 8, wherein the free space type indicator includes at least one of a driveway, a parking lot, or a sidewalk.

10. The system of claim 8, wherein the free space type indicator indicates that the lateral region of free space adjacent to the road segment is a driveway, a parking lot, or a sidewalk.

11. The system of claim 8, wherein the at least one processor is further programmed to determine the free space type indicator.

12. The system of claim 8, wherein at least one processor associated with the first vehicle is further programmed to determine the free space type indicator.

13. The system of claim 1, wherein the autonomous vehicle road navigation model further includes at least one target trajectory for a vehicle to follow along the road segment.

14. The system of claim 13, wherein the at least one target trajectory is represented by a three-dimensional spline.

15. The system of claim 13, wherein the at least one target trajectory is adjacent to the lateral region of free space.

16. The system of claim 13, wherein the at least one target trajectory intersects the lateral region of free space.

17. The system of claim 1, wherein the one or more location identifiers associated the lateral region of free space include one or more points or lines associated with a detected boundary of the lateral region of free space.

18. The system of claim 1, wherein the at least one processor is further programmed to:
receive from a second vehicle one or more location identifiers associated the lateral region of free space adjacent to the road segment; and
update the autonomous vehicle road navigation model for the road segment to include a refined mapped representation of the lateral region of free space, wherein the refined mapped representation of the lateral region of free space is based on the one or more location identifiers received from the first vehicle and the one or more location identifiers received from the second vehicle.

19. The system of claim 18, wherein:
the one or more location identifiers received from the first vehicle represent first lines;
the one or more location identifiers received from the second vehicle represent second lines; and
the at least one processor is further programmed to associate the first and second lines with a single driveway.

20. The system of claim 1, wherein the at least one processor is further programmed to consolidate or aggregate the one or more location identifiers received from the first vehicle with at least one additional location identifier received from a second vehicle, the at least one additional location identifier being associated with the lateral region of free space adjacent to the road segment.

21. The system of claim 1, wherein the lateral region of free space is next to the road segment and located outside a road edge of the road segment.

22. The system of claim 21, wherein the road edge of the road segment is a lane marking.

23. The system of claim 21, wherein the road edge of the road segment is a physical edge of the road segment.

24. The system of claim 1, wherein a road edge of the road segment divides the lateral region of free space from the road segment.

25. The system of claim 1, wherein the lateral region of free space includes a sidewalk bordering the road segment.

26. The system of claim 1, wherein the lateral region of free space includes another road segment.

27. The system of claim 26, wherein the road segment is a portion of a first roadway having one or more lanes and the another road segment is a portion of a second roadway having one or more lanes.

28. The system of claim 1, wherein the road segment includes a portion of a roadway having one or more lanes.

29. The system of claim 1, wherein the coordinates are relative to a longitudinal position along the target trajectory navigated by the first vehicle and a lateral distance from the target trajectory navigated by the first vehicle.

30. A computer-implemented method for mapping road segment free spaces for use in autonomous vehicle navigation, comprising:
receiving from a first vehicle, one or more location identifiers detected by the first vehicle as the first vehicle navigates along a road segment according to a target trajectory, the one or more location identifiers being associated with a lateral region of free space adjacent to and intersecting with the road segment, wherein each of the one or more location identifiers associated with the lateral region of free space adjacent to and intersecting with the road segment includes coordinates that are relative to the target trajectory according to which the vehicle navigates;
updating an autonomous vehicle road navigation model for the road segment to include a mapped representation of the lateral region of free space adjacent to and intersecting with the road segment based on the one or more location identifiers, wherein the autonomous vehicle road navigation model for the road segment includes the target trajectory; and
distributing the updated autonomous vehicle road navigation model to a plurality of autonomous vehicles, at least one of the autonomous vehicles being configured to autonomously navigate along the target trajectory based on the mapped representation of the lateral region of free space adjacent to and intersecting with the road segment included in the updated autonomous vehicle road navigation model, the autonomous navigation including causing implementation of a navigational action to avoid a potential collision based on a determination that the lateral region of free space adjacent to and intersecting with the road segment has a size sufficient to allow a pedestrian or a vehicle to enter the road segment.

31. The method of claim 30, wherein the lateral region of free space includes one or more of a driveway intersecting the road segment, a parking lot, or a sidewalk.

32. The method of claim 30, wherein the autonomous vehicle road navigation model further includes at least one target trajectory for a vehicle to follow along the road segment.

33. The method of claim 30, wherein the lateral region of free space is next to the road segment and located outside a road edge of the road segment.

34. The method of claim 30, wherein the method further comprises receiving a free space type indicator associated with the lateral region of free space adjacent to the road segment, the free space type indicator including at least one of a driveway, a parking lot, or a sidewalk.

35. A non-transitory computer-readable medium storing instructions executable by at least one processor to perform a method, the method comprising:
receiving from a first vehicle, one or more location identifiers detected by the first vehicle as the first vehicle navigates along a road segment according to a target trajectory, the one or more location identifiers being associated with a lateral region of free space adjacent to and intersecting with the road segment, wherein each of the one or more location identifiers associated with the lateral region of free space adjacent to and intersecting with the road segment includes coordinates that are relative to the target trajectory according to which the vehicle navigates;
updating an autonomous vehicle road navigation model for the road segment to include a mapped representation of the lateral region of free space adjacent to and intersecting with the road segment based on the one or more location identifiers, wherein the autonomous vehicle road navigation model for the road segment includes the target trajectory; and
distributing the updated autonomous vehicle road navigation model to a plurality of autonomous vehicles, at least one of the autonomous vehicles being configured to autonomously navigate along the target trajectory based on the mapped representation of the lateral region of free space adjacent to and intersecting with the road segment included in the updated autonomous vehicle road navigation model, the autonomous navigation including causing implementation of a navigational action to avoid a potential collision based on a determination that the lateral region of free space adjacent to and intersecting with the road segment has a size sufficient to allow a pedestrian or a vehicle to enter the road segment.

36. The non-transitory computer-readable medium of claim 25, wherein the method further comprises consolidating or aggregating the one or more location identifiers received from the first vehicle with at least one additional location identifier received from a second vehicle, the at least one additional location identifier being associated with the lateral region of free space adjacent to the road segment.

37. The non-transitory computer-readable medium of claim 35, wherein the autonomous vehicle road navigation model further includes at least one target trajectory for a vehicle to follow along the road segment.

38. The non-transitory computer-readable medium of claim 35, wherein the lateral region of free space is next to the road segment and located outside a road edge of the road segment.

39. The non-transitory computer-readable medium of claim 35, wherein the method further comprises receiving a free space type indicator associated with the lateral region of free space adjacent to the road segment, the free space type indicator including at least one of a driveway, a parking lot, or a sidewalk.

* * * * *